(12) United States Patent
Cink et al.

(10) Patent No.: US 9,992,991 B2
(45) Date of Patent: Jun. 12, 2018

(54) APPARATUS AND METHOD FOR APPLYING A SOIL TREATMENT BENEATH THE SURFACE OF THE GROUND

(71) Applicant: BASF Agro B.V., Arnhem (NL)

(72) Inventors: James H. Cink, Wake Forest, NC (US); Kenneth S. Brown, Research Triangle Park, NC (US); Richard A. Warriner, Wake Forest, NC (US)

(73) Assignee: BASF Agro B.V., Arnhem (NL)

( * ) Notice: Subject to any disclaimer, the term of this patent is extended or adjusted under 35 U.S.C. 154(b) by 158 days.

(21) Appl. No.: 14/912,787

(22) PCT Filed: Aug. 14, 2014

(86) PCT No.: PCT/IB2014/063927
§ 371 (c)(1),
(2) Date: Feb. 18, 2016

(87) PCT Pub. No.: WO2015/025252
PCT Pub. Date: Feb. 26, 2015

(65) Prior Publication Data
US 2016/0198695 A1    Jul. 14, 2016

Related U.S. Application Data

(60) Provisional application No. 61/868,321, filed on Aug. 21, 2013.

(51) Int. Cl.
*A01M 1/24* (2006.01)
*A01M 7/00* (2006.01)
(Continued)

(52) U.S. Cl.
CPC .......... *A01M 1/245* (2013.01); *A01C 23/026* (2013.01); *A01C 23/028* (2013.01);
(Continued)

(58) Field of Classification Search
CPC .......... A01M 1/245; A01M 1/24; A01M 1/00; A01M 7/0035; A01M 7/0032;
(Continued)

(56) References Cited

U.S. PATENT DOCUMENTS

| 4,807,544 A | 2/1989 | Cross et al. |
| 6,698,367 B1 | 3/2004 | Decouzon |
| 2013/0180439 A1 | 7/2013 | Cink et al. |

FOREIGN PATENT DOCUMENTS

| WO | 9611564 | 4/1996 |
| WO | 2011106420 | 9/2011 |

OTHER PUBLICATIONS

International Search Report and Written Opinion for PCT/IB2014/063927 dated Jan. 12, 2015, 14 pgs.

*Primary Examiner* — Christopher J. Novosad
(74) *Attorney, Agent, or Firm* — Armstrong Teasdale LLP

(57) ABSTRACT

In a method and apparatus (710) for treating soil at a work site, a high pressure application tool (712) is connected to a base unit (714) and moved relative thereto along a first area of the work site adjacent a structure (94) and operated to inject soil treatment down into the soil along the first area of the work site. A low pressure application tool (711) is interchanged with the high pressure application tool (712) and moved relative to the base unit along a second area of the work site adjacent the structure (94) and different from the first area of the work site. The low pressure application tool (711) is operated to apply soil treatment to the soil along the second area of the work site.

7 Claims, 48 Drawing Sheets

(51) Int. Cl.
*A01M 17/00* (2006.01)
*A01M 21/04* (2006.01)
*A01M 25/00* (2006.01)
*A01C 23/02* (2006.01)

(52) U.S. Cl.
CPC ........ *A01M 7/0035* (2013.01); *A01M 17/002* (2013.01); *A01M 21/043* (2013.01); *A01M 25/006* (2013.01)

(58) Field of Classification Search
CPC .... A01M 7/0025; A01M 7/00; A01M 17/002; A01M 17/00; A01M 21/043; A01M 21/04; A01M 21/00; A01M 25/006; A01M 25/00; A01C 23/026; A01C 23/023; A01C 23/03; A01C 23/00; A01C 23/028; A01C 23/027
See application file for complete search history.

FIG. 46

TERMIDOR HP - LOCATION DATA

NO SERVICE

803 LOCATION 15

| A.I. - HT MODE | 112.6 Oz |
| A.I. - SA MODE | 164.2 Oz |
| INJECTION COUNT | 4800 |
| WATER | 106.1 Gal. |
| MODE | HT ∨ SA ∨ |
| WORK ORDER COMPLETE: YES | |

[SEND]  [UP]  [DOWN]  [BACK]

805

APPARATUS AND METHOD FOR APPLYING A SOIL TREATMENT BENEATH THE SURFACE OF THE GROUND

BACKGROUND OF THE DISCLOSURE

The field of the disclosure relates generally to soil treatments, and more particularly to methods and apparatus for applying soil treatments (e.g., pesticides) below the ground surface using a handheld application tool that in certain modes of operation does not disturb the soil surface before the soil treatment is injected.

The insertion of soil treatments into the soil near buildings has been used to prevent the infestation of insects or other pests. Without treatment, these pests can be become a significant nuisance or hazard to a building owner or its occupants. Such pests are known to attack the structure of buildings and may infiltrate the building causing other problems for its occupants.

At least one known method of soil treatment includes an application of pesticides, fertilizers, or other soil treatments by direct placement into the soil under and around structures, around or near ornamental plantings, poles, fences, decks, or other wooden elements. This direct placement method includes digging, trenching and/or rodding (i.e., forcing an application device into the soil), and then directly placing the soil treatment into the dug out area of the trench. This known method can cause damage to vegetation, disrupt landscaping, and greatly impact or diminish the aesthetic beauty and value of the treated area until either the plants recover or new plantings are installed.

For example, in some common termite treatments direct placement of a termiticide into the soil around structures involves the digging of a trench approximately 4 to 6 inches wide by 6 inches deep into which a termiticide composition is applied at a rate of 4 gallons per 10 linear feet of trench per foot of depth. In addition to the application of the soil treatment to the trench, soil treatment may also be dispensed into the ground through the use of a rod injection tool, which is plunged down into the ground generally to a depth that is approximately to the top of a footer (i.e., a part of the building's foundation). For a typical structure having a perimeter of 200 linear feet, the time to prepare, dig, inject, and finish the application of soil treatment requires at least 4 to 6 hours depending on the type of soil and whether the application is conducted by a pair of or a single technician(s).

Another known method of soil treatment includes the direct insertion of a tool down into the ground and delivering the pesticides, fertilizers, or other soil treatments into the ground. Applying the soil treatments below the surface of the soil has been used as a way of limiting the wash off of the treatments. Typical devices for implementing such soil treatments have utilized needles or other mechanical devices, creating both a passageway into the soil and through which the treatments are applied to the subsurface area. These devices have the obvious limitation that they create holes in the soil, which may be unsightly, or create other adverse concerns, such as unwanted soil compaction adjacent the insertion sights, as well as require the creation of the hole using mechanical forces. Moreover, devices that are pushed into the ground can become plugged with soil or other debris which requires disassembly of the application tool for cleaning. Another disadvantage to devices that are pushed into the ground is that they can become contaminated with soil borne pathogens or other contaminates that can potentially be transferred to the next injection site.

The use of high pressure flows as a method of effectively injecting materials below the soil surface has been described before, such as in U.S. Pat. No. 5,370,069 to Monroe, titled Apparatus and Method for Aerating and/or Introducing Particulate Matter into a Ground Surface. These methods use high pressure jets of a fluid, such as air or water that entrain the soil treatment agent, whether the soil treatment agent is in solution with the fluid, or a granular material carried with the fluid. The high pressure jet can form a small hole in the surface into which the material is being placed, or cause the material to be absorbed by the surface in a rapid fashion, such that soil disturbance is minimal. One benefit of the use of a pressure jet is that no mechanical effort is required to create a passageway as a predicate for the soil treatment material to be placed below the surface of the soil. Nor is any other disturbance of the soil required, such as placing a tool directly down below the ground surface.

While devices such as that disclosed in Monroe are effective at placing soil treatment materials below the surface, they are designed to distribute such materials both a short distance below the soil surface and over a large open space area, where the size of the equipment is not a limitation. These known devices are not suitable for strategically injecting soil treatments to greater depths within the soil under and around structures, ornamental plantings, poles, fences, decks and other wood elements where treatments relating particularly to treatments against insects infestation are common.

Accordingly, a handheld high pressure application tool for applying soil treatments (e.g., termiticide or other pesticide) beneath the surface of the ground adjacent a structure is needed. Such a handheld tool would permit an operator to strategically position the tool around a structure such as a house, a deck, any landscaping that may be near the house and/or deck, around utility poles, and around plants. The tool could include multiple nozzles for applying a predetermined amount of soil treatment at a controlled pressure for injecting the soil treatment down to a desired predetermined depth. This would allow for precision applications where the area of application is carefully controlled.

In some applications, however, the type of soil (e.g., hard, compacted, etc.) or other obstructions (e.g., a concrete patio, walkway, etc.) may prevent an operator from treating certain areas with a high pressure application tool. Thus, a system that can operate in different modes, such as a high pressure mode and a low pressure mode (for use in applying the pesticide to areas in which a high pressure application is not feasible) is needed.

BRIEF DESCRIPTION OF THE DISCLOSURE

In one aspect, apparatus for applying a soil treatment in which the apparatus is selectively operable between a high pressure mode and a low pressure mode generally comprises a high pressure application tool operable to inject soil treatment under high pressure into the soil in the high pressure mode of the apparatus. A low pressure application tool is discrete from the high pressure application tool and is operable to apply soil treatment under low pressure to the soil in the low pressure mode of the apparatus, with the low pressure being substantially lower than the high pressure of the high pressure mode of the apparatus. A base unit is in fluid communication with the high pressure application tool in the high pressure mode of the apparatus and is operable in the high pressure mode to deliver pressurized fluid to the high pressure application tool for operation of the high pressure application tool. The base unit is in fluid communication with the low pressure application tool in the low pressure mode of the apparatus and is operable in the low pressure mode to deliver fluid to the low pressure application tool at a substantially lower pressure than in the high pressure mode. The high pressure application tool and the low pressure application tool are each respectively positionable relative to the base unit. The base unit, the high pressure application tool and the low pressure application tool are configured relative to each other such that the low pressure application tool is inoperable when the high pressure application tool is operating and the high pressure application tool is inoperable when the low pressure application tool is operating.

In another aspect, a method of treating soil adjacent a structure at a work site generally comprises moving a high pressure injection apparatus along a first area of the work site adjacent the structure and operating the injection apparatus to inject soil treatment down into the soil along the first area of the work site. A low pressure application tool is moved along a second area of the work site adjacent the structure and different from the first area of the work site. The low pressure application tool is operated to apply soil treatment to the soil along the second area of the work site.

In still another aspect, a method of injecting a soil treatment into subsurface soil generally comprises positioning an injection apparatus so that at least one high pressure nozzle of the injection apparatus is adjacent to the soil to be injected with pesticide. The injection apparatus is triggered to deliver a pressurized soil treatment to the at least one high pressure nozzle whereby the pressurized soil treated is jetted from the high pressure nozzle down into soil subsurface. The triggering generally comprises determining a predetermined time period during which carrier liquid is delivered at high pressure to the at least one high pressure nozzle, with the predetermined time period based at least in part on the type of soil into which the soil treatment is to be injected. A predetermined dosing volume of active ingredient is delivered toward the at least one high pressure nozzle for the predetermined time period for admixture with the carrier liquid to define the soil treatment prior to the soil treatment being jetted from the at least one high pressure nozzle. The predetermined dosing volume is on a per injection basis and is independent of the predetermined time period.

In still yet another aspect, apparatus for injecting a soil treatment into subsurface soil generally comprises an injection apparatus operable to inject soil treatment under high pressure down into the soil. A base unit is operable to deliver pressurized fluid to the injection apparatus. The injection apparatus is connected to the base unit in fluid communication therewith by a conduit defining a fluid passageway therebetween, with the injection apparatus being positionable remote from the base unit. The injection apparatus carries a battery for powering the injection apparatus without powered connection to the base unit.

BRIEF DESCRIPTION OF THE DRAWINGS

FIGS. 29-47 are screen shots from a display unit of a base unit control system for the apparatus of FIG. 23.

DETAILED DESCRIPTION OF THE DISCLOSURE

Figure 1:
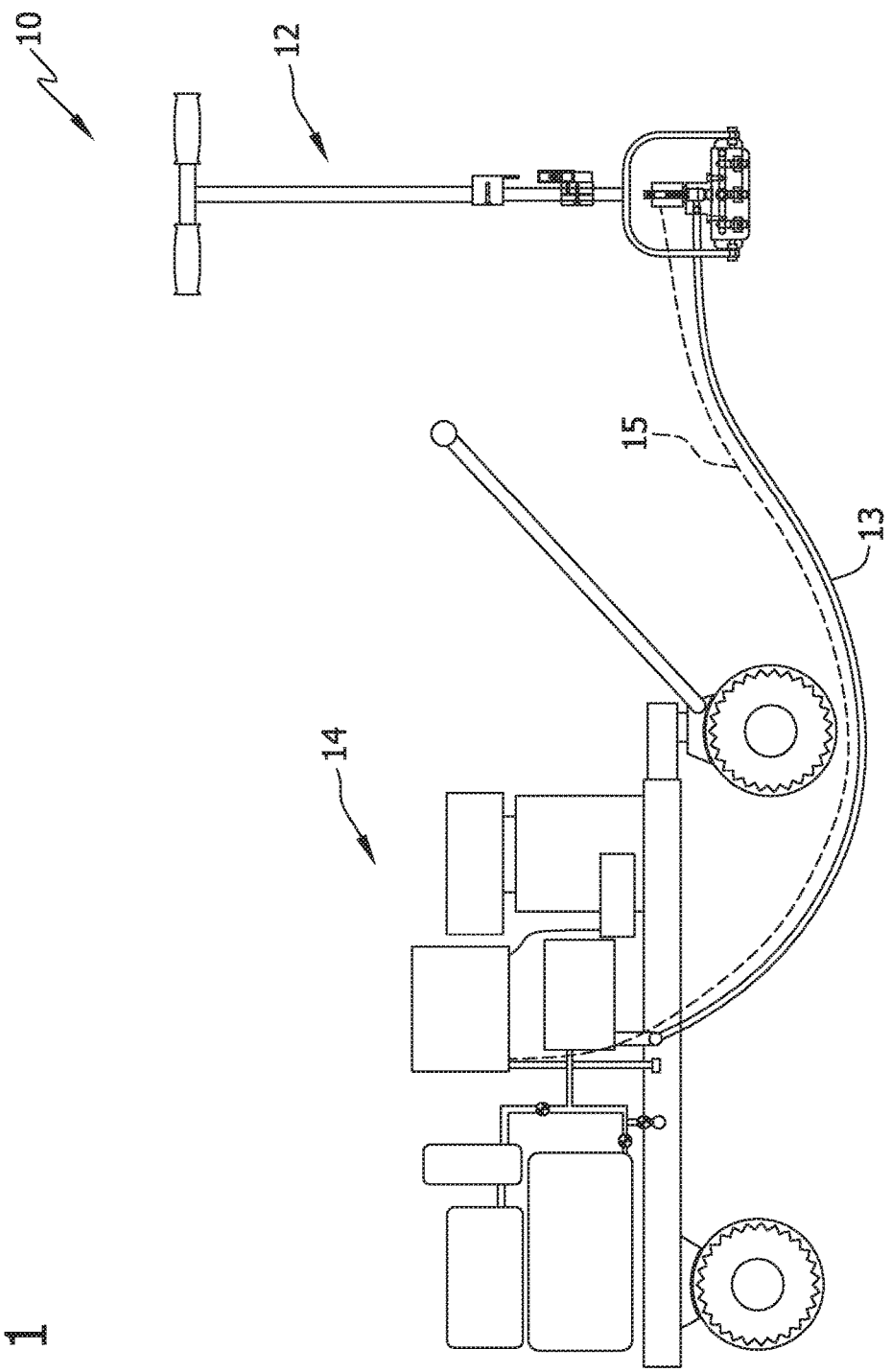
FIG. 1 is a schematic illustration of a high pressure injection system for injecting a termiticide into the ground in accordance with an exemplary embodiment in which the system includes a base unit and a handheld application tool.

A high pressure injection system for applying a soil treatment (e.g., pesticide, insecticide, termiticide, fertilizer or micronutrient) beneath the surface of the ground is described below in detail. It is understood that the system disclosed herein can be used to apply any suitable soil treatment including pesticide, insecticide, termiticide or soil amendment and can be used to inhibit or control various types of pests, pathogens or add to the nutritional value of the soil. For example, it may be desirable to inhibit and/or control termites, ants, cockroaches, beetles, earwigs, silverfish, crickets, spiders, centipedes, millipedes, scorpions, pillbugs, sowbugs, flies, mosquitoes, gnats, moths, wasps, hornets, bees, and the like. As used herein, the term "pesticide" refers to any substance or mixture for preventing, destroying, repelling, or mitigating any pest including insects, animals (e.g., mice, rats), plants (e.g., weeds), fungi, microorganisms (e.g., bacteria and viruses), pseudocoelomates (e.g., nematodes) and prions. The term "insecticide", which is a type of pesticide, is used herein to mean any substance or mixture for preventing, destroying, repelling, or mitigating insects. The term "termiticide", which is a type of insecticide, is used herein to mean any substance or mixture for preventing, destroying, repelling, or mitigating termites.

Although the methods and systems described herein relate to the application of termiticides beneath the surface of the ground, the methods and systems could also be used to apply pesticides, insecticides, or other soil treatments. The use of termiticides as described herein is not intended to be limiting in any way. Rather, it is for exemplary purposes. The methods and systems described herein may be used, therefore, to apply any type of soil treatment beneath the ground (e.g., pesticides, fertilizers, other soil conditioning materials and insect treatments including insecticides placed around the perimeter of a structure), and is in no way limited to only termiticides.

The methods and systems described herein include a termiticide fluid supply cart (a base unit), and a portable handheld application tool that facilitates the application or injection of termiticides into the soil under and around structures, ornamental plantings, poles, fences, decks, trees and other structural and non-structural elements. The example embodiment eliminates the need to apply termiticides using certain known techniques such as digging, trenching, and/or rodding, which all require mechanically disturbing at least the surface of the ground or soil. These known techniques can cause damage to vegetation, disrupt landscaping, and impact or diminish the aesthetic beauty and value of the treated area until the plants recover or new plantings are installed.

The application system described herein includes an application tool that has a tee-handle at the top of the tool and a manifold assembly at the bottom of the tool. The tee-handle includes a hand grip portion on each side of a vertical shaft that extends between the handle and the manifold assembly. The hand grip portions may include rubber grips to aid in holding the tool during application and to reduce hand strain. It is contemplated that in other embodiments any suitable handle configuration may be used. For example, the handle may be a circular-shaped handle with one or more rubber grips extending continually or in segments about the circumference of the handle to allow for adjustable positioning of the operator's hands during operation of the tool or during transport.

The vertical shaft of the tool consists of several parts that allow the shaft to compress, when the handle is pushed down, much like a pogo stick. The compression of the shaft activates an electronic triggering switch (broadly, "an actuator") that temporarily opens a discharge valve, for example a poppet valve. When the operator has the manifold assembly (i.e., device plate) in position on the ground, the operator uses the handle to apply a downward pressure (approximately 15-20 pounds) onto the shaft to actuate the trigger switch, which in turn causes a single injection of termiticide into the ground. The operator must release the pressure applied to the shaft to disengage the switch, which results in the system being reset.

In the example embodiment, the switch actuates the discharge valve a single time for each compression of the shaft. Thus, for each compression of the shaft, the discharge valve is opened a single time and a predetermined quantity of termiticide is discharged from the tool. The switch of tool is reset when the shaft is released. The next application can then be made by again compressing the shaft.

The application tool also includes a mounting bracket that mounts the manifold assembly to the shaft. This bracket allows the application head or manifold assembly to pivot about at least one axis. This allows the operator to adjust the tool such that the manifold assembly is properly positioned before activating the application switch.

The manifold assembly includes an inlet port, a discharge valve, a plurality of high pressure nozzles, a manifold head, and a contact plate for protecting the plurality of high pressure nozzles. The system also includes at least one high pressure liquid line and electrical connections that extend between the supply cart and the handheld application tool. The system also includes a pressure manifold and an electronic controller (broadly, "a valve closer") that sets the length of time the discharge valve remains open during each activation of the electronic switch.

In operation, a measured dose of a liquid termiticide concentrate from a container housed on the supply cart is mixed with measured supply of water and fed to the application tool by an inline injection system. In another embodiment, the termiticide concentrate is supplied from a tank housed on the application tool and is fed to the application manifold via an injection pump. In yet another embodiment, the termiticide solution is supplied to the application tool from a tank or container without the need of an inline injection pump or device. In still yet another embodiment, the termiticide concentrate can be carried by the operator and housed in a transportable container formed into and/or held within a backpack, a shoulder holster, a sling, a belt holster, a leg holster, or other suitable device capable of holding the pesticide container.

The methods and systems described herein utilize high pressure to inject the termiticide into soil beneath the surface of the ground. The high pressure injection system described herein differs from at least some known liquid injection systems that apply termiticides for soil application in that the current industry standard liquid termiticide injection systems inject liquids into the ground using pressures of 25 to 35 psi and through a single injection port or tip. The example system described herein injects the termiticide solution into the ground at pressures ranging from about 50 psi to about 10,000 psi, and in another embodiment, from about 1,000 psi to about 7,000 psi, and in yet another embodiment, at about 4,000 psi.

In operation, the application tool is set at a desired pressure for applying the termiticide. The operator then places the manifold assembly, and more specifically, the contact plate, which protects the injection nozzles, in a desired application area. The desired area may be, for example, adjacent to a wall or foundation of a structure. The operator then press down on the application handles to compress the shaft of the tool. This downward pressure causes the upper and lower portions of the device shaft to come together thereby activating an electronic switch. The switch would temporarily open the discharge valve and allow a predetermined amount of termiticide solution to pass through the high pressure injection nozzles and into the ground. The switch would only allow a single charge (i.e., a predefined amount of termiticide solution) to pass through the nozzles. The switch is reset by releasing the pressure on the handle and allowing the two parts of the electronic switch to separate. The operator applicator would then lift or slide the handheld application tool along the wall to the next application point and press down on the handle again, thus repeating the injection of the termiticide solution into the soil. The operator continues to move the handheld application tool and inject termiticide until the desired application area is injected. In one example, the desired application area is the perimeter of the structure so that a barrier of termiticide completely surrounds the structure and thereby inhibits termites from passing through the barrier to the structure.

In an alternative embodiment, the electronic switch could be positioned on or near the tee-handle portion of the tool where it could be activated by the operator pressing down on a button or switch with a finger or thumb. In another embodiment, the tool could include a position marker, such as a foam, dust, powder, paint, or a dye material that would be applied when the termiticide is applied. The position marker would apply a marking material to the ground to mark the position of the contact plate during each application. This would allow the operator to visually determine where an application has been made and where the device plate should be re-positioned to ensure that a continuous application of the termiticide is made around the perimeter of the structure. The marker would also aid in preventing over or under application of the termiticide solution in the application area.

The high-pressure application tool and methods of using the same as described herein have many advantages over the known systems. For example, the tool described herein may include an inline injection assembly which eliminates the need to mix large volumes of the termiticide solution, and reduces the hazards associated with transporting or handling large volumes of termiticide solutions on public roadways or on private property. The use of the high-pressure injection tool also eliminates the need for digging (i.e., trenching) before applying the termiticide solution into the ground. This reduces the destruction of the landscaping and/or natural vegetation around the perimeter of a structure being treated, and is also less wear and tear on the tool used to perform the application. For example, the high-pressure injection tool also reduces or eliminates the need for rodding into the soil with an application device in order to apply the termiticide solution. The high-pressure tool can also be programmed to deliver a specific volume of termiticide solution per nozzle, and control the depth to which the solution penetrates into the soil by controlling the application pressure. By controlling the volume and the pressure, the application volume of the termiticide can be reduced by 25% to 80% of a normal liquid termiticide application, thus saving cost and reducing demands on water. This is especially important in drier climates or during times of drought. The high-pressure tool also greatly reduces the time required to complete a termiticide treatment around a structure. This reduction in time can range between 40% and 80%. As a result, less time is spent at the site and thereby labor costs associated with the site preparation and application are reduced. Also, the application tool, which is designed to place the injection nozzles in close proximity to the ground when injecting the termiticide into the ground, reduces the risk of exposure to the operator or anyone in the immediate area of the application.

Referring to the drawings, FIG. 1 is a schematic illustration of a high pressure injection system 10 for injecting termiticide into the ground in accordance with an exemplary embodiment of the present invention. The injection system 10 includes a handheld portable application tool 12 (broadly, an "injection apparatus") and a termiticide fluid supply cart 14 (broadly, a "base unit"). The application tool 12 is connected to the cart 14 via a conduit 13 defining a fluid passageway (e.g., a hose) and at least one electrical connection 15. The conduit 13 permits fluid (e.g., water and/or a termiticide solution) to flow from the cart 14 to the application tool 12. The electrical connection 15 is used for transmitting various control signals between the application tool 12 and the cart 14.

Figure 2:
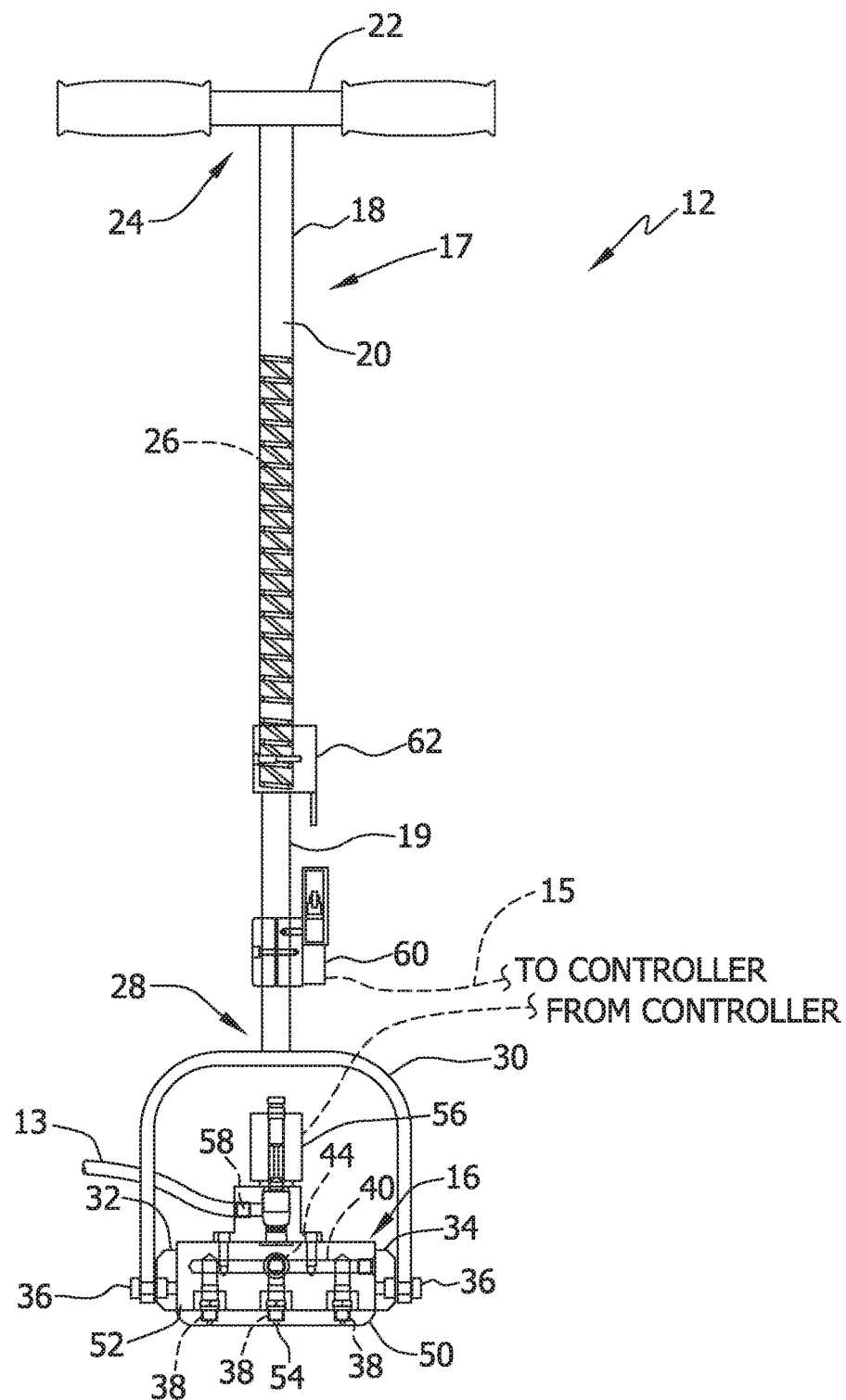
FIG. 2 is a front view schematic illustration of the handheld portable application tool of FIG. 1 with parts cut away.
Figure 3:
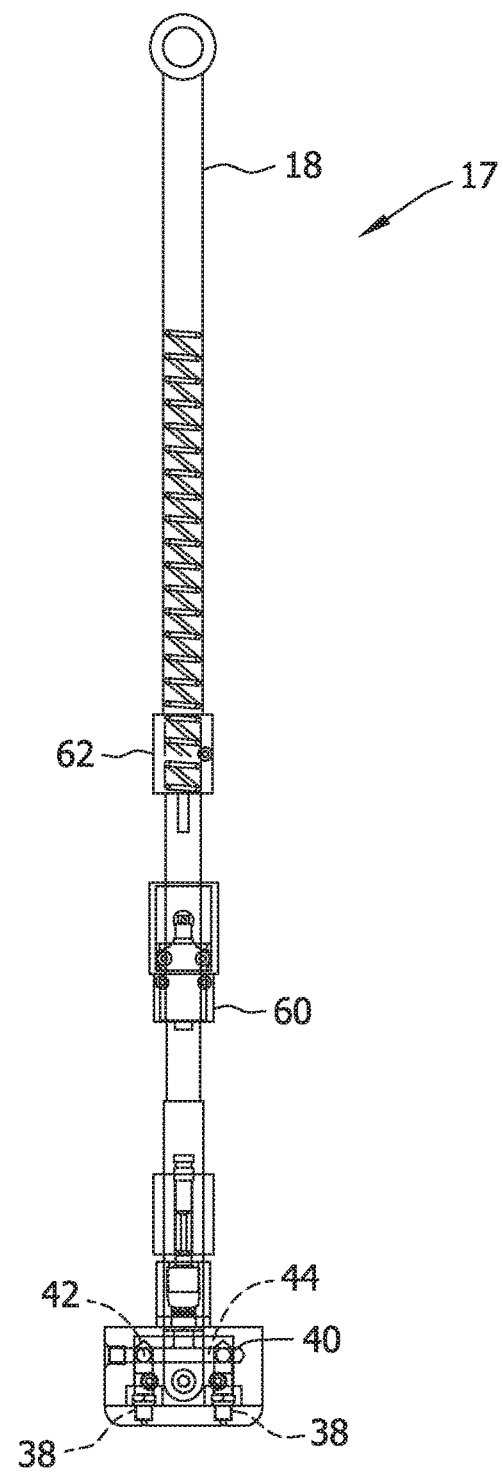
FIG. 3 is a side view schematic illustration of the handheld portable application tool of FIG. 2.

FIG. 2 is a front view schematic illustration of the handheld portable application tool 12, and FIG. 3 is a side view schematic illustration of the application tool 12. The handheld portable application tool 12 includes a handle 17 and a manifold head 16 mounted to the handle. The handle 17 includes an upper portion 18 and a lower portion 19. The upper portion 18 includes a tubular section 20 and a hand grip section 22 attached to an upper end 24 of the tubular section 20. As a result, the upper portion 18 of the handle 17 has a generally T-shape. The lower portion 19 of the handle 17, which is tubular, is sized for insertion into the tubular section 20 of the upper portion 18 of the handle. With the lower portion 19 of the handle 17 inserted into the tubular section 20 of the upper portion 18 of the handle, the upper portion can move with respect to the lower portion from a first, extended position to a second, compressed position. A biasing element, such as a spring 26, is provided to bias the upper portion 18 of the handle 17 toward its first, extended position. It is understood, however, that any known biasing element 26 may be used. A flange (not shown) or other suitable retainer(s) may be provided to inhibit the lower portion 19 of the handle 17 from being pulled or otherwise withdrawn from the upper portion 18 to thereby ensure that the lower portion remains telescopically attached to the upper portion. A lower end 28 of lower portion 19 of the handle 17 is attached to an inverted U-shaped attachment bracket 30. The manifold head 16 is pivotally attached at each of its ends 32, 34 to the attachment bracket 30 via a pair of pivot pins 36.

The manifold head 16 includes at least one internal passage to distribute the termiticide to a plurality of high pressure nozzles 38 in fluid communication with the internal passage. As seen in FIG. 3, the illustrated manifold head 16 includes two main internal passages 40, 42, and a cross passage 44 connecting main internal passages. It is contemplated that the manifold head 16 may include any number of high pressure nozzles 38 including a single nozzle. For example, the manifold head 16 of the exemplary embodiment has a matrix of six high pressure nozzles 38 with each nozzle generally equidistant from each other. Each of the high pressure nozzles 38, in one embodiment, has an orifice diameter ranging from about 0.002 inch to about 0.01 inch.

With reference again to FIG. 2, a contact plate 50 is attached to a bottom surface 52 of the manifold head 16 to protect the high pressure nozzles 38. In the illustrated embodiment, the contact plate 50 includes a plurality of openings 54 with each of the openings being generally aligned with a respective one of the plurality of high pressure nozzles 38. As a result, the high pressure nozzles 38 are spaced from the soil by the contact plate 50 and therefore do not directly contact the soil. Moreover, the contact plate 50 shields or otherwise blocks soil, rocks, and/or other debris that may be "kicked-up" during the injection of the termiticide. The contact plate 50 includes rounded edges to facilitate sliding of the tool 12. The contact plate 50 can be made from any suitable material, for example, metal and/or plastic.

Figure 4:
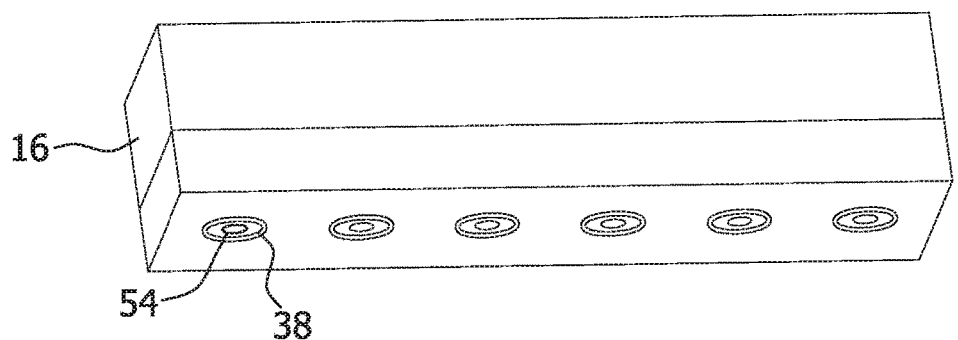
FIG. 4 is a perspective schematic illustration of an elongated shaped manifold head for use with the application tool.
Figure 5:
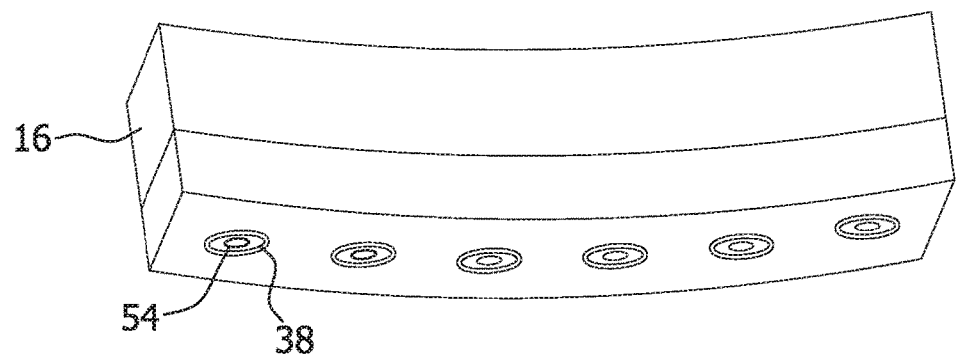
FIG. 5 is a perspective schematic illustration of an arcuate shaped manifold head for use with the application tool.

The size and shape of the manifold head 16 may be selected based on the particular application for which the tool 12 is intended to be used. In one embodiment, the manifold head 16 has a shape with a high length to width ratio such as the high pressure nozzles 38 being arranged linearly in a row as shown in FIG. 4. In another embodiment, the manifold head 16 has an arcuate shape as shown in FIG. 5. The arcuate shaped manifold head 16 may be used to conform around circular edges, such as around trees. It is contemplated that the manifold heads 16 can be interchangeable. That is, the operator of the tool 12 can selectively change out the manifold head 16. It is also contemplated that the manifold head 16 can be replaced with other delivery means (e.g., a rod injection tool) for delivering a supply of termiticide at low pressures. These low pressure delivery means can be used in areas less suitable for high pressure injection.

The weight of the manifold head 16 may be selected so that the mass of the manifold head 16 assists in retaining tool 12 in position during a discharge from the plurality of high pressure nozzles 38, without being unduly burdensome for manual positioning and moving the tool by an operator. In general, the lighter the mass of the manifold head 16, the greater the force that the operator must apply to the handle 17 to retain the tool 12 in position during a discharge of termiticide from the high pressure nozzles 38.

As illustrated in FIG. 2, a discharge valve 56 is attached to the manifold head 16 and is in fluid communication with the internal passages 40, 42, 44 in the manifold head and the supply of termiticide. More specifically, one end of the discharge valve 56 is coupled to a high pressure inlet port 58 and the other end of the discharge valve is coupled to the hose 13. The discharge valve 56 is moveable between an opened position and a closed position. When the discharge valve is in its closed position, termiticide is inhibited from flowing from the supply of termiticide via the hose 13 to the internal passages 40, 42, 44 in the manifold head via the high pressure inlet port 58. When the discharge valve 56 is opened, the termiticide solution flows from the supply of termiticide through the hose 13 and into inlet port 58 under high pressure. From the inlet port 58, the pressurized termiticide flows into internal passages 40, 42, 44 of the manifold head 16 and through the high pressure nozzles 38 from which the termiticide is injected into the ground. In one embodiment, the termiticide is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 56 is a solenoid operated poppet valve capable of sufficiently rapid operation to allow opening and closing of the discharge valve 56 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 12.

In another suitable embodiment, the manifold head 16 may have a discharge valve 56 associated with each of the high pressure nozzles 38, such that even distribution of termiticide fluid across the plurality of high pressure nozzles 38 may be ensured. While discharge balancing can be obtained within reasonable parameters simply through proper sizing of the internal passages 40, 42, 44, should it be required, and should it justify the expense, multiple discharge valves 56 may be used, such that pressurized termiticide solution contained in a feed hose supplying each of the discharge valves 56 may provide that an adequate amount of termiticide solution is available for each of the high pressure nozzle 38. Such a configuration, however, adds complexity to the system 10 in that the controller must be able to actuate the multiple discharge valves 56 in response to a single actuation, i.e., increasing the amount of wiring and power required to control the valves, although the power requirement may be offset by the use of smaller discharge valves 56.

As illustrated in FIG. 2, a trigger switch 60 (broadly, an "actuator") is mounted on the lower portion 19 of the handle 17 and a trigger switch actuator 62 is mounted on the upper portion 18. The trigger switch 60, which is electrically coupled to the discharge valve 56, activates the discharge valve 56 when the trigger switch actuator 62 engages the trigger switch 60. In the illustrated embodiment and as seen in FIG. 3, the trigger switch actuator 62 is engaged with the trigger switch 60 when the upper portion 18 of the handle 17 is moved to its second, compressed position. Thus, the trigger switch 60 can be actuated by moving the upper portion 18 of the handle 17 from its first, expanded position to its second compressed position by applying a force on the upper portion so that it slides downward relative to the lower portion 19 of the handle until the trigger switch actuator engages the trigger switch 60.

In another embodiment (not shown), the trigger switch 60 can be located on the hand grip section 22 of the upper portion 18 of the handle 17 where it can be actuated by the operator using a finger or thumb. The trigger switch may be a mechanical device, which interrupts the flow of termiticide from the discharge valve 56 to the high pressure nozzles 38, or may be an electrical switch which interrupts the electrical signal to the discharge valve 56, thus preventing actuation of the discharge valve 56.

To inject the termiticide into the ground, the operator positions handheld portable application tool 12 such that the contact plate 50 is in contact with the surface of the ground. A downward force between about 15 to 20 pounds is applied by the operator to the upper portion 18 of the handle 17 to move the upper portion 18 from its first position to its second position and thereby cause the trigger switch actuator 62, which is mounted to the upper portion, to engage the trigger switch 60, which is mounted to the lower portion 19. Engagement of the trigger switch actuator 62 and the trigger switch 60 actuates the trigger switch 60. As a result, an electronic signal is sent from the trigger switch 60 to the discharge valve 56 causing the discharge valve to move from its closed position to its opened position for a predetermined amount of time thereby permitting termiticide to flow to and out the high pressure nozzles 38 for injecting the termiticide into the ground. The operator then releases the pressure from the handle 17, which resets the trigger switch. More specifically, the spring 26 causes the upper portion 18 of the handle 17 to move back to its first, extended position. The illustrated trigger switch 60 is configured to work only once during each compression of handle 17 to prevent repeated opening of the discharge valve 56 until the handle 17 has been reset.

The depth of penetration of the termiticide solution into the ground is a function of the pressure at which the termiticide solution is discharged from the tool 12 and the type of soil into which the termiticide is discharged. For example, hard packed or compacted soil, such as clay, is harder to penetrate and may require higher pressures than a soft sandy soil. Thus, at a given pressure the penetration of termiticide into a sandy soil may be about 12 to 14 inches, while the penetration of termiticide into a sandy loam at the same pressure may be about 6 to 9 inches, and the penetration of termiticide into a clay soil at the same pressure may be about 2 to 5 inches. It is understood, however, that the penetration of termiticide can be greater at higher pressures. For example, the penetration of termiticide into a clay soil may be about 10 to 12 inches at a sufficiently high pressure.

The depth of penetration of the termiticide solution into the ground is also a function of the duration in which the discharge valve 56 is open. The longer the duration during which discharge valve 56 is open, the longer the sustained force of the solution is maintained—resulting in increased depths of penetration of the solution. At low pressure, the time required for the solution to force its way into the ground to the desired application depth takes longer than when the pressure by which the solution is delivered is increased.

Referring to FIG. 5, the manifold head can be formed into an arch, a semicircle, or other form of angled deflection. A manifold formed in such a manner would be well suited for facilitating the injection of a pesticide solution around a tree, a bush, a post, a pole, a potted plant, root ball, or other plant or structural element where the curved or angled manifold enables the applicator to position the pesticide into an area proximate to the targeted point of application.

Figure 6:
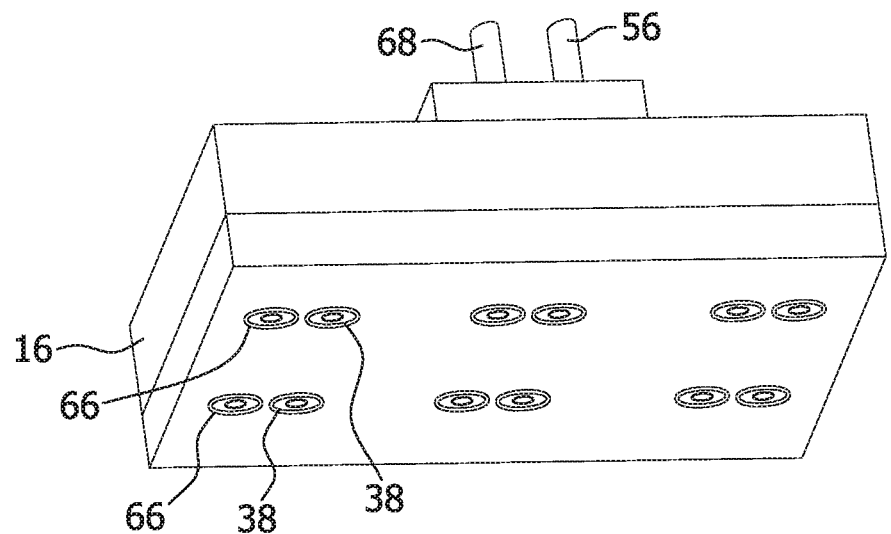
FIG. 6 is a perspective schematic illustration of a manifold head of the handheld portable application tool shown in FIG. 2 having low pressure nozzles positioned adjacent to high pressure nozzles.
Figure 7:
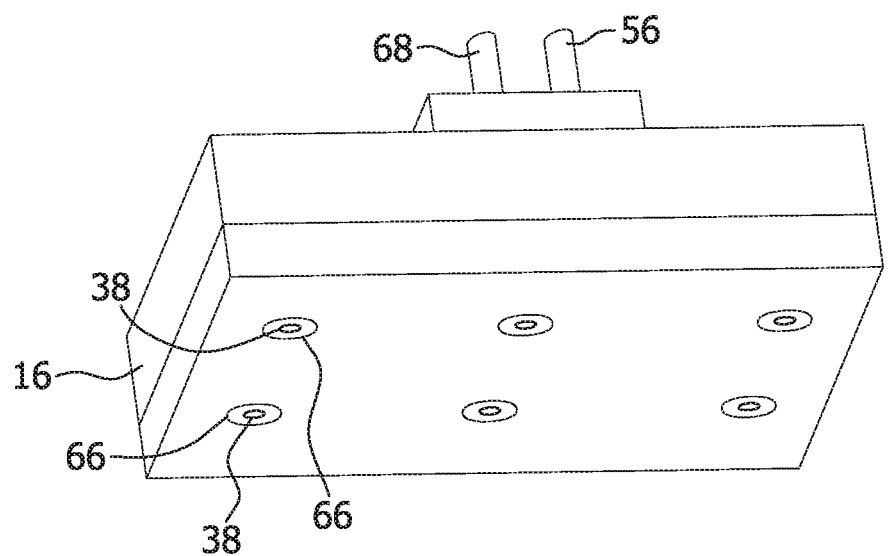
FIG. 7 is a perspective schematic illustration of the manifold head of the handheld portable application tool shown in FIG. 2 having low pressure nozzles concentric with high pressure nozzles.

Referring also to FIGS. 6 and 7, the manifold head 16 may also include a plurality of the low pressure nozzles 66. In the illustrated embodiment of FIG. 6, each of the lower pressures nozzles 66 positioned adjacent to one of the plurality of high pressure nozzles 38. In another embodiment, which is illustrated in FIG. 7, each of the low pressure nozzles 66 is concentric with one of the high pressure nozzles 38. The low pressure nozzles 66 apply the termiticide solution onto the surface of the ground when a low pressure discharge valve 68 is opened. The lower pressure discharge valve operates in the same manner as the previously described discharge valve 65. The low pressure nozzles 66 are configured to apply the termiticide solution to the ground at a pressure of less than about 35 psi. It is also contemplated that in some embodiments the high pressure nozzles 38 may not all have the same size (e.g., diameter) orifice. For example, the nozzles 38 that are, in operation, closer to the structure may have a larger diameter orifice than the nozzles that are away from the structure so that a higher volume of the termiticide solution is applied nearer the structure and a lower volume is applied away from the structure. A similar arrangement may be provided for the low pressure nozzles 66.

Figure 8:
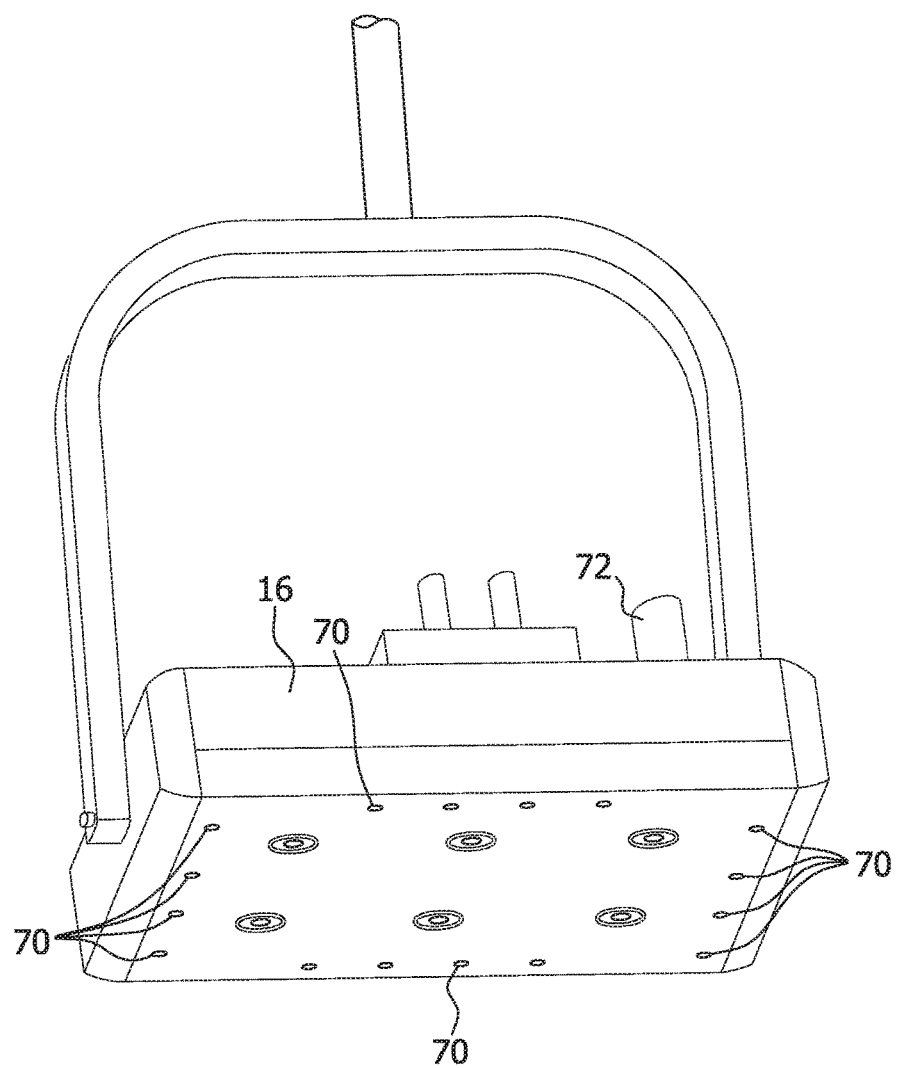
FIG. 8 is a bottom schematic illustration of the manifold head of the handheld portable application tool shown in FIG. 2 having nozzles on the perimeter for applying marking materials.
Figure 9:
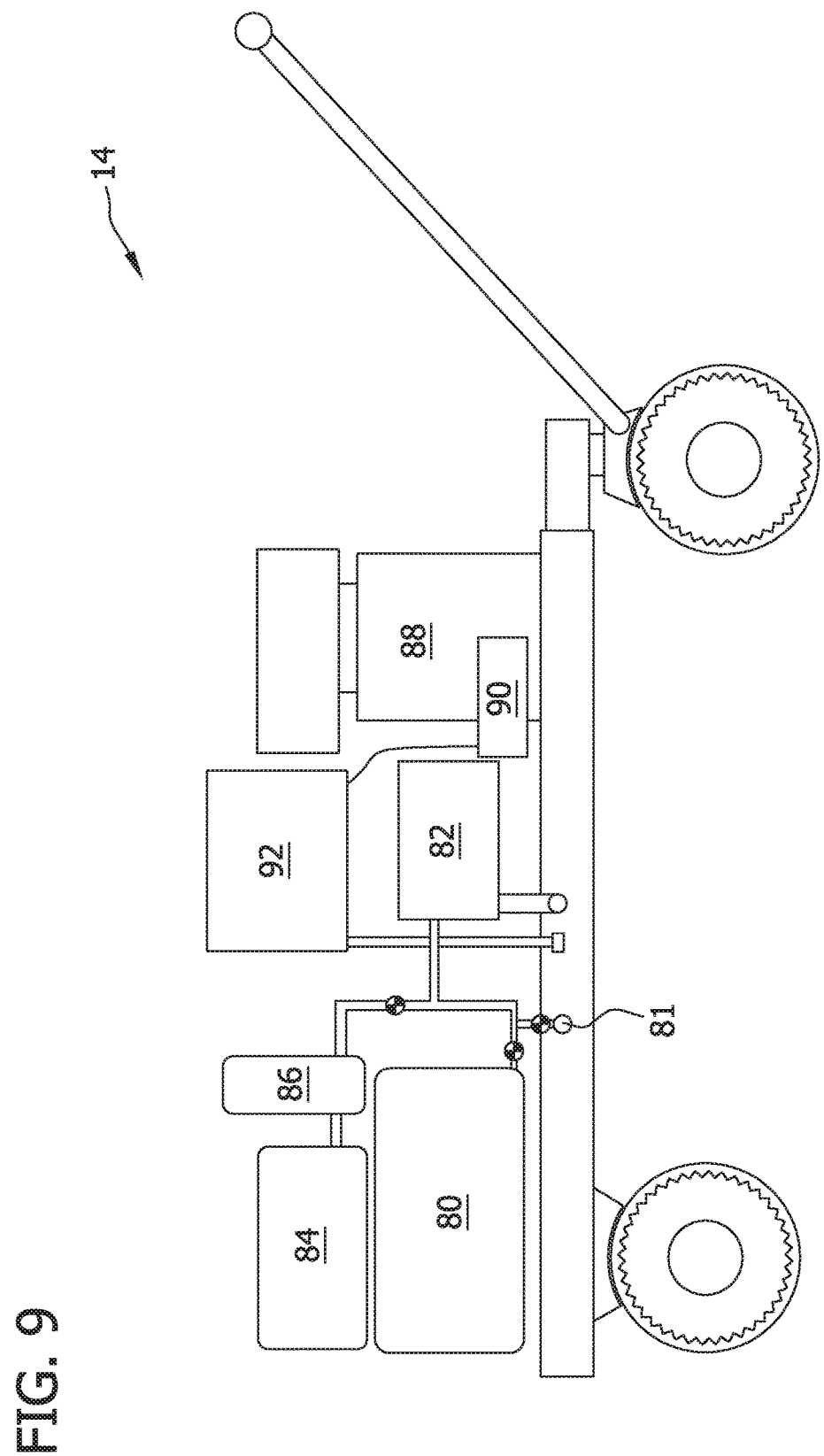
FIG. 9 is a side view schematic illustration of the base unit shown in FIG. 1.

Referring now to FIG. 8, the handheld portable application tool 12 may also include a plurality of nozzles 70 (broadly, a "dispenser") for depositing position marker material onto the surface of the soil to indicate an area in which the termiticide has been injected, and marking the position of the manifold head 16 during each application. Marking the position of the manifold head 16 permits the operator to visually observe where termiticide has been applied and to where the manifold head should be positioned next so that a uniform application of the termiticide can be applied around the perimeter of a structure. In addition, the applied marking material may also aid in preventing over and/or under application of the termiticide. Any suitable marking material may be used, for example, a foam, a powder, a paint, and a dye. In the illustrated embodiment, the marking material is applied by the plurality of nozzles 70 about the circumference of the manifold head 16. A container 72 containing the marking material may be carried by the application tool 12 or a remotely located device such as the cart 14 shown in FIG. 1. It is understood that the marking material may be applied by any suitable delivery device and remain within the scope of this invention.

The supply of termiticide solution may be provided by the supply cart 14. In one embodiment, the cart 14 includes a water reservoir 80, a high pressure pump 82 for pressurizing the termiticide solution, a termiticide concentrate reservoir 84, and a mixing device 86 that supplies the appropriate amount of termiticide concentrate to be mixed with the appropriate amount of water to form the termiticide solution. A water inlet 81 for receiving water from an external water source (e.g., a standard residential water spigot) is also provided. It is contemplated that either the water reservoir 80 or the water inlet 81 can be omitted. The supply cart 14 also includes a gasoline engine 88 with a generator 90 for generating power for operating the pressure pump 82 and generating electrical current for operating a controller 92 associated with the tool 12. In another embodiment, electrical power can be supplied by connecting into an electrical outlet located at the application site.

It is contemplated that the supply cart 14 may be vehicle mounted (e.g., a truck, a van, a ATV), trailer mounted, self propelled, or even a combination thereof, such that the cart 14 can be towed to a job site, then moved around a location under its own power. It is also contemplated that some of the various components of the system 10 described herein as being mounted on the supply cart 14 may be mounted on the application tool 12. For example, it is contemplated that the termiticide concentration reservoir 84 and the mixing device 86 can be mounted on the application tool 12 instead of the supply cart 14. It is further contemplated that the supply cart 14 can be omitted. In such an embodiment, at least the termiticide concentration reservoir 84, the mixing device 86, and the water inlet 81 are carried on-board the application tool 12.

The controller 92, which is mounted on the cart 14, permits the operator of the system 10 to selectively set a pulse duration and pressure level for termiticide injections. The controller 92 may be programmable to permit the operator to enter parameters associated with a particular manifold head 16 in use, such as by defining the number of orifices and their sizes, parameters with a termiticide solution in use, such that dosing through the mixing device 86 can be properly controlled, or the number of injections can be tracked, and the like. It is understood that the pulse duration and/or pressure level for termiticide injections can be manually adjustable (e.g., via a manually adjustable valve) in addition to or instead of being set using the controller 92.

Figure 10:
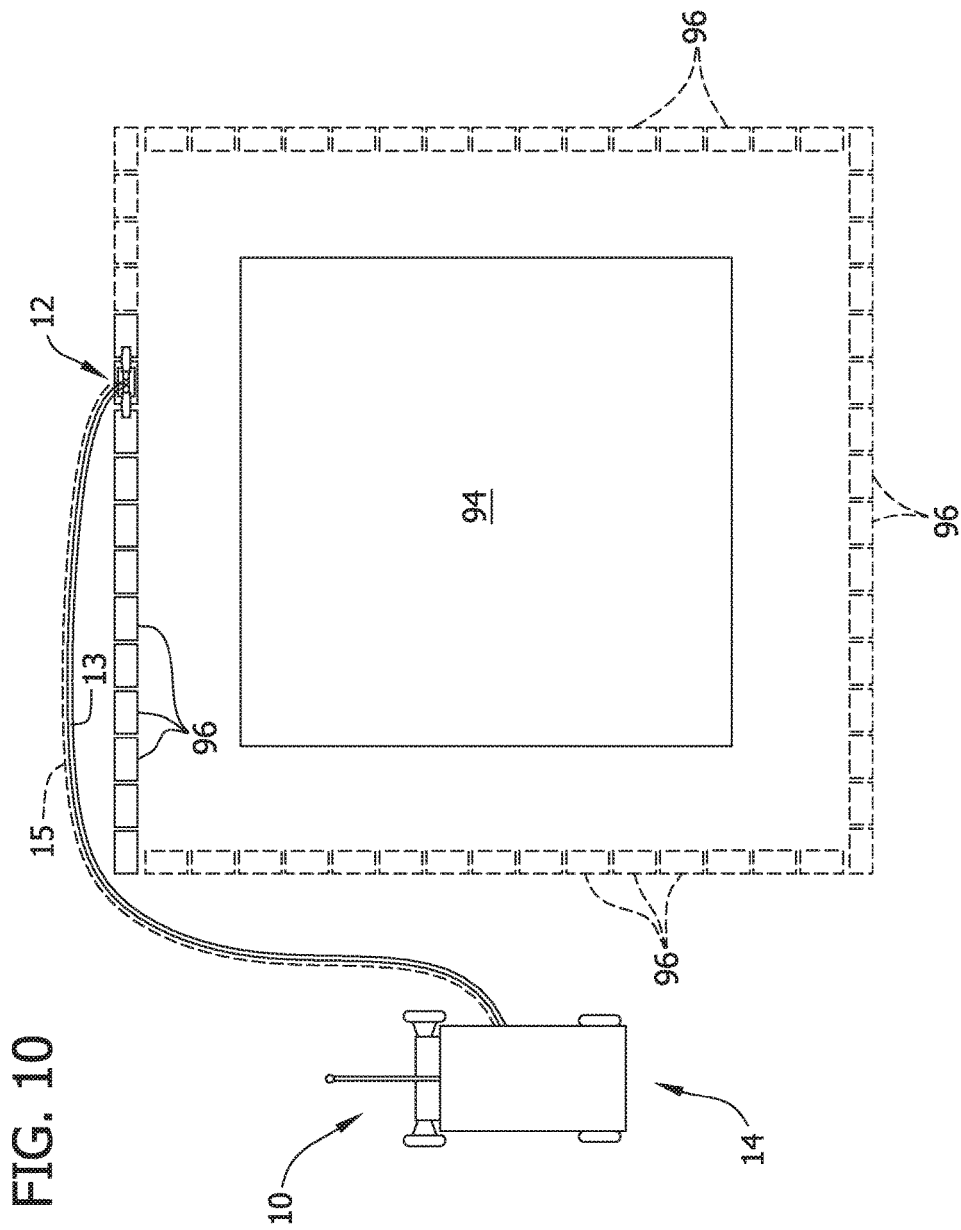
FIG. 10 is a top plan schematic illustrating the high pressure injection system of FIG. 1 being used to inject termiticide into the soil adjacent a structure.

As illustrated in FIG. 10, the system 10 can be used according to one embodiment of a method for treating soil adjacent to a structure, such as a house 94. For example, the system 10 can be used to inject and/or apply termiticide to the soil around the perimeter of the house 94 and thereby establish a barrier to inhibit termites from accessing the house and to control termites in close proximity to the house. According to one method, the base unit 14 is placed at a stationary location relative to the house 94 and the tool 12 is positioned over, and more suitably in contact with, an injection site 96 generally adjacent the house. The tool 12 is operated as described above to inject termiticide down into the soil at the injection site 96 without prior disturbance of the soil. The tool 12 is then moved relative to the supply cart 14 to another injection site 96 that at least in part different from the previous injection site and generally adjacent the house 94. In the illustrated embodiment, the injections sites 96 are generally in side-by-side relationship with each other. The tool 12 is again operated to inject termiticide down into the soil at this next injection site 96 without prior disturbance of the soil.

As seen in FIG. 10, the tool 12 is moved to and operated at a plurality of injection sites 96 adjacent the structure so that the injection sites cooperatively surround substantially the entire perimeter of the house 94. FIG. 10 illustrates a plurality of injection sites 96 at which termiticide has been injected (illustrated in the Figure with solid lines) and a plurality of injection sites at which termiticide will be injected (illustrated in the Figure with dashed lines). It is understood that termiticide can also be applied to surface of the soil at each or some of the injection sites 96. It is further understood that marking material can be deposited onto the soil to indicate where the pesticide solution had been injected into the soil. It is also contemplated that, if necessary, the supply cart 14 may be moved to another location as the handheld tool 12 is used about the perimeter of the house 94.

Figure 11:
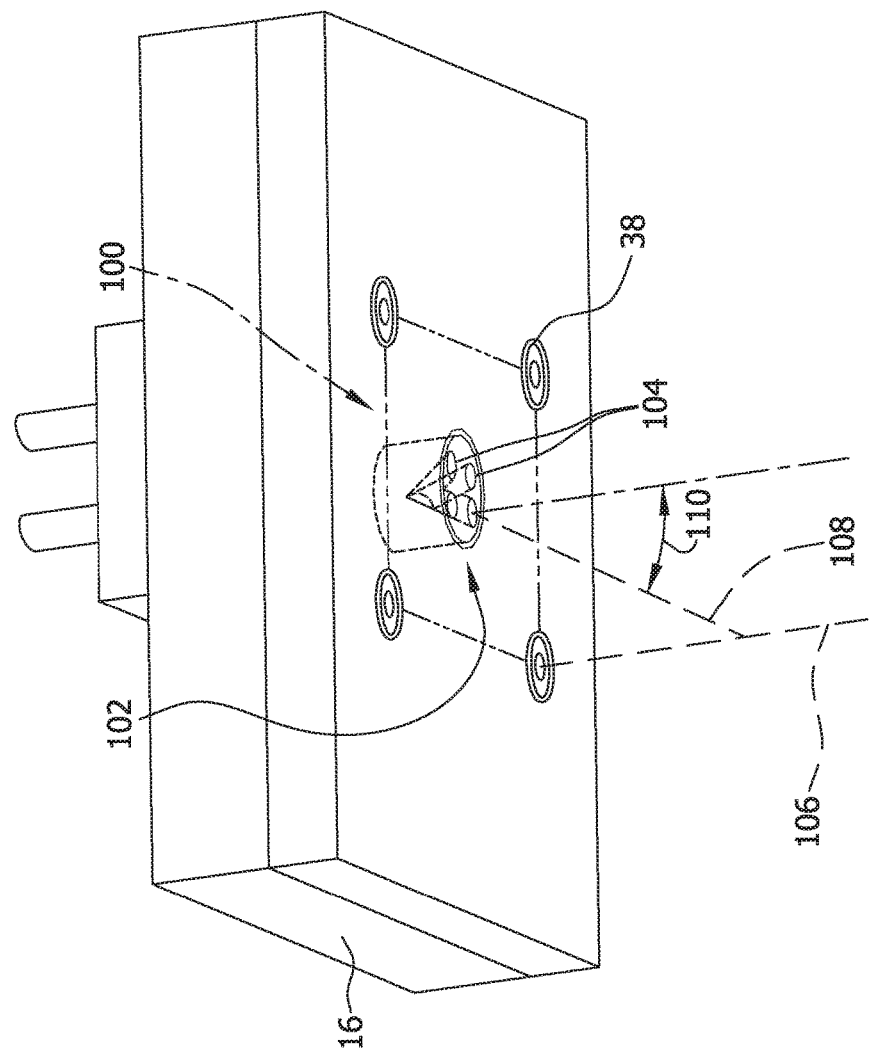
FIG. 11 is a perspective schematic illustration of a manifold head that includes multiport center nozzles.
Figure 12:
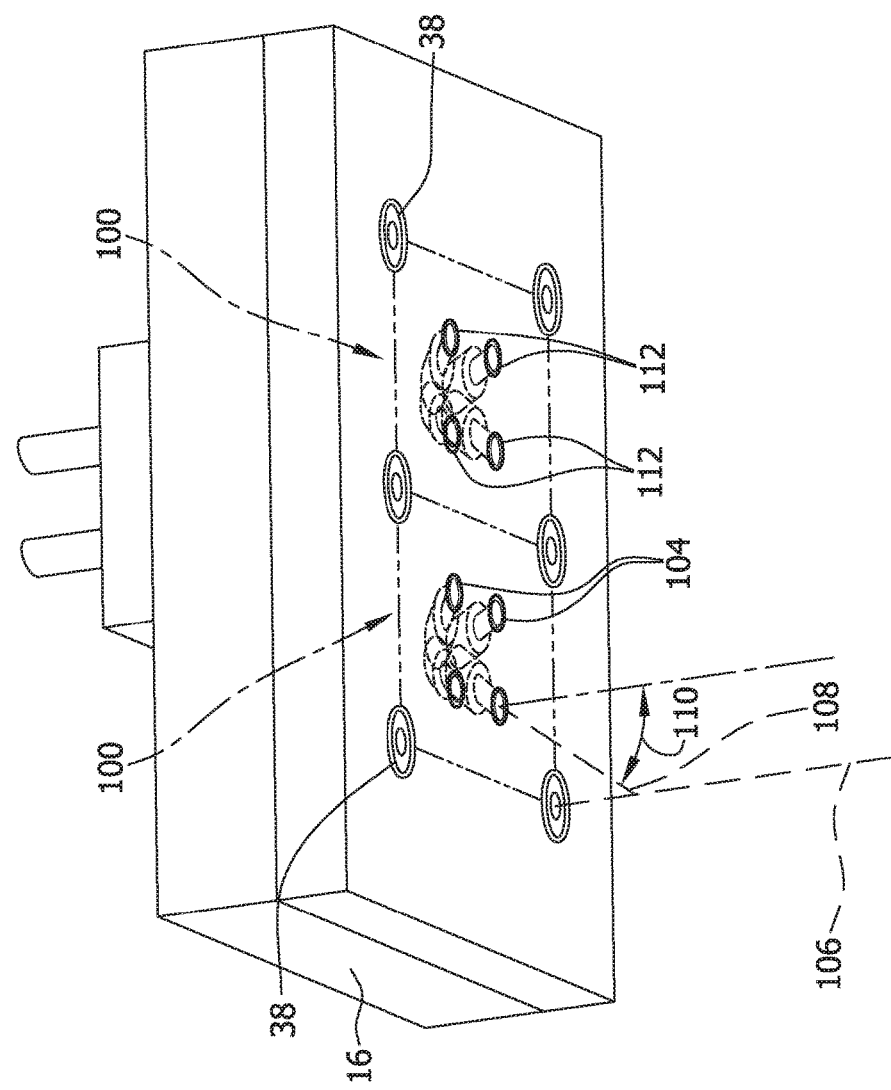
FIG. 12 is a perspective schematic illustration of a manifold head that includes four center nozzles.

Referring now to FIG. 11, in another embodiment the manifold head 16 includes four high pressure nozzles 38 arranged in a rectangular and more suitably a square matrix configuration 100 wherein adjacent nozzles 38 are generally equidistant from each other. In the illustrated embodiment, each of the high pressure nozzles is generally positioned at each corner of the square matrix configuration 100. It is contemplated that more than one square matrix of high pressure nozzles 38 may be formed in the manifold head 16. For example, FIG. 12 illustrates an embodiment wherein six high pressure nozzles 38 form two side-by-side square matrices 100 (or a single rectangular matrix). It is contemplated that the manifold head 16 may include 4+x equidistant high pressure nozzles 38 forming 1+(x/2) side-by-side square matrices 100, wherein x is an even integer greater than 0. It is also contemplated that the high pressure nozzles 38 can be arranged in an orthogonal matrix configuration, for example, a rectangular matrix, an hexagonal matrix, an octagonal matrix, and the like.

As seen in FIGS. 11 and 12, a multiport high pressure nozzle 102 can be positioned in the center of each of the square matrices 100. Each of the illustrated multiport nozzles 102 includes four ports 104 that are angled toward the corners of matrix 100. Each of the high pressure nozzles 38 is orientated so that a discharge stream 106 of termiticide from the nozzle 38 is substantially perpendicular to the bottom surface 52 of the manifold head 16. When the manifold head 16 is positioned on the ground, the discharge stream 106 is substantially normal to the ground surface, e.g., vertical, when the surface of the ground is substantially level. Each of the ports 104 of the multiport nozzle 102 is configured to direct a discharge stream 108 of termiticide from the port to intersect the discharge stream 106 from one of the high pressure nozzles 38. The intersection of the discharge stream 106 from one of the high pressure nozzles 38 by the discharge stream 108 from one of the ports 104 of the multiport high pressure nozzle 102 may be about 1 inch to about 12 inches below the surface of the ground.

An angle off vertical 110 of the discharge stream 108 of one of the ports 104 of the multiport nozzle 102 is based on the depth of intersection desired and the distance between the nozzles 38. The intersection of the discharge streams potentially results in the pooling of some of the injected termiticide. For example, when the high pressure nozzles 38 are 2 inches apart from each other, the angle off vertical 110 of the discharge stream 108 of the port 104 is about 54 degrees for an intersection at one inch below the surface, and about 9 degrees for an intersection at 6 inches below the surface, and about 5 degrees for an intersection at 12 inches below the surface. The soil also fractures due to the "lift-effect" of the solution discharged from the angled nozzles 38. As the solution flows from the nozzles it will deflect on the soil. With the deflected energy the soil is forced up and out away from the discharge stream 108, causing the soil to fracture and opening the soil to more termiticide solution and increasing the distribution of the solution forced out of the nozzles 38.

It is contemplated that the ports 104 of the multiport nozzle 102 can be configured such that the discharge streams of termiticide emitted therefrom are generally vertically and that some or all of the plurality of high pressure nozzles 38 can be configured such that the discharge streams of termiticide emitted therefrom are other than vertical. In one suitable embodiment, the termiticide is emitted from the nozzles 38 in a generally conical discharge stream. It is further contemplated that the ports 104 of the multiport nozzle 102 and the plurality of high pressure nozzles 38 can be configured to emit discharge streams of termiticide that are other than vertical. In either of these arrangements, some or all of the plurality of high pressure nozzles 38 can be configured to emit discharge streams that are angled toward the periphery of the control plate (i.e., away from the multiport nozzle 102) to thereby increase the coverage area of the termiticide and that some or all of the plurality of high pressure nozzles 38 can be configured to emit discharge streams that are angled inward and toward the multiport nozzle 102 for intersecting the discharge streams emitted from the ports 104 of the multiport nozzle.

In operation, the manifold head 16 is positioned on the ground and the operator activates the trigger switch 60 causing the discharge valve 56 to open thereby permitting the predetermined quantity of termiticide to flow to and out each of the high pressure nozzles 38 and each of the ports 104 of the multiport high pressure nozzle 102 thereby injecting termiticide into the ground. The discharge streams 106 of termiticide from each of the high pressure nozzles 38 is injected substantially vertically into the ground. The discharge streams 108 of termiticide from the ports 104 are injected into the ground at an angle off vertical 110 which causes the discharge streams 108 from each of the ports 104 to intersect respective discharge streams 106 from the high pressure nozzles 38 below the surface of the ground.

The angled discharge streams 108 of ports 104 provide for supplying the termiticide to a greater volume of the injection area than just using the high pressure nozzles 38. The angled discharge streams 108 of the ports 104 inject termiticide into the soil within a central injection zone of the injection area, which is located within an outer injection zone defined by the termiticide injected by the high pressure nozzles 38. Injection of termiticide at high pressures causes the soil to fracture as the discharge streams 106, 108 of termiticide pass through the soil. In another embodiment, each of the ports 104 are slightly offset so that their discharge streams 108 of termiticide do not precisely intersect respective discharge streams 106 from the high pressure nozzles 38.

Referring again to FIG. 12, in another embodiment four center high pressure nozzles 112 may be used instead of the multiport nozzle 102. The four center nozzles 112 are collectively positioned in the center of the matrix 100 and are each angled toward a different corner of the square matrix. Similar to the multiport nozzles 102 described above, the center nozzles 112 are configured to direct their discharge streams 108 to intersect a respective discharge stream 106 from one of the high pressure nozzles 38. The intersection of the discharge stream 106 from one of the high pressure nozzle 38 by the discharge stream 108 from one of the center high pressure nozzles 112 may be about 1 inch to about 12 inches below the surface of the soil. The angle off vertical 110 of the discharge stream 108 of the center nozzle 112 is based on the depth of intersection desired and the distance between the high pressure nozzles 38. For example, when high pressure nozzles 38 are 2 inches apart from each other, the angle off vertical 110 of the discharge stream 108 from the center nozzle 112 is about 54 degrees for an intersection at one inch below the surface, and about 9 degrees for an intersection at 6 inches below the surface, and about 5 degrees for an intersection at 12 inches below the surface.

Figure 13:
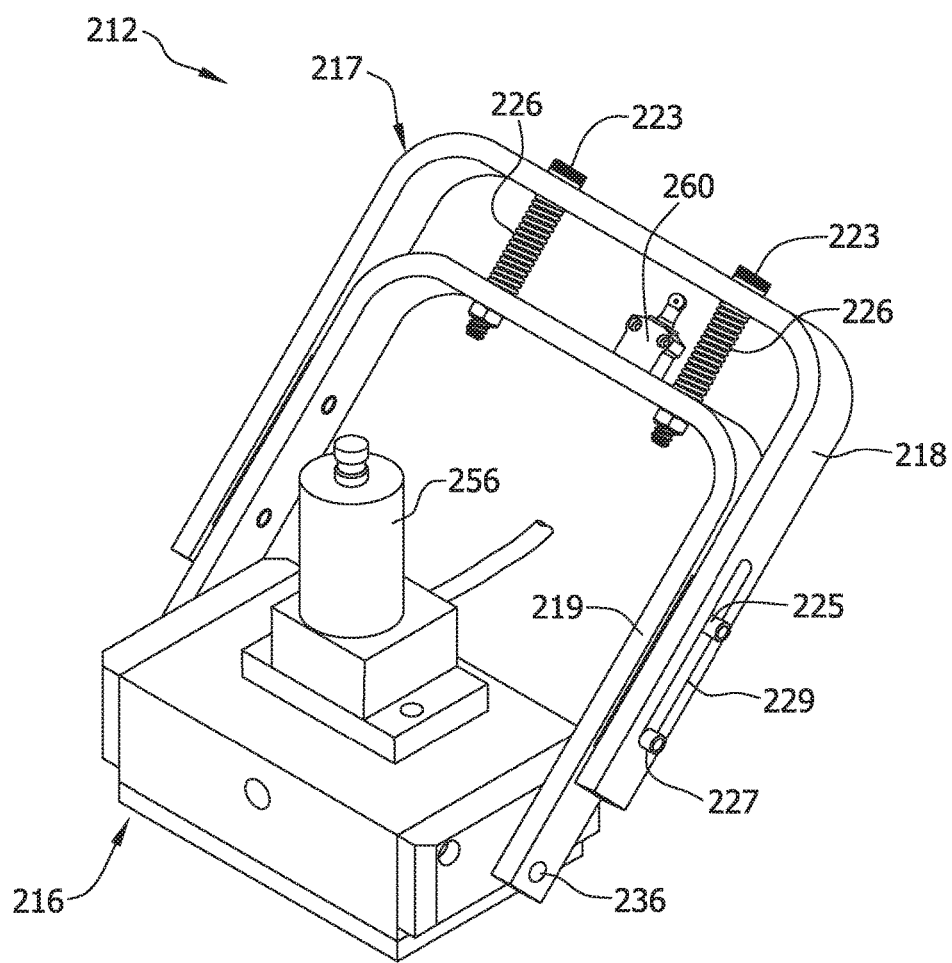
FIG. 13 is a perspective schematic illustration of another embodiment of a handheld application tool.

FIG. 13 is a schematic illustration of another embodiment of a handheld portable application tool 212 (broadly, an "injection apparatus") suitable for use with the high pressure injection system for injecting termiticide into the ground, which was described above. The relative size of the tool 212 makes it suitable for use in tight spaces (e.g., crawl spaces) as well as open spaces (e.g., a lawn). As seen in FIG. 13, the application tool 212 includes a handle 217 and a manifold head 216 mounted to the handle. The manifold head 216, which is pivotally mounted to the handle 217 via a pair of pivot pins 236 (one of the pivot pins being seen in FIGS. 13 and 14), is substantially the same as the manifold head 16 illustrated in FIGS. 1-3. As a result, the manifold head 216 illustrated in FIGS. 13 and 14 will not be described in detail.

Figure 14:
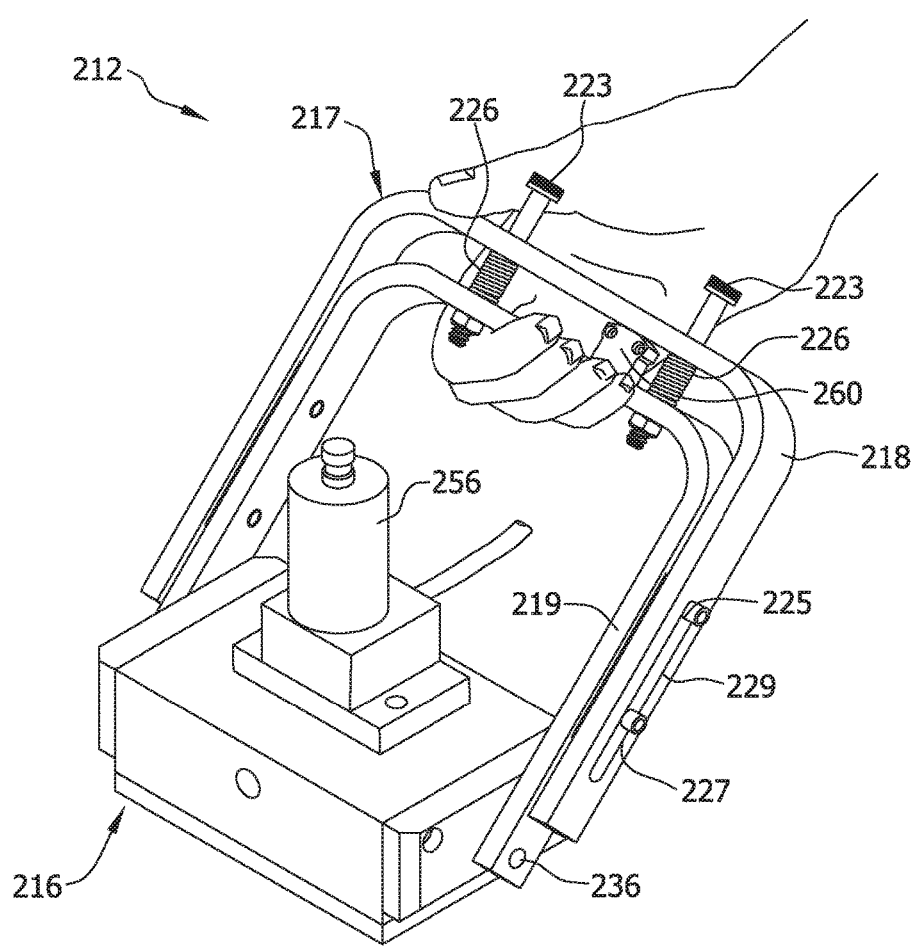
FIG. 14 is a perspective schematic illustration of the handheld application tool of FIG. 13 but with a trigger switch of the tool being actuated.

The handle 217 of the tool 212 includes an upper portion 218 and a lower portion 219. In the illustrated embodiment, both the upper and lower portions 218, 219 of the tool comprise generally U-shaped brackets. The upper portion 218 of the handle 217 can move relative to the lower portion 219 from a first, extended position (FIG. 13) to a second, compressed position (FIG. 14). A biasing element, such as a pair of springs 226, biases the upper portion 218 of the handle 217 toward its first, extended position and away from the lower potion 219. In the illustrated embodiment, each of the springs 226 is mounted on the handle 217 via a bolt 223. In addition, a pair of upper stops 225 and a pair of lower stops 227 are mounted on the lower portion 219 and extend through a slot 229 formed in the upper portion 218 to limit the range of movement of the upper portion relative to the lower portion. One of the upper stops 225 and one of the lower stops 227 are shown in FIGS. 13 and 14. It is understood, however, that any known biasing element 226 may be used and the biasing element can be mounted on the handle 217 in other suitable manners. It is also understood that other types of stops can be used to limit the relative movement between the upper and lower portions 218, 219 of the handle 217.

As illustrated in FIGS. 13 and 14, a trigger switch 260 (broadly, an "actuator") is mounted on the lower portion 219 of the handle 217. The trigger switch 260 is electrically coupled to a discharge valve 256 and activates the discharge valve when the trigger switch is actuated. As seen in FIG. 14, the trigger switch 260 is actuated by the upper portion 218 of the handle 217 being manually pressed into contact with the trigger switch. That is, the trigger switch 260 can be actuated by manually moving the upper portion 218 of the handle 217 from its first, expanded position to its second compressed position by applying a force on the upper portion so that it slides downward relative to the lower portion 219 of the handle until the trigger switch 260 is actuated. Actuation of the trigger switch 260 causes termiticide to be injected into the ground through the manifold 216.

Figure 15:
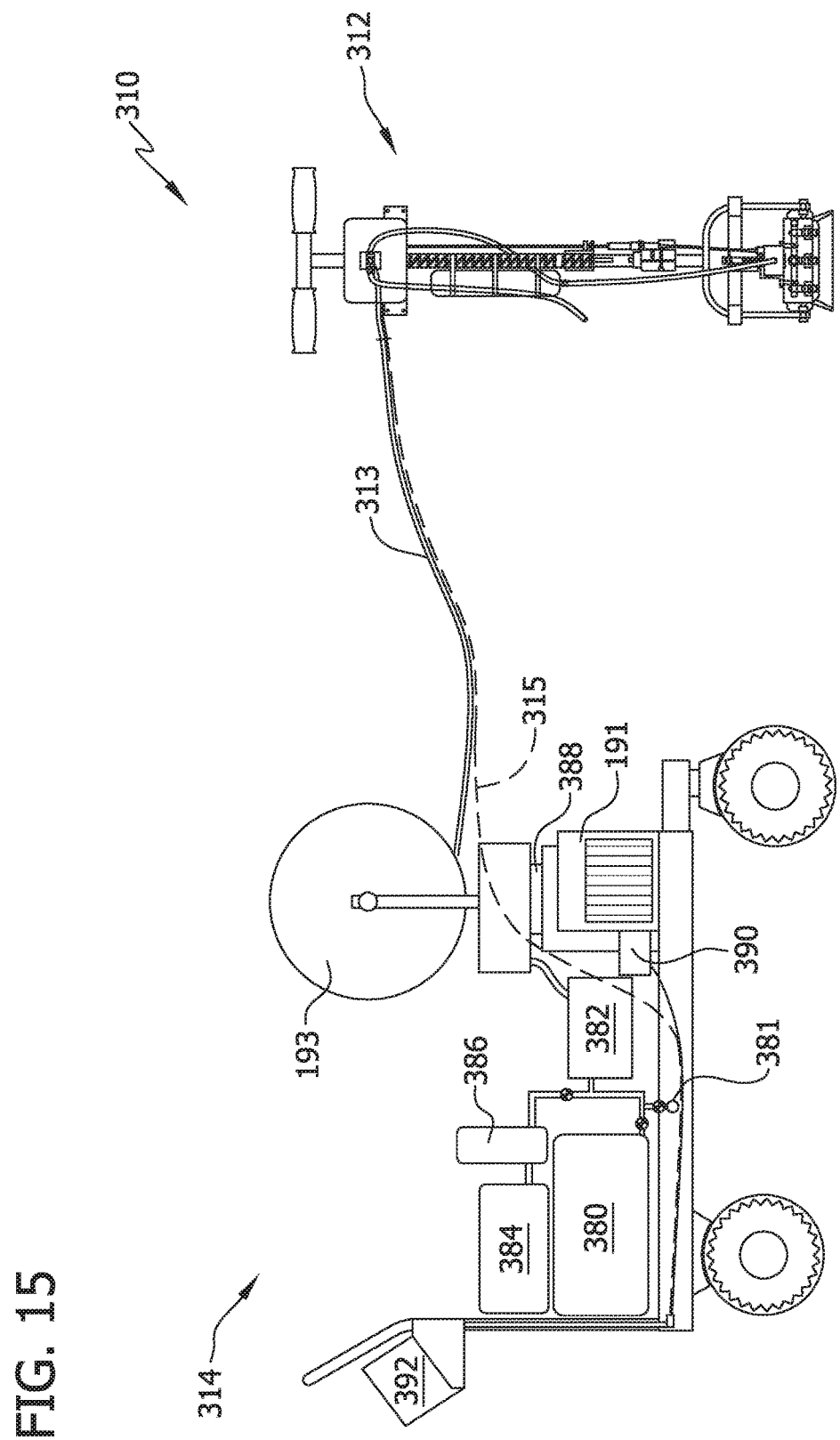
FIG. 15 is a schematic illustration of a high pressure injection system for injecting a termiticide into the ground in accordance with another exemplary embodiment in which the system includes a base unit and a handheld application tool.
Figure 16:
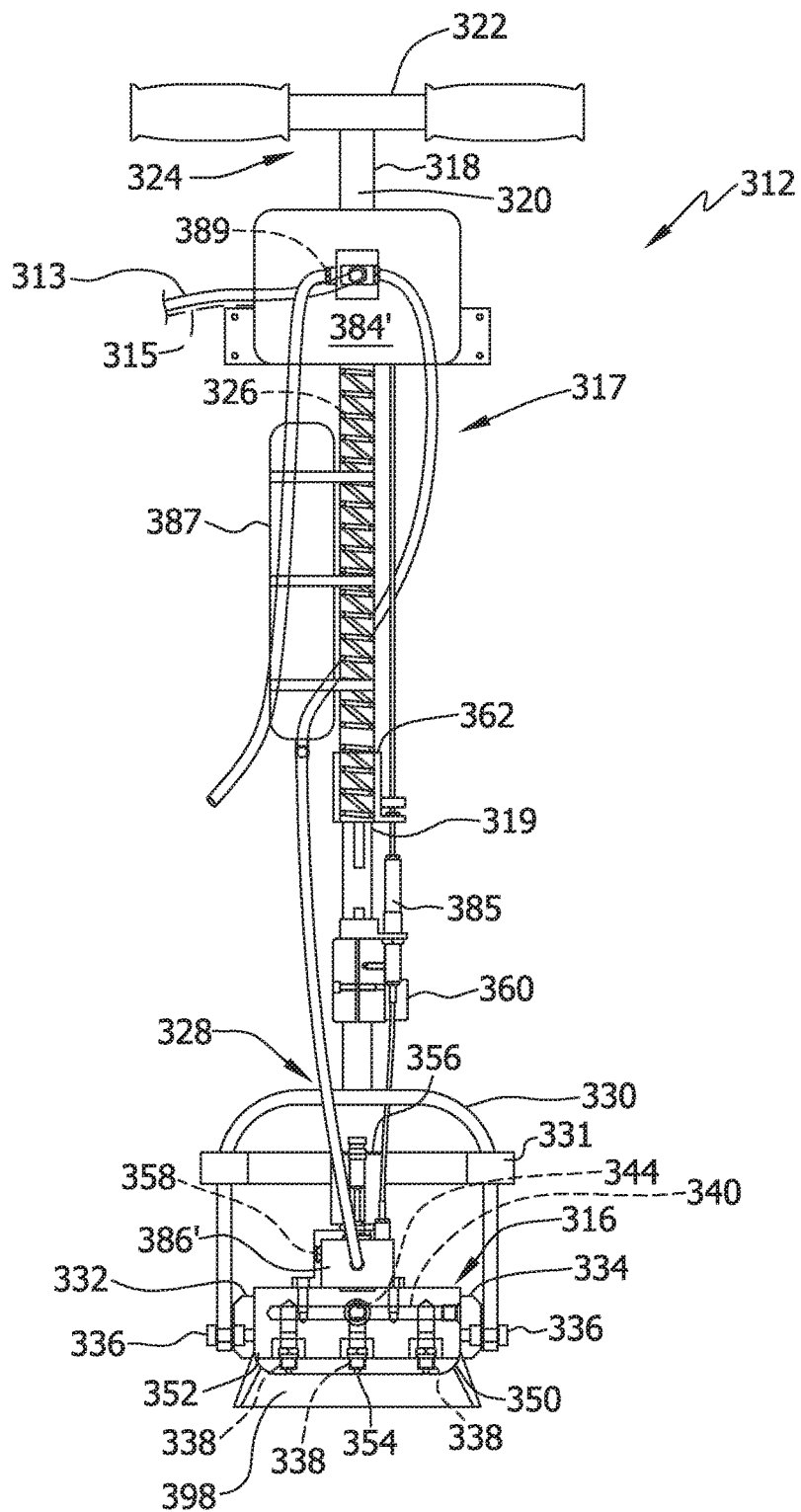
FIG. 16 is a front view schematic illustration of the handheld portable application tool of FIG. 15 with parts cut away.
Figure 17:
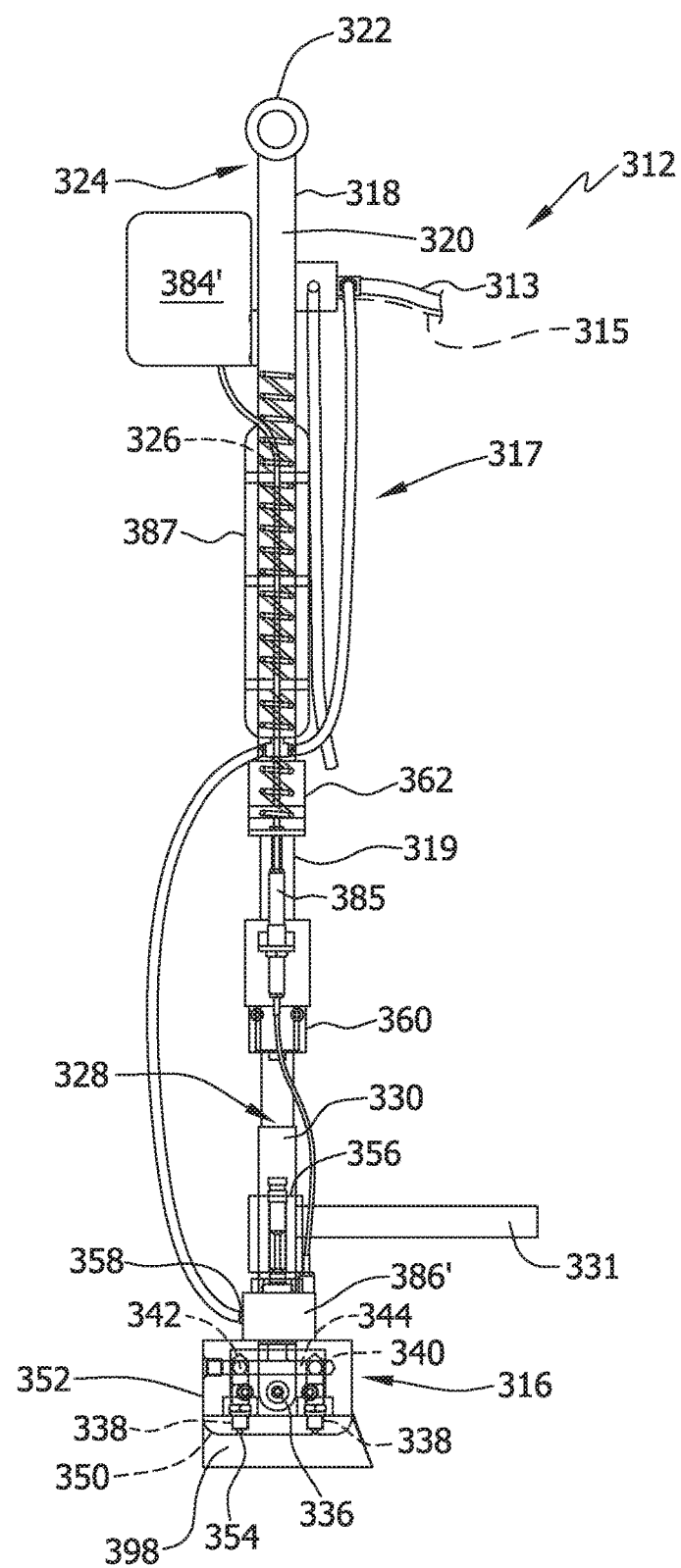
FIG. 17 is a side view schematic illustration of the handheld portable application tool of FIG. 16.

Referring now to FIGS. 15-17, these Figures schematically illustrate a high pressure injection system 310 for injecting termiticide (or other suitable treatment) into the ground in accordance with another exemplary embodiment. As seen in FIG. 15, the injection system 310 includes a handheld portable application tool 312 (broadly, an "injection apparatus") and a supply cart 314 (broadly, a "base unit"). The application tool 312 is connected to the cart 314 via a conduit 313 (e.g., a hose) defining a fluid passageway and at least one electrical connection 315. The conduit 313 permits fluid (e.g., water and/or a termiticide solution) to flow from the cart 314 to the application tool 312. The electrical connection 315 is used for transmitting various control signals between the application tool 312 and the cart 314.

FIG. 16 is a front view schematic illustration of the handheld portable application tool 312, and FIG. 17 is a side view schematic illustration of the application tool 312. The handheld portable application tool 312 includes a handle 317 and a manifold head 316 mounted to the handle. The handle 317 includes an upper portion 318 and a lower portion 319. The upper portion 318 includes a tubular section 320 and a hand grip section 322 attached to an upper end 324 of the tubular section 320. As a result, the upper portion 318 of the handle 317 has a generally T-shape. The lower portion 319 of the handle 317, which is also tubular, is sized for insertion into the tubular section 320 of the upper portion 318 of the handle. With the lower portion 319 of the handle 317 inserted into the tubular section 320 of the upper portion 318 of the handle, the upper portion can move with respect to the lower portion from a first, extended position to a second, compressed position. A biasing element, such as a spring 326, is provided to bias the upper portion 318 of the handle 317 toward its first, extended position. It is understood, however, that any known biasing element 326 may be used. A flange (not shown) or other suitable retainer(s) may be provided to inhibit the lower portion 319 of the handle 317 from being pulled or otherwise withdrawn from the upper portion 318 to thereby ensure that the lower portion remains telescopically attached to the upper portion.

A lower end 328 of lower portion 319 of the handle 317 is attached to an inverted U-shaped attachment bracket 330. The manifold head 316 is pivotally attached at each of its ends 332, 334 to the attachment bracket 330 via a pair of pivot pins 336. It is contemplated that one or more stops (not shown) can be provided to limit the pivoting movement of the handle 317 relative to the manifold 316. Attached to the U-shaped attachment bracket 330 is a foot bracket 331. During use of the tool 312, the user can place one of his/her feet on the foot bracket 331 to inhibit movement of the tool during an injection.

The manifold head 316 includes at least one internal passage to distribute the termiticide to a plurality of high pressure nozzles 338 in fluid communication with the internal passage. As seen in FIG. 17, the illustrated manifold head 316 includes two main internal passages 340, 342, and a cross passage 344 connecting main internal passages. It is contemplated that the manifold head 316 may include any number of high pressure nozzles 338. For example, the manifold head 316 of the exemplary embodiment has a matrix of six high pressure nozzles 338 with each nozzle generally equidistant from each other. Each of the high pressure nozzles 338, in one embodiment, has an orifice diameter ranging from about 0.002 inch to about 0.01 inch.

With reference again to FIG. 16, a contact plate 350 is attached to a bottom surface 352 of the manifold head 316 to protect the high pressure nozzles 338. In the illustrated embodiment, the contact plate 350 includes a plurality of openings 354 with each of the openings being generally aligned with a respective one of the plurality of high pressure nozzles 338. As a result, the high pressure nozzles 338 are spaced from the soil by the contact plate 350 and therefore do not directly contact the soil. Moreover, the contact plate 50 shields or otherwise blocks soil, rocks, and/or other debris that may be "kicked-up" during the injection of the termiticide. As seen in FIG. 17, the contact plate 350 includes rounded edges to facilitate sliding (e.g., dragging) of the tool 312. The contact plate 350 can be made from any suitable material, for example, metal and/or plastic.

In this embodiment, a kick guard 398 extends outward from three sides on the contact plate 350 to further shield or otherwise block soil, rocks, and/or other debris that may be "kicked-up" during the injection of the termiticide. In the illustrated embodiment, one side of the contact plate 350 is free from the kick guard 398 to facilitate placement of the contact plate and manifold head 316 in close proximity to objects and structures. It is understood, however, that the kick guard 398 can extend around the entire periphery (i.e., all four sides) of the contact plate 350. In one suitable embodiment, the kick guard 398 is made from three pieces of suitable rubber material, which each piece of rubber material extending outward from a respective side of the contact plate 350. It is understood, however, that the kick guard 398 can have other suitable configurations (e.g., bristles, strips, flaps) and be made from any suitable material.

As illustrated in FIG. 16, a discharge valve 356 is attached to the manifold head 316 and is in fluid communication with the internal passages 340, 342, 344 in the manifold head and a supply of termiticide. The discharge valve 356 is moveable between an opened position and a closed position. When the discharge valve is in its closed position, termiticide solution is inhibited from flowing to the internal passages 340, 342, 344 in the manifold head via the high pressure inlet port 358. When the discharge valve 356 is opened, the termiticide solution flows into inlet port 358 under high pressure. From the inlet port 358, the pressurized termiticide solution flows into internal passages 340, 342, 344 of the manifold head 316 and through the high pressure nozzles 338 from which the termiticide solution is injected into the ground. In one embodiment, the termiticide solution is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 356 is a solenoid operated poppet valve capable of sufficiently rapid operation to allow opening and closing of the discharge valve 356 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 312.

As illustrated in FIG. 16, a trigger switch 360 (broadly, an "actuator") is mounted on the lower portion 319 of the handle 317 and a trigger switch actuator 362 is mounted on the upper portion 318. The trigger switch 360, which is electrically coupled to the discharge valve 356, activates the discharge valve 356 when the trigger switch actuator 362 engages the trigger switch 360. In the illustrated embodiment and as seen in FIG. 16, the trigger switch actuator 362 is engaged with the trigger switch when the upper portion 318 of the handle 317 is moved to its second, compressed position. Thus, the trigger switch 360 can be actuated by moving the upper portion 318 of the handle 317 from its first, expanded position to its second compressed position by applying a force on the upper portion so that it slides downward relative to the lower portion 319 of the handle until the trigger switch actuator engages the trigger switch 360.

In one suitable embodiment, a kill switch (not shown) can be located on the hand grip section 322 of the upper portion 318 of the handle 317 where it can be actuated by the operator to quickly and easily shut the system 310 off. It is contemplated that the kill switch can be located on other portions of the tool 312 besides the hand grip section 322 of the handle 317. It is also contemplated that a kill switch can be provided on the cart 314 in addition to or instead of the kill switch located on the tool 312. It is further contemplated that the kill switch can be programmed into the system (i.e., a controller) whereby if the discharge valve 356 does not open within a specified time interval it will cause a clutch to disengage from the pressure manifold and/or kill the engine.

In this embodiment, a first termiticide concentrate reservoir 384' and a dosing device 385 are mounted on the handle 317 of the tool 312. The dosing device 385 is in fluid communication with termiticide concentrate reservoir 384' and is adapted to deliver a predetermined amount (i.e., a dose) of concentrated termiticide to a suitable first mixing device 386' each time the trigger switch 360 is actuated. In one suitable embodiment, the dosing device 385 is adjustable so that the predetermined amount of concentrated termiticide can be adjusted. In another suitable embodiment, the dosing device 385 is non-adjustable. That is, the amount of concentrated termiticide delivered to the mixing device 386' each time the trigger switch 360 is actuated cannot be changed without replacement of the dosing device. One suitable dosing device 385 is available from SMC Corporation of America of Indianapolis, Ind. as part no. NCMB075-0125. In the illustrated embodiment, the mixing device 386' is mounted on top of the manifold head 316 but it is understood that the mixing device can be otherwise mounted. For example, the mixing device 386' can be mounted on the lower portion 319 of the handle 317.

With reference still to FIG. 16, a pressure accumulator 387 is mounted to the handle 317. The pressure accumulator 387 is adapted to store pressurized water (or other suitable carrier liquids) from the cart 314 prior to it being delivered to the mixing device 386'. The pressure accumulator 387 minimizes the effect of the pressure drop between the cart 314 and the mixing device 386'. Thus, the pressure accumulator 387 provides pressurized water from the cart 314 to the mixing device 386' at a higher pressure than if the pressurized water was delivered directly to the mixing device from the cart.

In the embodiment illustrated in FIG. 15, the cart 314 includes a water reservoir 380, a high pressure pump 382, a second termiticide concentrate reservoir 384, and a second mixing device 386 that is capable of supplying the appropriate amount of termiticide concentrate to be mixed with the appropriate amount of water to form the termiticide solution. A water inlet 381 for receiving water from an external water source (e.g., a standard residential water spigot) is also provided. It is contemplated that either the water reservoir 380 or the water inlet 381 can be omitted.

The supply cart 314 also includes a gasoline engine 388 with a generator 390 for generating power for operating the pressure pump 382 and generating electrical current for operating a controller 392 associated with the system 310. In another embodiment, electrical power can be supplied by connecting into an electrical outlet located at the application site. A radiator 191 is provided to cool the pressurized water being driven by the high pressure pump 382. In the illustrated embodiment, a hose reel 193 is mounted on the cart 314 for winding the hose 313 that extends between the cart 314 and the application tool 312. A pressurized water bypass 389 is provided on the handle 317 of the tool 312 for allowing pressurized water to be discharged prior to the pressure accumulator 387. The bypass 389 can be used to facilitate priming of the high pressure pump 382 and flushing termiticide solution from the hose 313.

The controller 392 permits the operator of the system 310 to selectively set a pulse duration for termiticide injections. The controller 392 may be programmable to permit the operator to enter parameters associated with a particular manifold head 316 in use, such as by defining the number of orifices and their sizes, parameters with a termiticide solution in use, such that dosing through the mixing device 386 can be properly controlled, or the number of injections can be tracked, and the like.

To inject the termiticide into the ground, the operator positions handheld portable application tool 312 such that the contact plate 350 is in contact with the surface of the ground. A downward force between about 15 to 20 pounds is applied by the operator to the upper portion 318 of the handle 317 to move the upper portion 318 from its first position to its second position and thereby cause the trigger switch actuator 362, which is mounted to the upper portion, to engage the trigger switch 360, which is mounted to the lower portion 319. Engagement of the trigger switch actuator 362 and the trigger switch 360 actuates the discharge valve 356. More specifically, an electronic signal is sent from the trigger switch 360 to the discharge valve 356 causing the discharge valve to move from its closed position to its opened position for a programmed amount of time.

In addition, movement of the upper portion 318 of the handle 317 relative to the lower portion 319 causes a predetermined amount of termiticide concentrate to be delivered by the dosing device 385 from the first termiticide concentrate reservoir 384' to the mixing device 386'. Opening the discharge valve 356 causes the pressure accumulator 387 to release at least a portion of the pressurized water stored therein to the mixing device 386'. The termiticide concentration and pressurized water mix within the mixing device 386' to form a termiticide solution. The termiticide solution is then driven to the manifold head 316 where it flows to and out the high pressure nozzles 338 for injection into the ground.

The operator then releases the pressure from the handle 317, which resets the trigger switch 360, the dosing device 385, and the pressure accumulator 387. More specifically, the spring 326 causes the upper portion 318 of the handle 317 to move back to its first, extended position. The illustrated trigger switch 360 is configured to work only once during each compression of handle 317 to prevent repeated opening of the discharge valve 356 until the handle 317 has been reset.

The depth of penetration of the termiticide solution into the ground is a function of the pressure at which the termiticide solution is discharged from the tool 312, the duration for which the discharge valve 356 remains open, and the type of soil into which the termiticide is discharged. In one suitable embodiment, the penetration of termiticide into the ground is between about 12 to 16 inches.

The second termiticide concentrate reservoir 384 and the second mixing device 386, which are mounted on the cart 314, allow the cart to be used for low pressure applications. Low pressure applications of termiticide can be carried out using the application tool 312 illustrated herein or using conventional rodding techniques. It is understood that the second termiticide concentrate reservoir 384 and the second mixing device 386 can be omitted.

Figure 18:
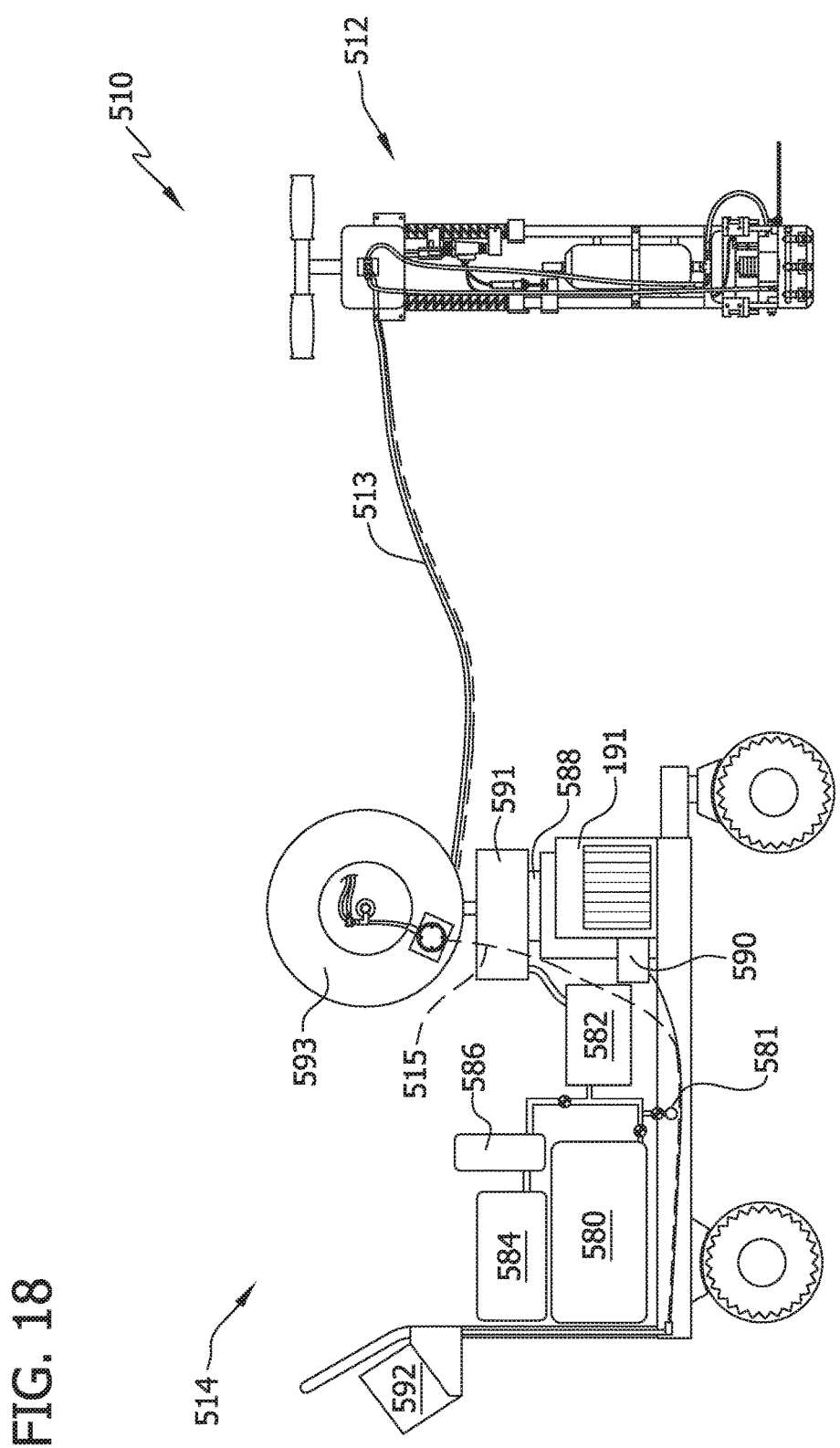
FIG. 18 is a schematic illustration of a high pressure injection system for injecting a termiticide into the ground in accordance with another exemplary embodiment in which the system includes a base unit and a handheld application tool.

Referring now to FIGS. 18-22, these Figures illustrate a high pressure injection system, indicated generally at 510, for injecting termiticide (or other suitable soil treatment) into the ground in accordance with yet another exemplary embodiment. As seen in FIG. 18, the injection system 510 includes a handheld portable application tool 512 (broadly, an "injection apparatus") and a supply cart 514 (broadly, a "base unit"). The application tool 512 is connected to the cart 514 via a conduit 513 (e.g., a hose) defining a fluid passageway and at least one electrical connection 515. The conduit 513 permits fluid (e.g., water and/or a termiticide solution) to flow from the cart 514 to the application tool 512. The electrical connection 515 is used for transmitting various control signals between the application tool 512 and the cart 514.

Figure 19:
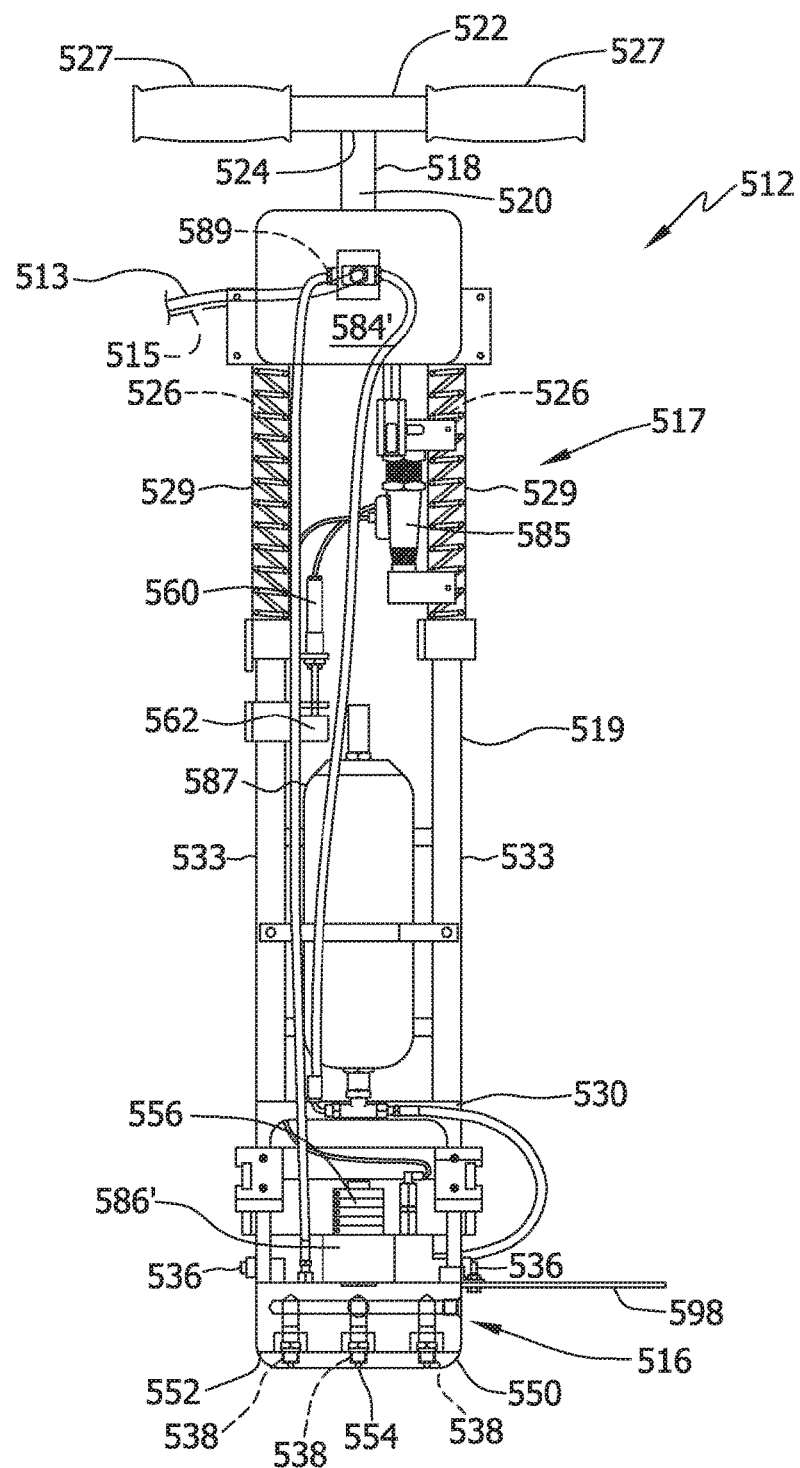
FIG. 19 is a front view schematic illustration of the handheld portable application tool of FIG. 18.
Figure 20:
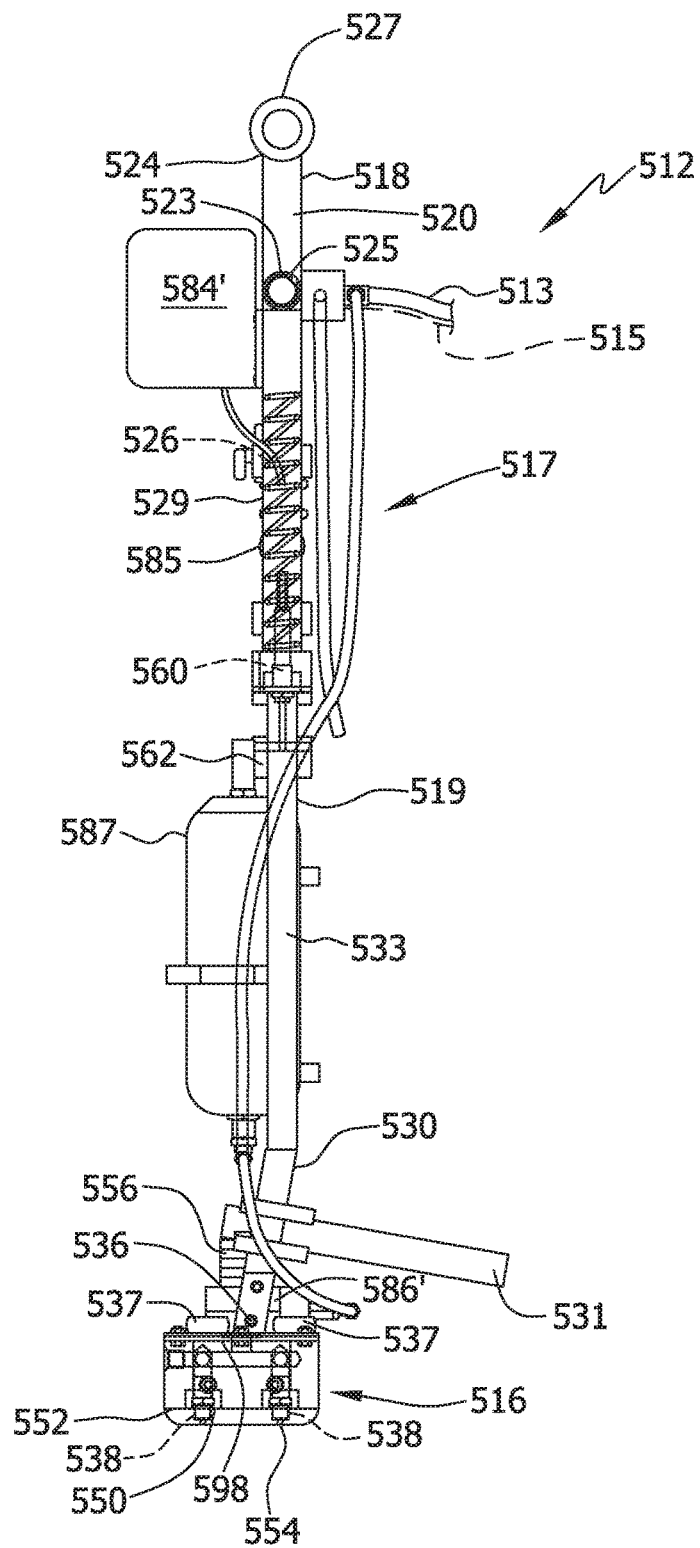
FIG. 20 is a side view schematic illustration of the handheld portable application tool of FIG. 18.
Figure 21:
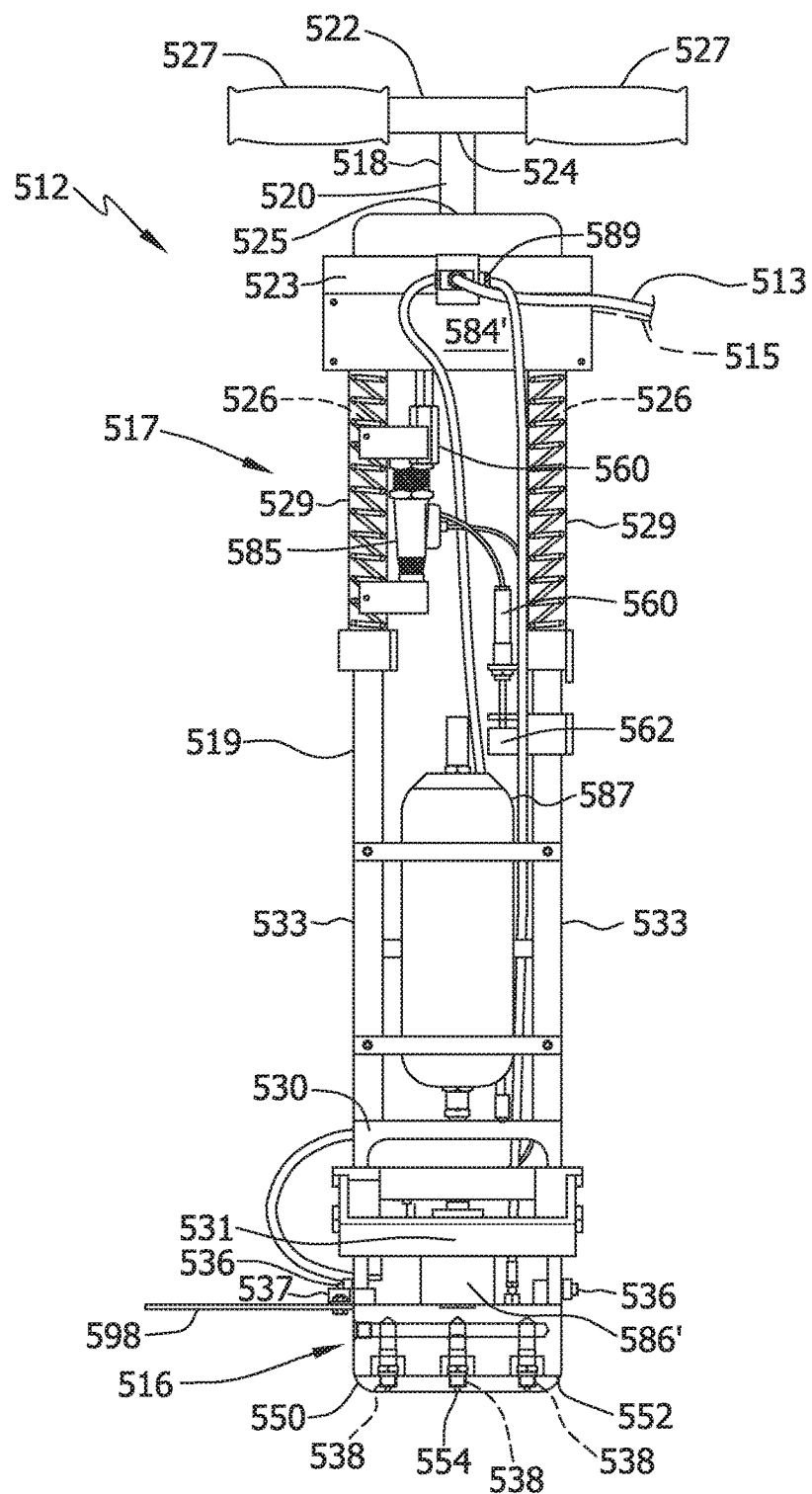
FIG. 21 is a back view schematic illustration of the handheld portable application tool of FIG. 18.

With reference now to FIGS. 19-21, the handheld portable application tool 512 includes a handle 517 and a manifold head 516 mounted to the handle. The handle 517 includes an upper portion 518 and a lower portion 519. The upper portion 518 includes a tubular section 520, a first hand grip section 522 attached to an upper end 524 of the tubular section, and a second hand grip section 523 attached to a lower end 525 of the tubular section. A pair of hand grips 527 is selectively moveable between the first hand grip section 522 and the second hand grip section 523. In the illustrated embodiment, for example, both the first hand grip section 522 and the second hand grip section 523 include a pair of thread sockets for receiving one of the hand grips 527, which are also threaded. As a result, the user can selectively move the hand grips 527 between the first hand grip section 522, which is designed to accommodated taller users, and second hand grip section 523, which is designed to accommodate shorter users. The upper portion 518 also includes two spaced-apart tubular shafts 529 extending downward from the second hand grip section 523.

The lower portion 519 of the handle 517 has two spaced-apart tubular shafts 533 configured for insertion into the tubular shafts 529 of the upper portion 518 of the handle. With the two tubular shafts 533 of the lower portion 519 inserted into the two tubular shafts 529 of the upper portion 518, the upper portion can move with respect to the lower portion from a first, extended position to a second, compressed position. It is understood that in some embodiments the upper and lower portions 518, 519 of the handle 517 can have more than two tubular shafts 529, 533. A biasing element, such as a pair of springs 526, is provided to bias the upper portion 518 of the handle 517 toward its first, extended position. In the illustrated embodiment, one spring 526 is disposed in one of the tubular shafts 529 of the upper portion 518 of the handle 517 and the other spring is disposed in the other one of the tubular shafts of the upper portion. It is understood, however, that any suitable biasing element 526 may be used. A flange (not shown) or other suitable retainer(s) may be provided to inhibit the lower portion 519 of the handle 517 from being pulled or otherwise withdrawn from the upper portion 518 to thereby ensure that the lower portion remains telescopically attached to the upper portion.

The two tubular shafts 533 of the lower portion 519 of the handle 517 are attached to an inverted U-shaped attachment bracket 530. As seen in FIG. 20, the inverted U-shaped attachment bracket 530 is angled relative to the handle 517 to facilitate placement of the manifold head 516 adjacent to and beneath structures (e.g., buildings, vegetation, fences). In the illustrated embodiment, the bracket 530 is angled about 10 degrees relative to the handle 517. It is understood, however, that the bracket 530 can be arranged at any suitable angle (e.g., any angle between about 0 degrees and about 45 degrees) relative to the handle 517. It is understood that the U-shaped attachment bracket 530 can be omitted and the manifold head 516 be attached to the two tubular shafts 533 of the lower portion 519.

In one suitable embodiment, the manifold head 516 is pivotally attached at each of its ends to the attachment bracket 530 via a pair of pivot pins 536. As a result, the handle 517 can be moved relative to manifold head 516. A pair of stops 537 is provided to limit the pivoting movement of the handle 517 relative to the manifold 516. The stops 537 inhibit the handle 517 from pivoting relative to the manifold head 516 beyond a predetermined range of motion. Suitably, the stops 537 inhibit the handle 517 from pivoting into contact with the conduit 513. Attached to the U-shaped attachment bracket 530 is a foot bracket 531. During use of the tool 512, the user can place one of his/her feet on the foot bracket 531 to inhibit movement of the tool during an injection.

The manifold head 516 includes at least one internal passage to distribute the termiticide to a plurality of high pressure nozzles 538 in fluid communication with the internal passage. It is contemplated that the manifold head 516 may include any number of high pressure nozzles 538. For example, the manifold head 516 of the illustrated exemplary embodiment has a matrix of six high pressure nozzles 538 with each nozzle generally equidistant from each other.

A contact plate 550 is attached to a bottom surface 552 of the manifold head 516 to protect the high pressure nozzles 538. In the illustrated embodiment, the contact plate 550 includes a plurality of openings 554 with each of the openings being generally aligned with a respective one of the plurality of high pressure nozzles 538. As a result, the high pressure nozzles 538 are spaced from the soil by the contact plate 550 and therefore do not directly contact the soil. Moreover, the contact plate 550 shields or otherwise blocks soil, rocks, and/or other debris that may be "kicked-up" during the injection of the termiticide. The contact plate 550 includes at least one rounded edge to facilitate sliding (e.g., dragging) of the tool 512. The contact plate 550 can be made from any suitable material, for example, metal and/or plastic.

In this embodiment, a kick guard 598 extends outward from one side (e.g. the trailing side) on the contact plate 550 to further shield or otherwise block soil, rocks, and/or other debris that may be "kicked-up" during the injection of the termiticide. More specifically, the kick guard 598 inhibits debris from being "kicked-up" by injected termiticide exiting through openings in soil created by the previous injection. Thus, the illustrated kick guard 598 is sized and shaped to generally overlie the previous injection site. In one suitable embodiment, the kick guard 598 is made from a single piece of suitable rubber material. It is understood, however, that the kick guard 598 can have other suitable configurations (e.g., bristles, strips, flaps) and be made from any suitable material.

As illustrated in FIG. 19, a discharge valve 556 is attached to the manifold head 516 and is in fluid communication with the internal passages in the manifold head and a supply of termiticide. The discharge valve 556 is moveable between an opened position and a closed position. When the discharge valve is in its closed position, termiticide solution is inhibited from flowing to the internal passages in the manifold head. When the discharge valve 556 is opened, the termiticide solution flows under high pressure into the internal passages in the manifold head and through the high pressure nozzles 538 from which the termiticide solution is injected into the ground. In one embodiment, the termiticide solution is pressurized to a pressure of about 25 psi to about 10,000 psi, and in another embodiment, from about 1,000 psi to about 7,000 psi, and in yet another embodiment, at about 4,000 psi.

In one suitable embodiment, the discharge valve 556 is a solenoid operated poppet valve capable of sufficiently rapid operation to allow opening and closing of the discharge valve 556 within the desired time parameters to allow correct depth penetration of the soil based on the pressure in use and correct volume of termiticide solution for the specific application. While it is possible to use a hydraulically actuated valve, the size and weight constraints of such a valve may otherwise limit the utility of the handheld application tool 512.

As illustrated in FIGS. 19 and 21, a trigger switch actuator 562 is mounted on the lower portion 519 of the handle 517 and a trigger switch 560 (broadly, an "actuator") is mounted on the upper portion 518 such that it faces downward toward the trigger switch actuator and is disposed between the tubular shafts 529, 533 of the upper and lower portions of the handle. The trigger switch 560, which is electrically coupled to the discharge valve 556, activates the discharge valve 556 when the trigger switch actuator 562 engages the trigger switch 560. In the illustrated embodiment, the trigger switch actuator 562 is engaged by the trigger switch when the upper portion 518 of the handle 517 is moved to its second, compressed position. Thus, the trigger switch 560 can be actuated by moving the upper portion 518 of the handle 517 from its first, expanded position to its second compressed position by applying a force on the upper portion so that it slides downward relative to the lower portion 519 of the handle until the trigger switch engages the trigger switch actuator. Mounting the trigger switch 560 on the upper portion 518 of the handle 517, such that it faces downward and is disposed between the tubular shafts 529 of the upper portion, inhibits inadvertent actuation of the trigger switch 560.

In this embodiment, a first termiticide concentrate reservoir 584' and a dosing device 585 are mounted on the handle 517 of the tool 512. As seen in FIG. 19, the first termiticide concentrate reservoir 584' is mounted to each of the tubular shafts 529 of the upper portion 518 of the handle such that the first termiticide concentrate reservoir is generally aligned along a longitudinal axis of the tool 512. As a result, the weight of the first termiticide concentrate reservoir 584' is distributed generally equally between the two tubular shafts 529 of the upper portion 518. As also seen in FIG. 19, the dosing device 585 is mounted to the lower portion 519 of the handle 517 such that it is disposed between the two tubular shafts 533 of the lower portion. As a result, the tubular shafts 533 of the lower portion 519 of the handle 517 provide some protection for or shielding of the dosing device 585.

The dosing device 585 is in fluid communication with termiticide concentrate reservoir 584' and is adapted to deliver a predetermined amount (i.e., a dose) of concentrated termiticide to a suitable first mixing device 586' each time the trigger switch 560 is actuated. In one suitable embodiment, the dosing device 585 is adjustable so that the predetermined amount of concentrated termiticide can be adjusted. In another suitable embodiment, the dosing device 585 is non-adjustable. That is, the amount of concentrated termiticide delivered to the mixing device 586' each time the trigger switch 560 is actuated cannot be changed without replacement of the dosing device. One suitable dosing device 585 is available from SMC Corporation of America of Indianapolis, Ind. as part no. NCMB075-0125. In the illustrated embodiment, the mixing device 586' is mounted on top of the manifold head 516 but it is understood that the mixing device can be otherwise mounted. For example, the mixing device 586' can be mounted on the lower portion 519 of the handle 517.

A pressure accumulator 587 is mounted to the handle 517. More specifically, the pressure accumulator 587 is mounted between the two tubular shafts 533 of the lower portion 519 of the handle 517 such that the pressure accumulator is generally aligned along a longitudinal axis of the tool 512. As a result, the weight of the pressure accumulator is distributed generally equally between the two tubular shafts 533 of the lower portion 519. The pressure accumulator 587 is adapted to store pressurized water (or other suitable carrier liquids) from the cart 514 prior to it being delivered to the mixing device 586'. The pressure accumulator 587 minimizes the effect of the pressure drop between the cart 514 and the mixing device 586'. Thus, the pressure accumulator 587 provides pressurized water from the cart 514 to the mixing device 586' at a higher pressure than if the pressurized water was delivered directly to the mixing device from the cart.

In the embodiment illustrated in FIG. 18, the cart 514 includes a water reservoir 580, a high pressure pump 582, a second termiticide concentrate reservoir 584, and a second mixing device 586 that is capable of supplying an appropriate amount of termiticide concentrate to be mixed with an appropriate amount of water to form the termiticide solution. A water inlet 581 for receiving water from an external water source (e.g., a standard residential water spigot) is also provided. It is contemplated that either the water reservoir 580 or the water inlet 581 can be omitted.

The supply cart 514 also includes a gasoline engine 588 with a generator 590 for generating power for operating the pressure pump 582 and generating electrical current for operating a controller 592 associated with the system 510. In another embodiment, electrical power can be supplied by connecting into an electrical outlet located at the application site. A clutch mechanism 591 is provided to disengage the high pressure pump 582 between injections (or after a predetermined time interval) and thereby inhibit the water being driven by the high pressure pump from being heated. In the illustrated embodiment, a hose reel 593 is mounted on the cart 514 for winding the conduit 513 that extends between the cart 514 and the application tool 512. A pressurized water bypass 589 is provided on the handle 517 of the tool 512 for allowing pressurized water to be discharged prior to the pressure accumulator 587. The bypass 589 can be used to facilitate priming of the high pressure pump 582 and flushing termiticide solution from the conduit 513. In one suitable embodiment, the bypass 589 is fluidly connected to the manifold head 516 for allowing liquid (e.g., water, termiticide solution), gases (e.g., air) or the combination of the two passing through the bypass to be discharged beneath the manifold head.

Figure 22:
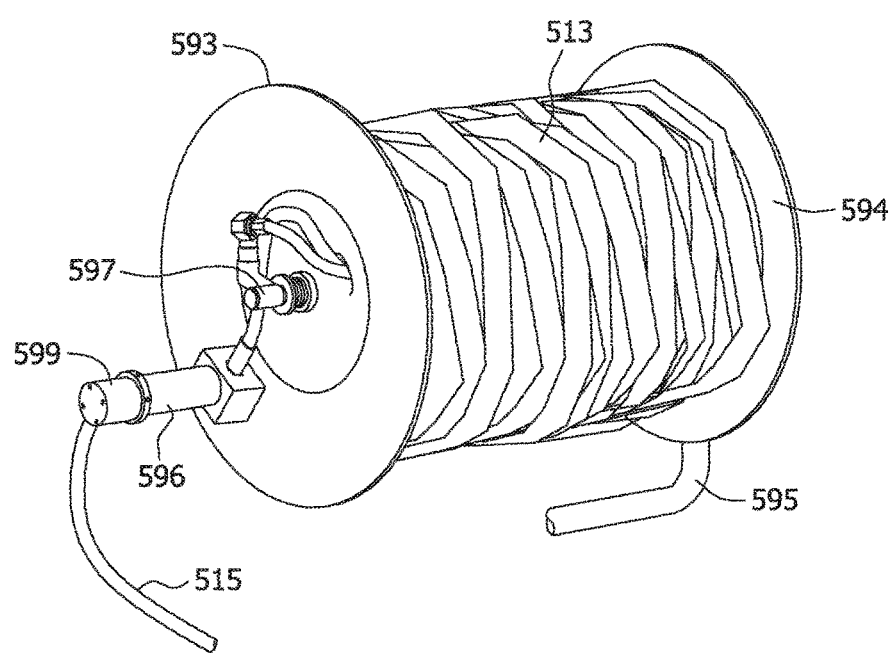
FIG. 22 is an enlarged perspective schematic illustration of a hose reel removed from the base unit of FIG. 18.
Figure 23:
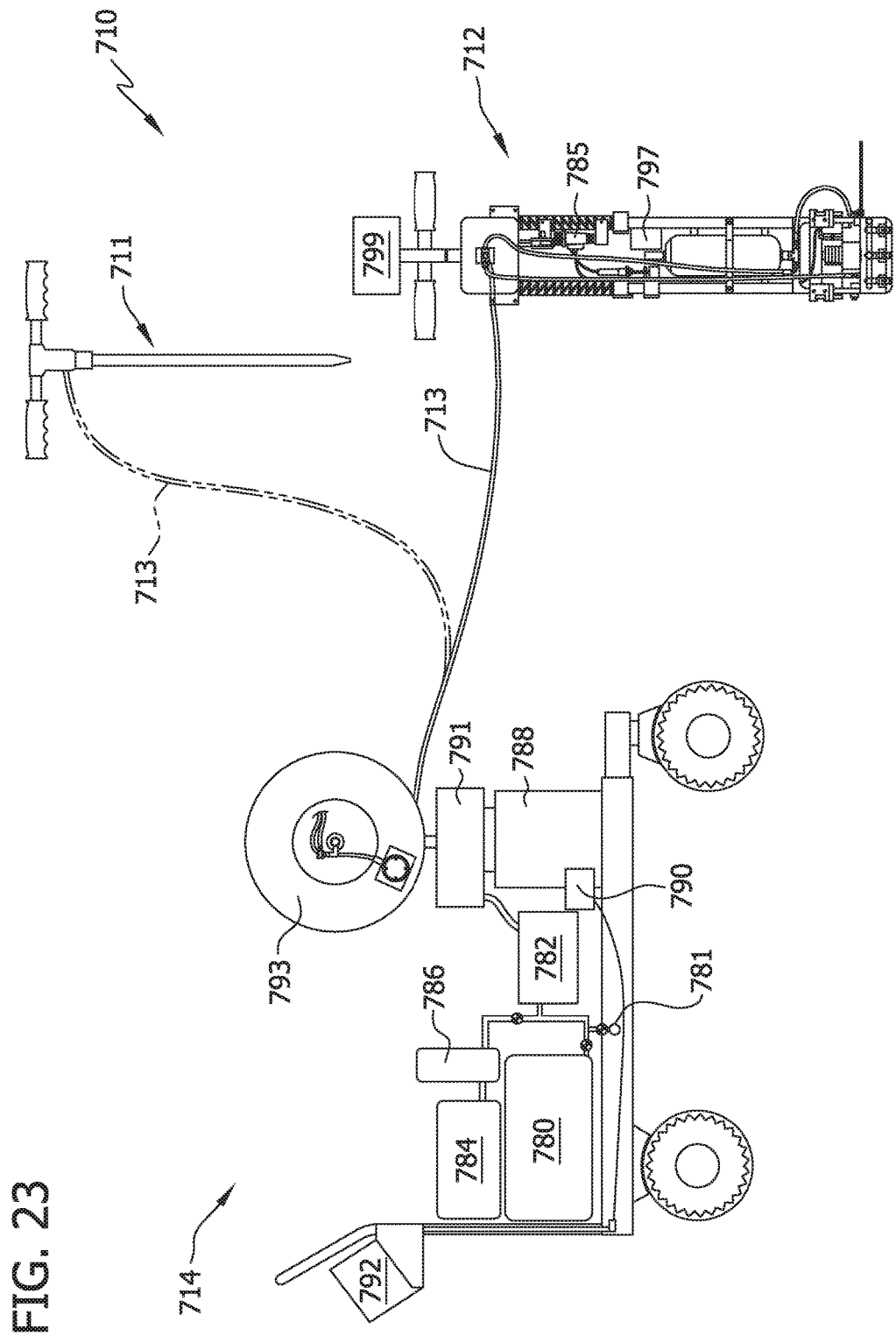
FIG. 23 is a schematic illustration of another exemplary embodiment of an apparatus for applying a soil treatment beneath the surface of the ground in which the apparatus includes a base unit, a handheld portable high pressure application tool, and a handheld portable low pressure application tool.
Figure 24:
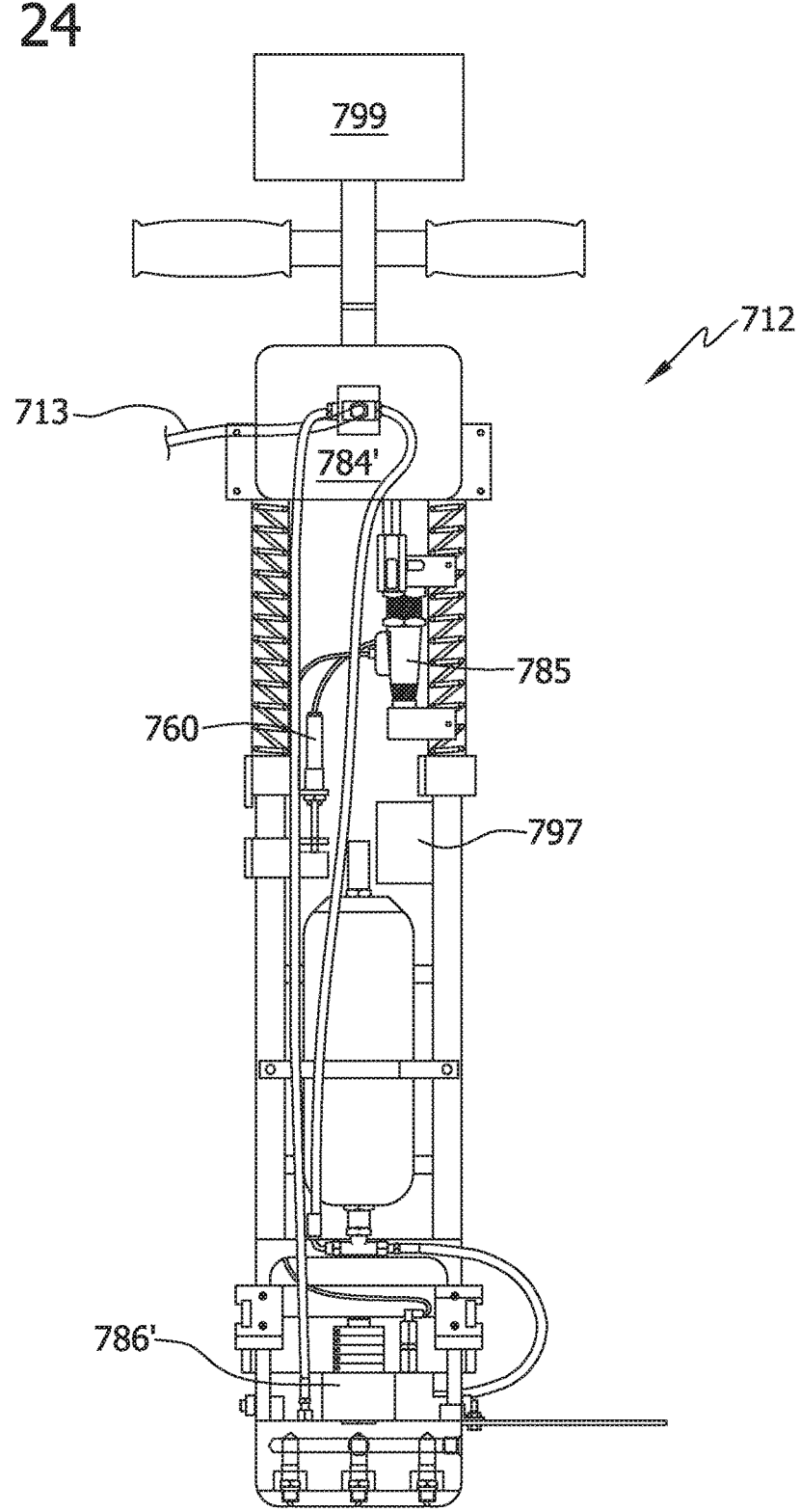
FIG. 24 is a front view schematic illustration of the high pressure application tool of FIG. 23.
Figure 25:
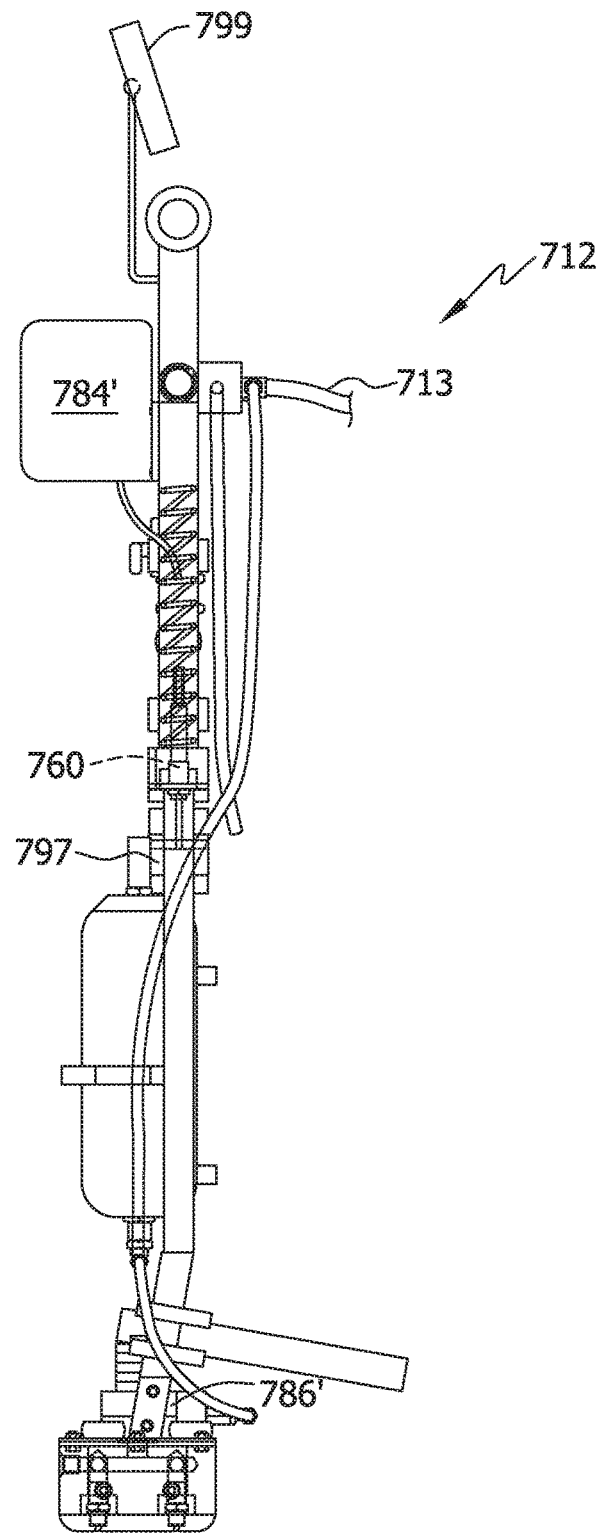
FIG. 25 is a side view schematic illustration of the high pressure application tool of FIG. 23.
Figure 26:
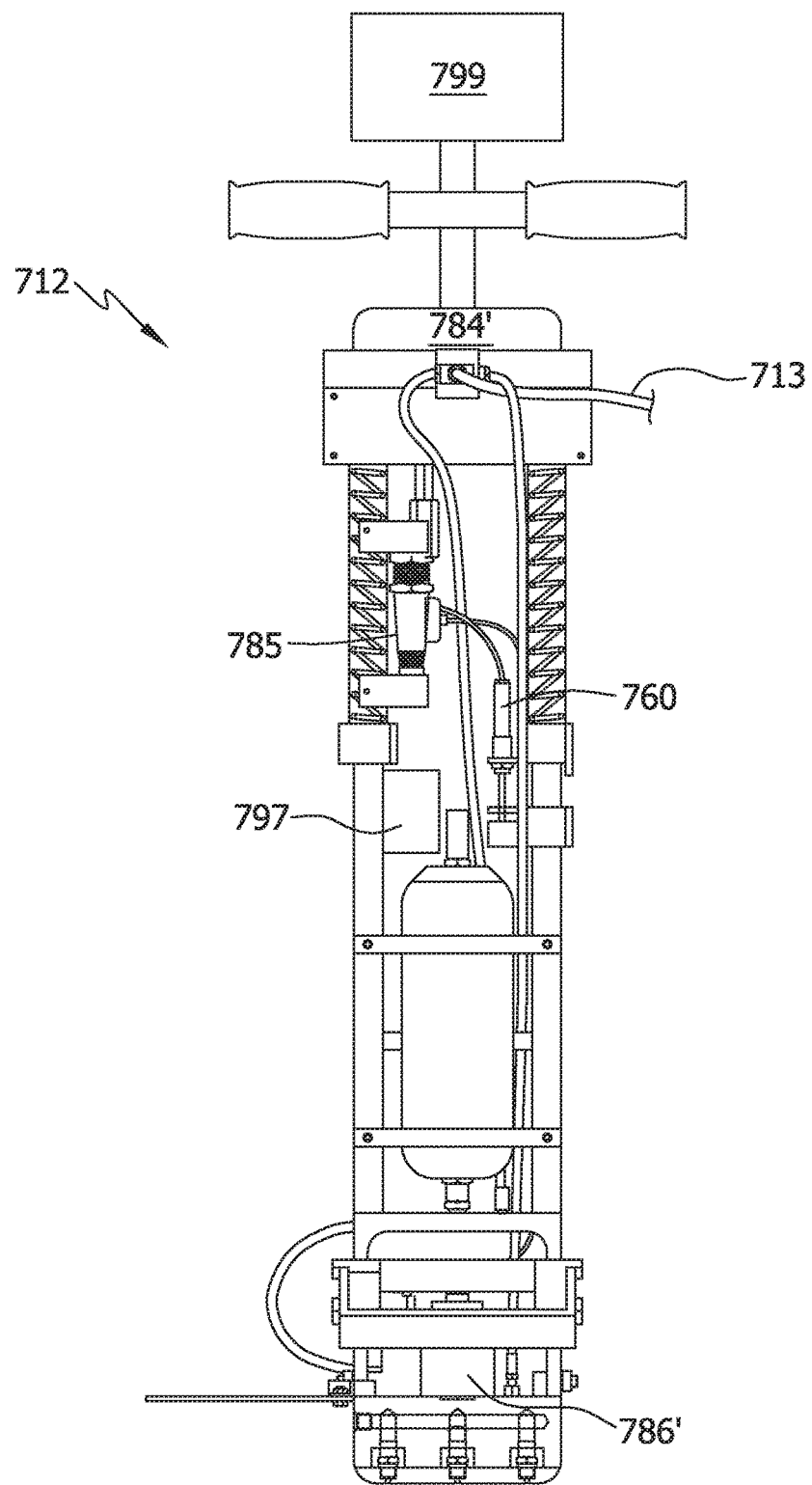
FIG. 26 is a back view schematic illustration of the high pressure application tool of FIG. 23.

As seen in FIG. 22, the hose reel 593 includes a spool 594, a mounting bracket 595 for mounting the spool to the supply cart 514, and a handle 596 for manually rotating the spool relative to the mounting bracket. Thus, the spool 594 can be selectively rotated relative to the mounting bracket 595 using the handle 596 to wind and unwind the conduit 513 about the spool. Water from the water reservoir 580 and/or the external water source is fed to the conduit 513 through a rotary coupling 597. The rotary coupling 597 allows the spool 594 and thereby the conduit 513 wrapped about the spool to rotate relative to an inlet line (not shown) connecting the rotary coupling 597 to the water reservoir 580 and/or the external water source. The rotary coupling 597 inhibits twisting of the inlet line. With reference still to FIG. 22, the handle 596 includes a rotary electrical connector 599 at its free end for feeding the electrical connection 515 to the conduit 513 wound about the spool 594. The rotary electrical connector 599 inhibits the electrical connection 515 for being twisted as the conduit 513 is wound and unwound about the spool 594.

With reference again to FIG. 18, the controller 592 permits the operator of the system 510 to selectively set a pulse duration and pressure level for termiticide injections. In other embodiments, the controller 592 may permit the operator selectively set a pulse duration, while the pressure is manually set by adjusting a pressure valve (not shown). The controller 592 may be programmable to permit the operator to enter parameters associated with a particular manifold head 516 in use, such as by defining the number of orifices and their sizes, parameters with a termiticide solution in use, such that dosing through the mixing device 586 can be properly controlled, or the number of injections can be tracked, and the like. It is understood that the controller 592 can be mounted on the tool 512 in addition to or instead of the controller mounted on the cart 514.

To inject the termiticide into the ground, the operator positions handheld portable application tool 512 such that the contact plate 550 is in contact with the surface of the ground. A downward force between about 15 to 20 pounds is applied by the operator to the upper portion 518 of the handle 517 to move the upper portion 518 from its first position to its second position and thereby cause the trigger switch 560, which is mounted to the upper portion, to engage the trigger switch actuator 562, which is mounted to the lower portion 519. Engagement of the trigger switch actuator 562 and the trigger switch 560 actuates the discharge valve 556. More specifically, an electronic signal is sent from the trigger switch 560 to the discharge valve 556 causing the discharge valve to move from its closed position to its opened position for a predetermined amount of time.

In addition, movement of the upper portion 518 of the handle 517 relative to the lower portion 519 causes a predetermined amount of termiticide concentrate to be delivered by the dosing device 585 from the first termiticide concentrate reservoir 584' to the mixing device 586'. Opening the discharge valve 556 causes the pressure accumulator 587 to release at least a portion of the pressurized water stored therein to the mixing device 586'. The termiticide concentration and pressurized water mix within the mixing device 586' to form a termiticide solution. The termiticide solution is then driven to the manifold head 516 where it flows to and out the high pressure nozzles 538 for injection into the ground.

The operator then releases the pressure from the handle 517, which resets the trigger switch 560, the dosing device 585, and the pressure accumulator 587. More specifically, the springs 526 cause the upper portion 518 of the handle 517 to move back to its first, extended position. The illustrated trigger switch 560 is configured to work only once during each compression of the handle 517 to prevent repeated opening of the discharge valve 556 until the handle 517 has been reset.

The depth of penetration of the termiticide solution into the ground is a function of the pressure at which the termiticide solution is discharged from the tool 512, the duration for which the discharge valve 556 remains open, and the type of soil into which the termiticide is discharged. In one suitable embodiment, the penetration of termiticide into the ground is between about 12 to 16 inches.

The second termiticide concentrate reservoir 584 and the second mixing device 586, which are mounted on the cart 514, allow the cart to be used for low pressure applications. Low pressure applications of termiticide can be carried out using the application tool 512 illustrated herein or using conventional rodding techniques. It is understood that in some embodiments the second termiticide concentrate reservoir 584 and the second mixing device 586 can be omitted.

FIGS. 23-27 illustrate one embodiment of an apparatus 710 for applying a soil treatment, such as any of the soil treatments described previously herein, beneath the surface of the ground. The apparatus 710 generally comprises a base unit in the form of a supply cart 714, a handheld portable high pressure application tool 712 and a handheld portable low pressure application tool 711. In one embodiment, the supply cart 714 is substantially similar to the supply cart 514 of the embodiment illustrated in FIGS. 18-22 and described previously herein. In particular, the supply cart 714 of this embodiment functions as a fluid delivery device and includes the water reservoir 780, pressure pump 782, second termiticide concentrate reservoir 784, water inlet 781, gasoline engine 788 with generator 790 for operating the pressure pump 782, and clutch mechanism 791 all operable in the manner described previously in connection with the similar components of the supply cart 514. The radiator 191 of the previous embodiments is omitted from this embodiment since the clutch mechanism 791 is sufficient to inhibit over heating due to pressurized water driven by the high pressure pump 782.

Figure 27:
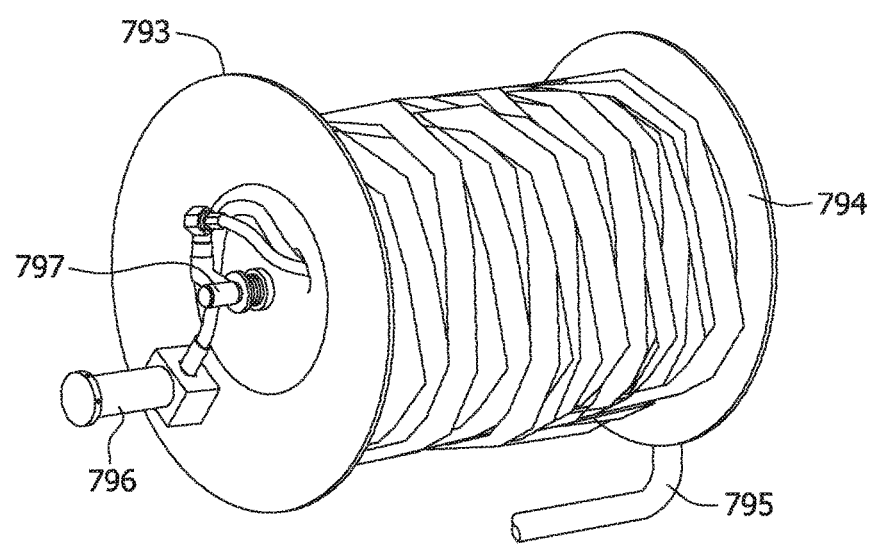
FIG. 27 is an enlarged perspective schematic illustration of a hose reel removed from the base unit of FIG. 23.

The high pressure application tool 712 is in fluid communication with the supply cart 714 via a conduit 713 (e.g., a hose supported by a hose reel 793 including a spool 794, mounting bracket 795 and handle 796 as shown in FIG. 27) that permits fluid (e.g., water and/or a termiticide solution from the mixing device 786') to flow from the cart 714 to the high pressure application tool. In this embodiment, however, the conduit 714 does not include a wired electrical connection to the high pressure application tool 712. Rather, the high pressure application tool 712 is battery powered by a suitable rechargeable battery 797. In one embodiment, the battery 797 is removable from the application tool 712 for recharging. In other embodiments, the battery 797 may be charged while remaining on the application tool 712. A suitable power switch (not shown) is provided on the high pressure application tool 712 in electrical communication with the battery 797 for use in shutting down the battery for turning on and off the application tool. It is understood, however, that an electrical cable or other wired electrical connection may electrically connect the high pressure application tool 712 with the supply cart 714 and remain within the scope of this disclosure.

In one suitable embodiment, the handheld, portable high pressure application tool 712 is otherwise constructed similar to the application tool 512 of the embodiment of FIGS. 18-22 so as to be moveable (and thus positionable) relative to the supply cart 714 (i.e., relative to the base unit). The conduit 713 includes a quick connect (not shown) for releasable connection with the high pressure application tool 712 to permit selective connection and disconnection of the high pressure application tool from the supply cart 714. A pressure relief valve, not shown, is provided on the high pressure application tool 712 to bleed off pressure in the tool prior to disconnecting the conduit 713 from the high pressure application tool. It is understood that in other embodiments a high pressure application tool identical to that of the embodiment of FIGS. 18-22 may be used, or any of the application tools illustrated in FIGS. 1-17 may be used, or any combination of components thereof may be used, or another suitable high pressure application tool may be used without departing from the scope of this disclosure.

The high pressure application tool 712 of this embodiment also uses a dosing device 785 similar to the dosing device 585 of the previous embodiment and in fluid communication with the termiticide concentrate reservoir 584' to deliver a predetermined amount (i.e., a dose or dosing volume) of concentrated termiticide (broadly referred to as an active ingredient) to the first mixing device 786' each time the trigger switch 760 is actuated. In one suitable embodiment, the dosing device 785 is adjustable so that the predetermined amount of concentrated termiticide (i.e., the dosing volume) can be adjusted. In another suitable embodiment, the dosing device 785 is non-adjustable. That is, the amount of concentrated termiticide delivered to the mixing device 786' each time the trigger switch 760 is actuated cannot be changed without replacement of the dosing device. In this manner, the predetermined dosing volume is independent of the pressure of the carrier liquid (e.g., water) used for each injection of the high pressure application tool 712, and independent of how much water is used per injection. Rather, the dosing volume is based solely on the injection event itself.

With reference back to FIG. 23, the low pressure application tool 711 in accordance with one embodiment comprises a conventional rodding tool. The rodding tool 711 is configured for fluid communication with the supply cart 714 via the conduit 713 in the low pressure mode of the apparatus 710. More suitably, the rodding tool 711 is configured for releasable connection with the conduit 713, such as using the quick connect (not shown) on the conduit. In this manner, the rodding tool 713 is readily and selectively interchangeable with the high pressure application tool 712 upon switching operation of the apparatus 710 between the high pressure mode and the low pressure mode. It also understood that the low pressure application tool 711 may be other than a rodding tool, such as a wand, a trenching device, sprayer or any other portable, handheld tool that can receive a low pressure flow of soil treatment and direct the soil treatment through an outlet into the soil—such as by pushing the tool down into the soil or by pre-digging holes or trenches into the ground and then lowering the tool therein before dispensing the soil treatment—or dispensing the soil treatment onto the soil surface.

In the exemplary embodiment, only one of the low pressure application tool 711 and the high pressure application tool 712 is connected to the conduit 713 at a time. Thus, the low pressure application tool is inoperable when the high pressure application tool is operating and the high pressure application tool is inoperable when the low pressure application tool is operating. Additionally, the apparatus 710 is inoperable in the high pressure mode when the low pressure application tool 711 is connected to the supply cart 714.

In this embodiment, the second mixing device 786 on the supply cart 714 comprises a suitable peristaltic pump operable to deliver active ingredient (e.g., concentrated termiticide in the illustrated embodiment) from the concentrate reservoir 784 for admixture with the carrier liquid (e.g., water) from the pressure pump 782 at low pressure before delivery to the low pressure application tool 711. The construction and operation of a peristaltic pump is conventionally known and thus not described in further detail herein except to the extent necessary to make the present disclosure. The peristaltic pump 786 is suitably operable to deliver the concentrated termiticide from the reservoir 784 based on a predetermined mixture ratio as a function of the rate of delivery of concentrated termiticide to a flow rate of carrier liquid (e.g., water) delivered by the pressure pump 782.

In a particularly suitable embodiment, the rate at which the peristaltic pump 786 operates (e.g., revolutions per minute) may be adjustable to accommodate different carrier liquid flow rates delivered from the pressure pump 782. This allows the mixture ratio of the active ingredient to carrier liquid to remain at a desired or predetermined mixture ratio irrespective of whether the flow rate changes during operation, or is different from one treatment to the next. More suitably, the operating rate of the pump 786 may be automatically adjustable, such as by a suitable controller (not shown) that automatically adjusts the operating rate of the pump as a function of a signal indicative of the carrier liquid flow rate during treatment in the low pressure mode of the apparatus 710. The carrier liquid flow rate is suitably monitored by a flow meter (not shown) located upstream of where the carrier liquid admixes with the active ingredient. A flow cell (also not shown) disposed on the line downstream of the pump 786 but upstream of the location at which active ingredient admixes with the carrier liquid monitors the presence of active ingredient flowing there through to provide confirmation that the active ingredient is still flowing during operation.

In operation according to one embodiment of a method for applying soil treatment to soil, and in particular applying the soil treatment beneath the surface of the ground, the apparatus 710 may be operated in the high pressure mode in accordance with a first treatment along a first area of a work site to be treated, and then operated in the low pressure mode in accordance with a second treatment along a second area of the work site, different from the first area of the work site. For example, where a work site is a residential property in which the treatment is to be applied about the perimeter of a home, a first area of the perimeter (either a continuous segment of the perimeter, or multiple discrete segments of the perimeter) may be composed of a soil that is suitable for using the high pressure mode of the apparatus 710, while another area (a second area) of the perimeter (continuous, or multiple discrete segments) may not be suitable for using the high pressure mode of the apparatus and thus the low pressure mode of the apparatus must be used to apply the soil treatment. It is understood, however, that a single treatment may comprise operation of the apparatus 710 only in the high pressure mode, or only in the low pressure mode, and remain within the scope of this disclosure.

It is also contemplated that in other embodiments the second work area in which the low pressure mode is used may overlap all or part of the first work area in which the high pressure mode is used. For example, where soil treatment into the soil to a depth of the footer or basement (e.g., beyond the 12-16 inch depth to which the soil treatment may be injected in the high pressure mode of the apparatus 710), the high pressure mode application is applied to the first area to cover the upper 12-16 inches of soil, and the low pressure mode application is applied to the second area overlapping the first area. In particular, such a low pressure mode application may include inserting an application tool, such as the rodding tool 711, down into the soil to deliver soil treatment below the injected depth (e.g., 12-16 inches) down to the footer or basement. The application tool may be intermittently inserted into the ground at spaced apart locations along the entire perimeter of the footer or basement.

With reference again to FIG. 23, in this embodiment a dual control system, comprising a first (e.g., base unit, or supply cart) control system 792 disposed on the supply cart 714 and a second (e.g., application tool) control system 799 disposed on the high pressure application tool 712, is employed to control the overall operation of the apparatus 710 and to provide the operator with some control over the operation while using the high pressure application tool remote from the supply cart. The supply cart control system 792 suitably comprises at least a controller, such as a microcontroller, and a display unit, with user interface, used by the operator to select various operating aspects of the apparatus. The application tool control system 799 also includes a controller, such as a microcontroller, and a display unit with associated user interface. In the illustrated embodiment, the supply cart control system 792 and the application tool control system 799 communicate with each other via wireless communication—and in particular by a pair of transceivers, each being disposed on a respective one of the supply cart 714 and the high pressure application tool 712. It is understood, however, that in other embodiments the control systems 792, 799 may communicate by wired connection, such as by a cable or other suitable connection extending from the supply cart 714 to the high pressure application tool 712.

Figure 28:
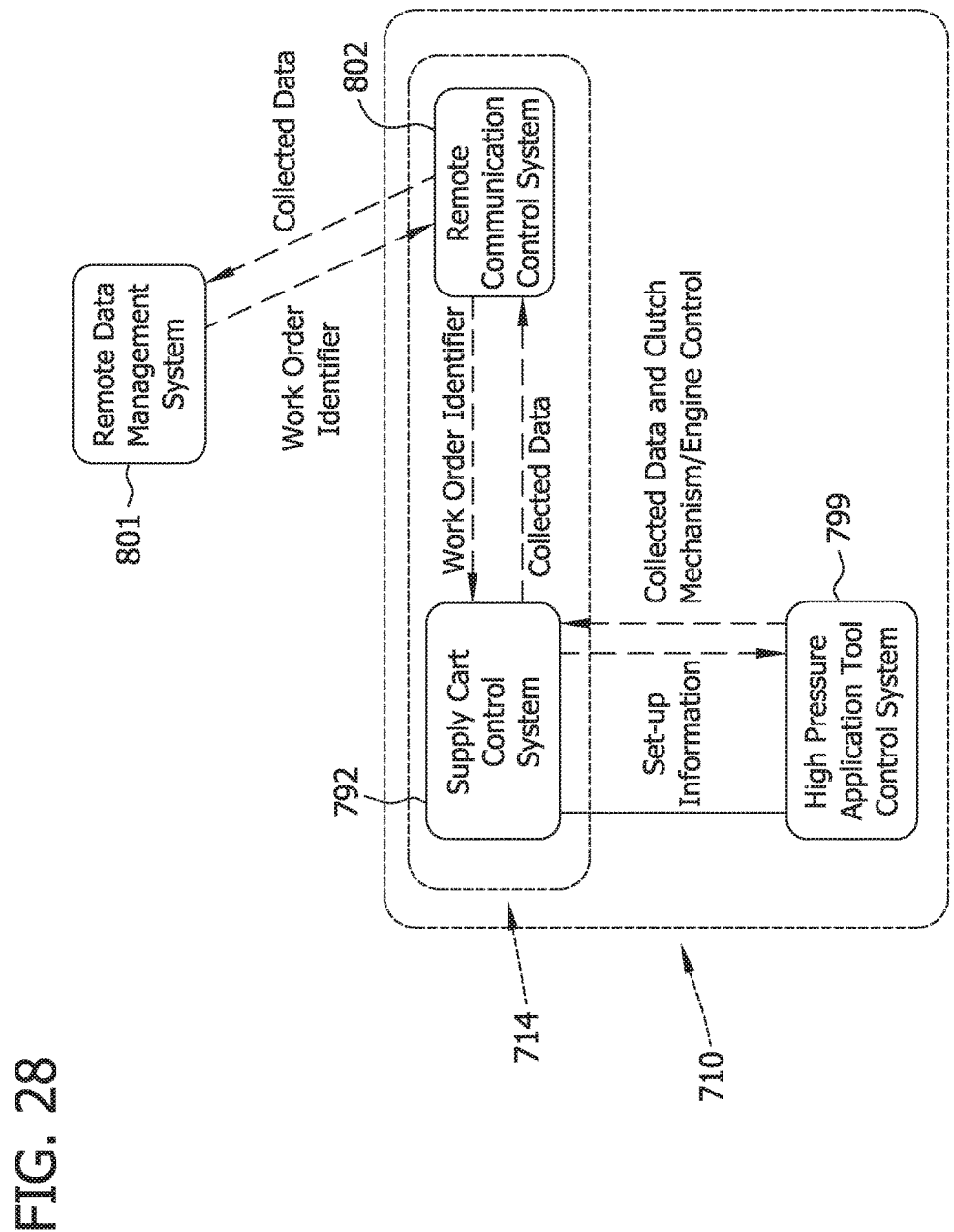
FIG. 28 is a schematic illustration of a control system and communication capabilities of the apparatus of FIG. 23.

With reference to FIG. 28, the apparatus 710, and more particularly the supply cart control system 792 and the application tool control system 799, in accordance with one embodiment, are suitably configured to operate along with, e.g., via wireless communication with, a remote data management system 801 such as a website, a remote computer or other suitable system capable of transmitting and receiving data or other information to and from the supply cart control system 792 and/or the application tool control system 799. For example, in the illustrated embodiment of FIG. 28 the supply cart 714 further comprises a remote communication control system 802 (shown schematically in FIG. 28) carried on board the supply cart, and more suitably within the housing or control box that houses the supply cart control system 792, and including at least a second transceiver and a related controller configured for communication with the remote data management system 801. The remote communication control system 802 is also configured for communication with the supply cart control system 792, suitably by wired connection although it may alternatively be by wireless connection, to allow the transfer of data therebetween.

In a more particular example, the remote data management system 801 may be located at, or accessible by (e.g., in the form of an accessible website), a pest management company having multiple field operators that transport a respective apparatus 710 to customer locations to apply a soil treatment at the customer locations. The pest management company can download data to each apparatus using the communication between the remote data management system 801 and the remote communication control system 802 on the supply cart 714, and can receive data collected during operation of the apparatus 710 at each of the customer locations. For example, the pest management company can transmit data to the remote communication control system 802, such as a work order identifier and physical address of the different work sites at which the treatment is to occur. The remote communication control system 802 then communicates the information to the supply cart control system 792 for use in performing the desired treatment at the customer work site. Upon completion of the treatment, data collected during the treatment process is communicated by the supply cart control system 792 to the remote communication control system 802, where the data is then transmitted to the remote data management system 801.

Of course, it is understood that in other embodiments the apparatus 710 may operate independent of or entirely without the remote data management system 801 and remain within the scope of this disclosure. It is also contemplated that the remote communication control system 802 may be omitted, such that the remote data management system 801 communicates (e.g., by wireless communication) directly with the apparatus 710, such as the supply cart control system 792 and/or the application tool control system 799.

It is also contemplated that in some embodiments the remote data management system 801 may be configured to receive data collected by the supply cart control system 792 and/or the application tool control system 799 other by wireless communication. For example, the remote data management system 801 may be hardwire connected to the injection apparatus control system 792 and/or application tool control system 799 (or, in other embodiments, to the remote communication control system 802) for transferring the collected data to the data management system, or it may be configured for releasable hardwire connection, such as by a USB cable or other data transfer cable to the supply cart control system 792, application tool control system 799 and/or remote communications control system 802 for transferring the collected data to the data management system, or it may be configured for receiving a transportable data storage media, such as a USB drive, compact disc or other transportable data storage media containing the collected data.

The display unit of the supply cart control system 792 is configured to provide a visual display of the various parameters to be selected by the operator prior to operation of the apparatus 710. With reference to FIGS. 29-47, the illustrated display unit has a display screen 803 and a plurality of push buttons 805 (best shown, for example in FIG. 32) spaced from each other along the lower edge of the screen so as to be accessible to the operator for use in controlling the display on the screen and for making desired selections of the operating parameters of the apparatus. In other embodiments, the display screen 803 may alternatively comprise a touchscreen display in which control of the display and selection of operating parameters is done by directly touching the screen. In the illustrated embodiment, one or more of the operating parameters of the apparatus 710 is received from the remote data management system 801. In embodiments where the supply cart control system 792 and the application tool control system 799 operate entirely independent of the remote data management system 801, data needed for operating the supply cart control system may be input manually.

Figure 29:
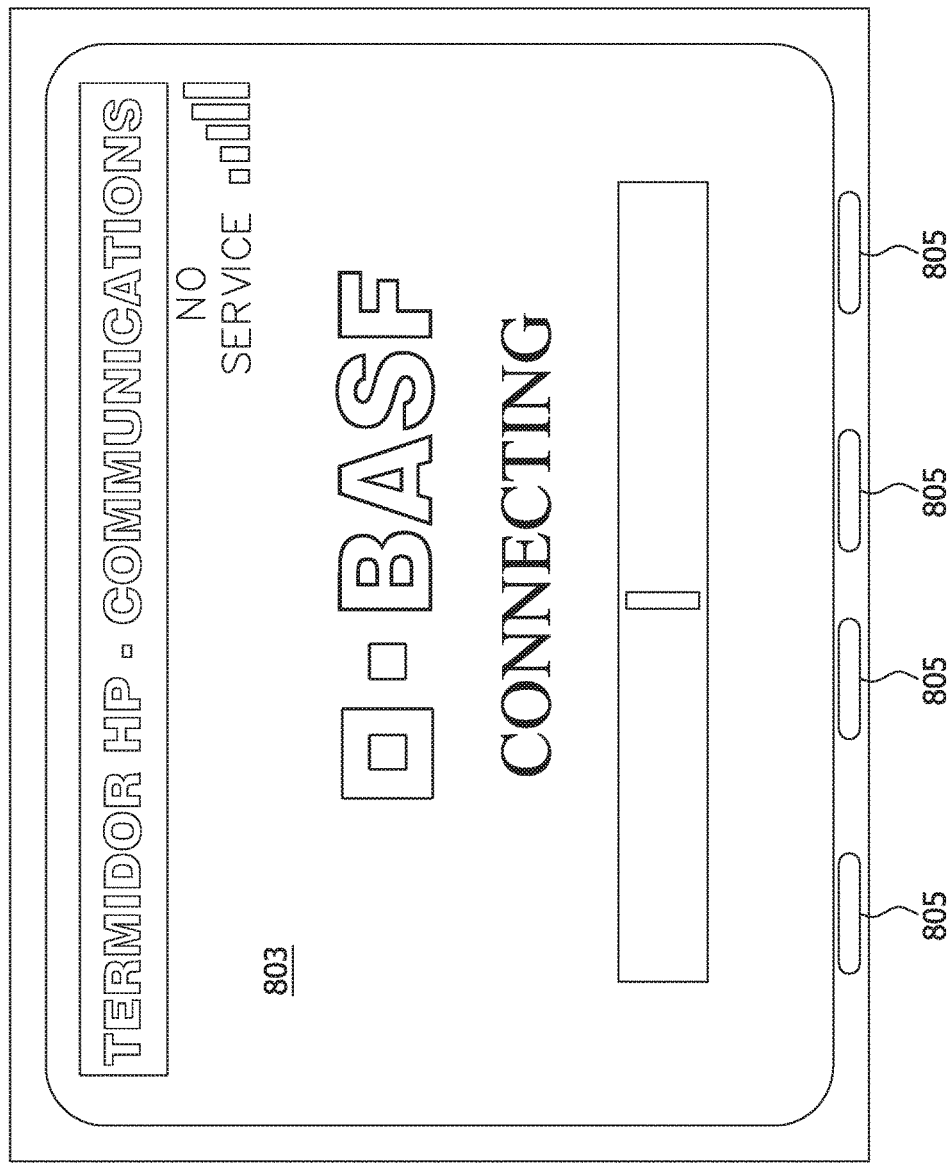
Figure 30:
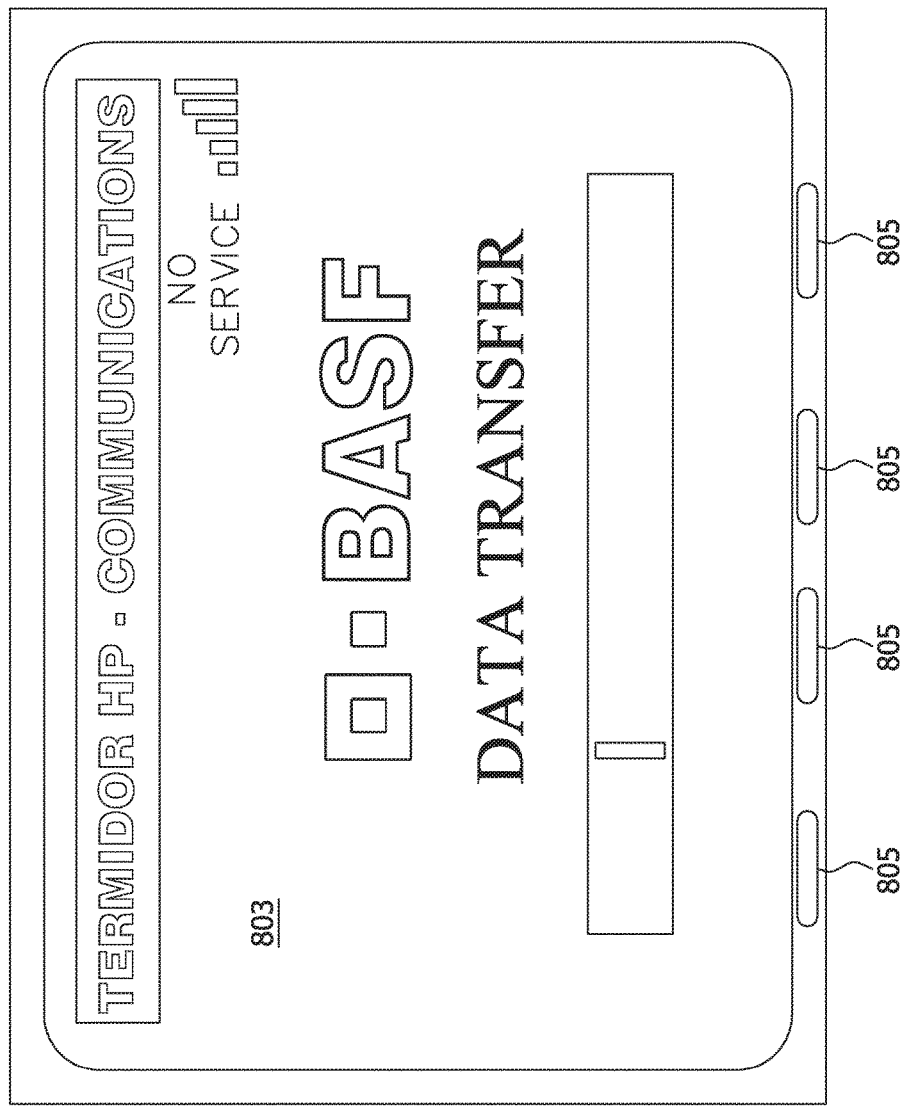
Figure 31:
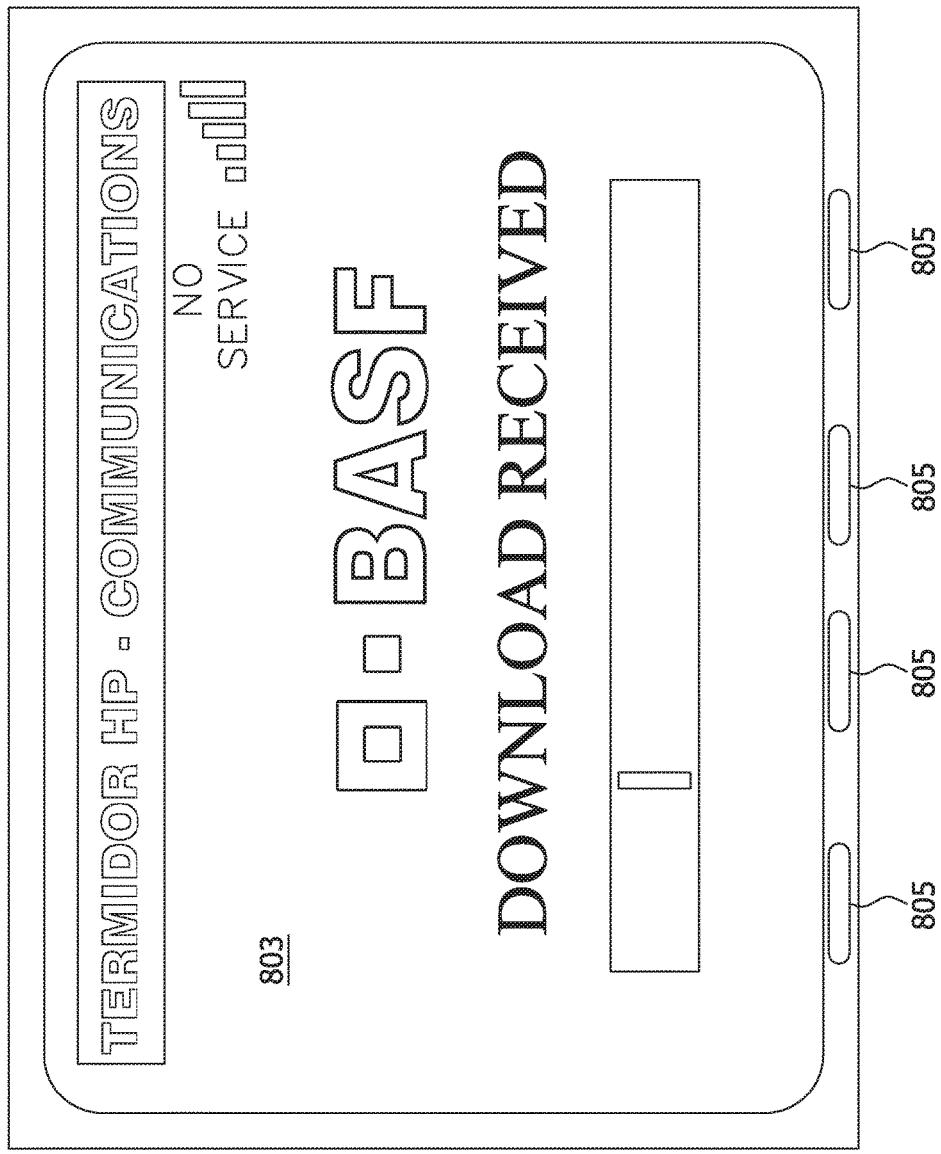
Figure 32:
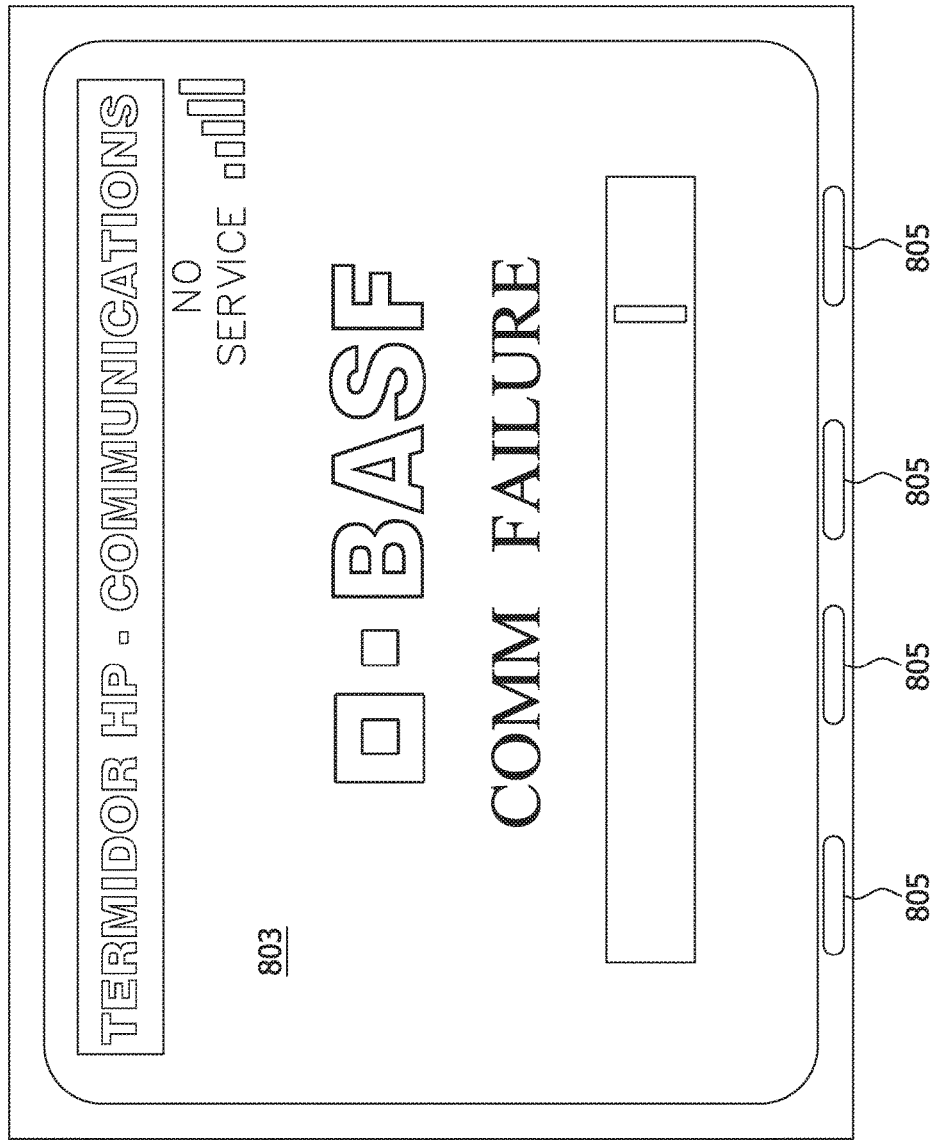

FIG. 29 is a screen shot of the first screen that the operator sees upon powering up the supply cart 714 when the apparatus 710 is used in combination with the remote data management system 801. In particular, the display screen 803 is a COMMUNICATIONS screen, with the display indicating that the remote communication control system is establishing a wireless connection with the remote data management system 801. Indicia indicating strength of the connection is also provided in the upper right corner of the COMMUNICATIONS screen. When a link is established, data is transferred from the remote data management system 801 to the supply cart control system 792 (e.g., via the remote communication control system on the supply cart 714) as shown in FIG. 30. After receipt of the data from the remote data management system 801, the COMMUNICATIONS screen will display an indication that the data was received as shown in FIG. 31. If a suitable connection was not established, the COMMUNICATIONS screen will display a communication failure warning as shown in FIG. 32.

Figure 33:
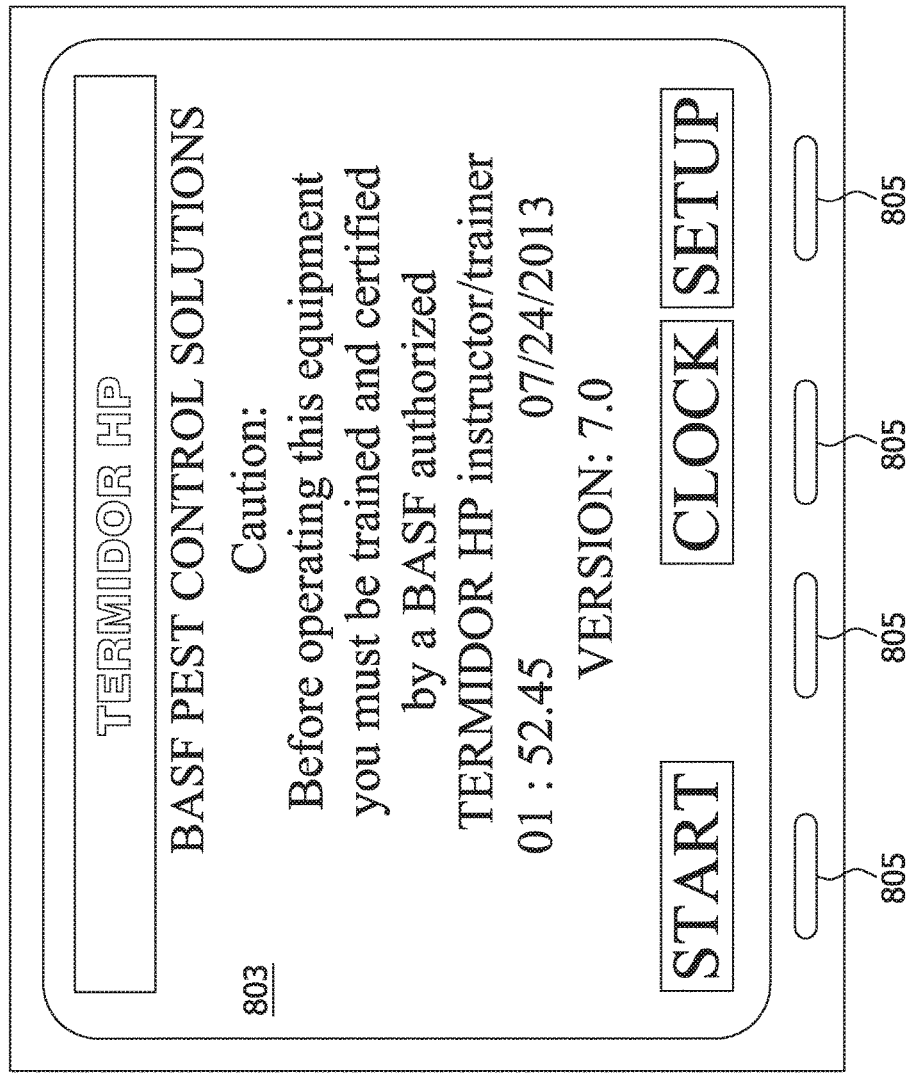

Once the data is transferred to the supply cart control system 792, the display screen 803 shown in FIG. 33 appears. In addition to the time, date, and operating software version, this display screen 803 includes three optional selections—each indicated by being in a box along the lower edge margin of the screen. In particular, a START selection, a CLOCK selection, and a SETUP selection are shown on the display screen. The SETUP selection allows certain operating parameters to be set up by the manufacturer of the apparatus 710, or by an authorized technician, or even by the pest management company. In one embodiment the SETUP selection is not used by the operator at the location at which the treatment is to be applied. In other embodiments, it is contemplated that the SETUP selection may be omitted.

Figure 34:
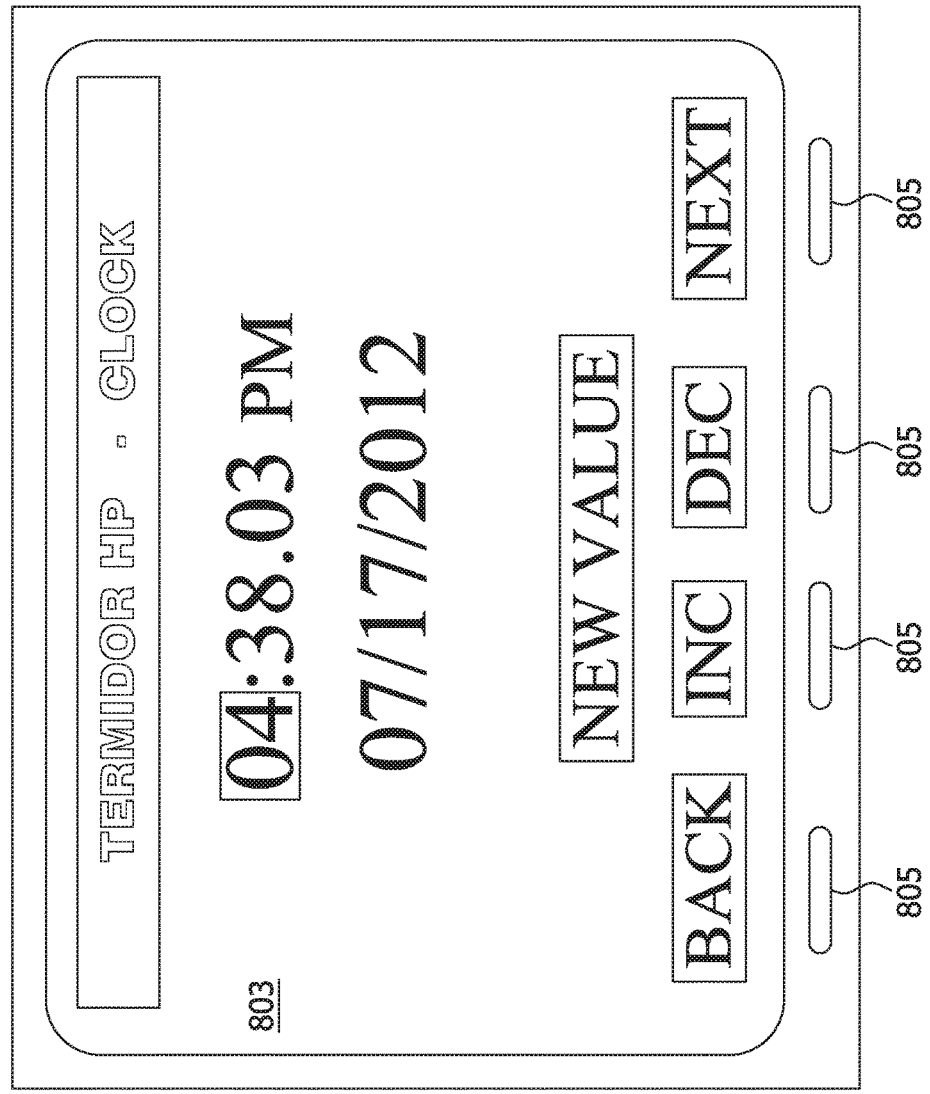

The operator may select from the START and CLOCK selections by pushing the corresponding push button 805 disposed below the selection on the display screen 803. For example, as shown in FIG. 34, if the operator pushes the button 805 below the CLOCK selection, the display screen 803 changes to a CLOCK screen to allow the operator to change the time and date on the display screen. Along the lower edge margin of the CLOCK screen are the selection options BACK, INC, DEC and NEXT. The NEXT selection is typically used to change the time and date selection between, for example, hours, minutes, second, month, day, and year. Following selection of the time and date value that the operator wishes to change, the operator pushes the button 805 below the INC and DEC selections to change the value. The INC and DEC selections stand, respectively, for "increase" and "decrease" and are used to toggle through the various values associated with the time and date selection. When the operator has input the desired time and date values, the operator pushes the button 805 below the BACK selection to return to the previous screen shown in FIG. 33.

Figure 35:
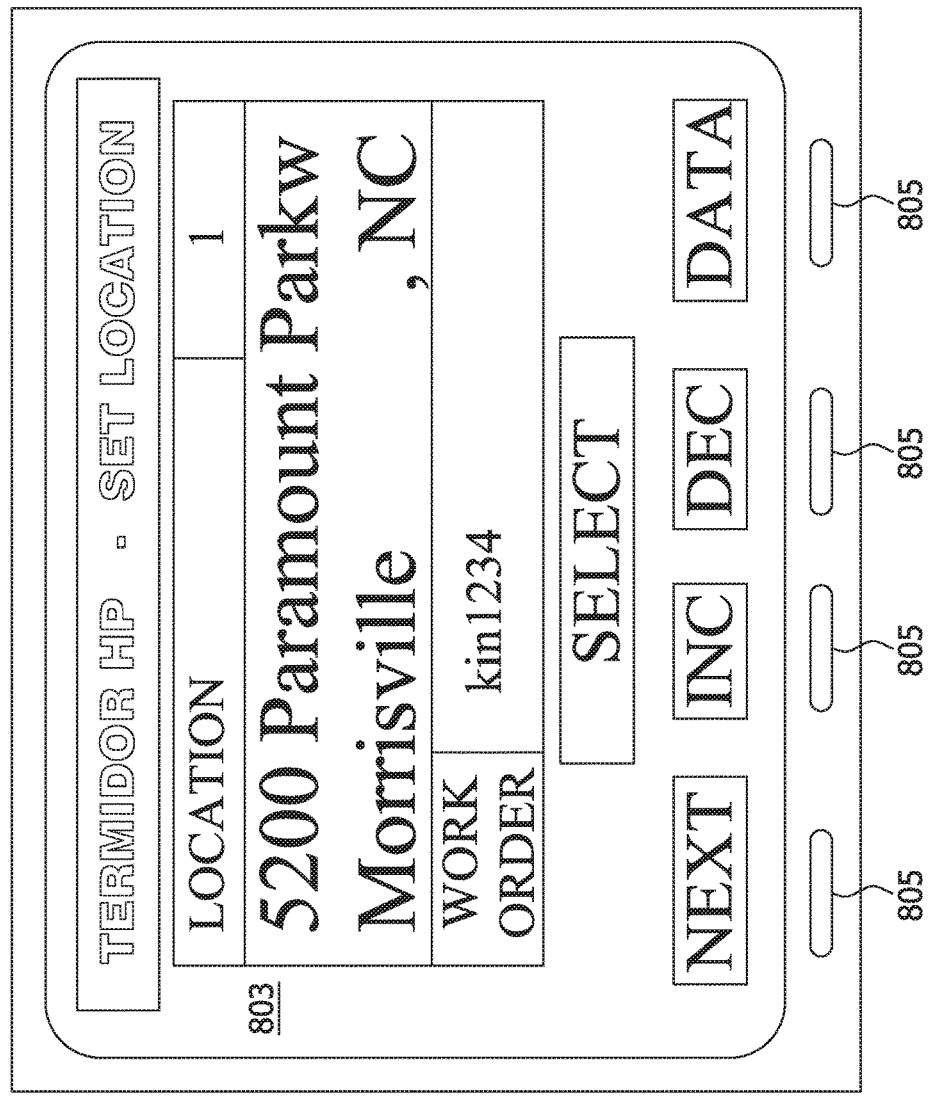

Referring back to FIG. 33, selecting the START selection initiates a parameter selection process to prepare the apparatus 710 for treating a specific work site, such as a residential property, business property or other work site. For example, when the operator is to treat a specific work site, the apparatus 710 is transported to the work site, set up at the work site, and powered up so that the screen of FIG. 33 appears on the display screen 803. By selecting the START selection, the display screen 803 changes to the first parameter selection screen, which is shown in FIG. 35. This screen, referred to as the SET LOCATION screen allows the operator to select a location of the work site to be treated. More particularly, as shown in FIG. 35, the "1" towards the upper right corner of the display screen indicates that the information on the screen relates to the first location stored in memory (such as temporary memory, e.g., random access memory) of the supply cart control system 792.

As an example, in the illustrated embodiment the supply cart control system 792 is capable of temporarily storing information relating to up to fourteen different work sites to be treated by the operator. The information includes, without limitation, a work order identifier associated with the treatment to be performed, and the address of the work site associated with the work order identifier. The work order information is suitably among the data downloaded from the remote data management system 801. In other embodiments the work order identifiers and associated information may be downloaded from a cellular phone, from flash drive or other data storage medium, or by any other suitable technique. It is also contemplated that the supply cart control system 792 may further include a keyboard input device or other suitable input device associated therewith that permits the operator to input the work order identifiers into the supply cart control system 792.

In one suitable embodiment, if no work order identifiers are input to or otherwise downloaded to the supply cart control system 792, the apparatus 710 will not operate. Also, the operator can compare the address information on the SET LOCATION screen with the actual address of the location at which the operator is setting up to make sure that the operator has a valid work order identifier associated with the address about to be treated. Along the lower edge margin of the SET LOCATION screen are the selection options NEXT, INC, DEC and DATA. The DATA selection is typically used following the completion of the treatment at the particular work site and is described in further detail later herein. The INC and DEC selections stand, respectively, for "increase" and "decrease" and are used to toggle through the various location numbers (and hence work order identifiers) stored in the supply cart control system 792. When the work order identifier and associated address corresponding to the work site at which the operator transported the apparatus 710 for treatment are displayed on the SET LOCATION screen, the operator pushes the button 805 below the NEXT selection to confirm that the treatment will be performed for the selected work order identifier.

Figure 36:
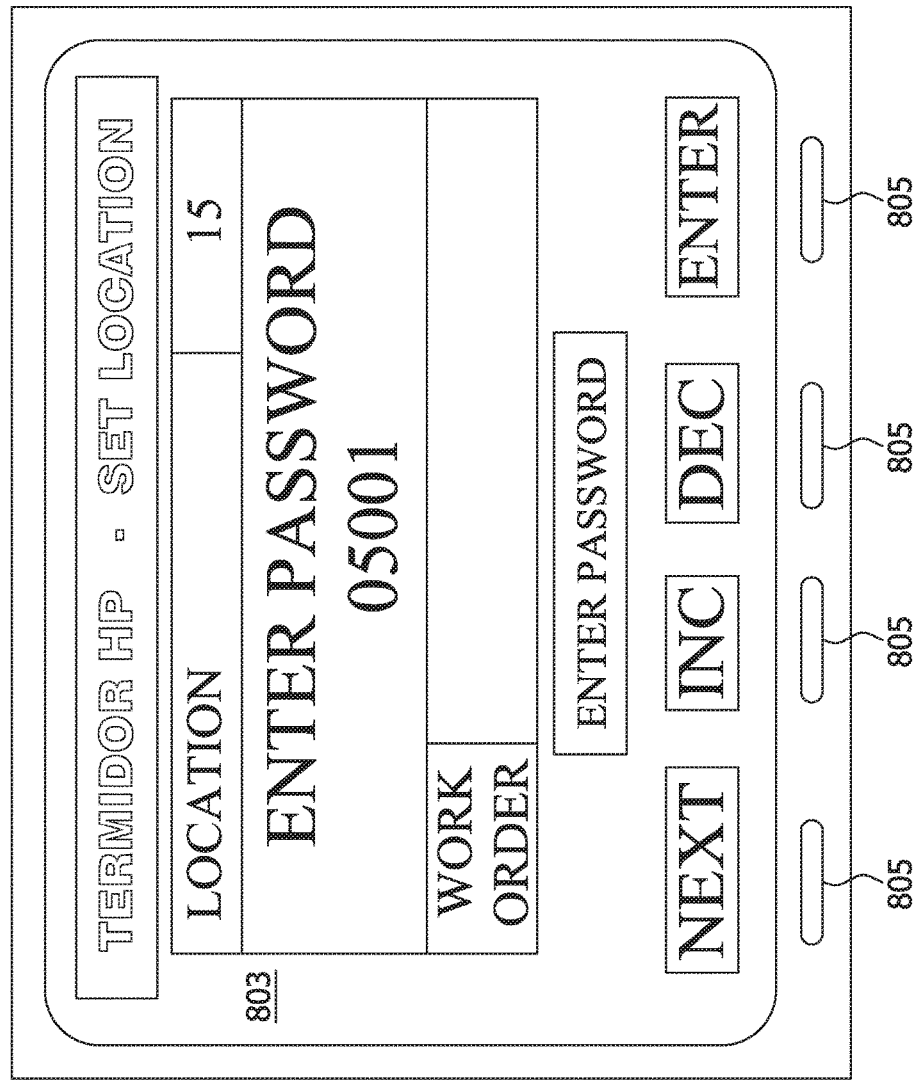

With reference to FIG. 36, the supply cart control system 792 according to one embodiment may further include a pre-set (by the manufacturer of the apparatus 710) fifteenth location that is for maintenance purposes only, e.g., for testing operation of the apparatus by maintenance technicians. While no work order identifier is required, a maintenance technician must input a password to operate the apparatus for this location. This inhibits operators from operating the apparatus and performing treatments without an associated work order identifier (e.g., for invoicing customers).

Figure 37:
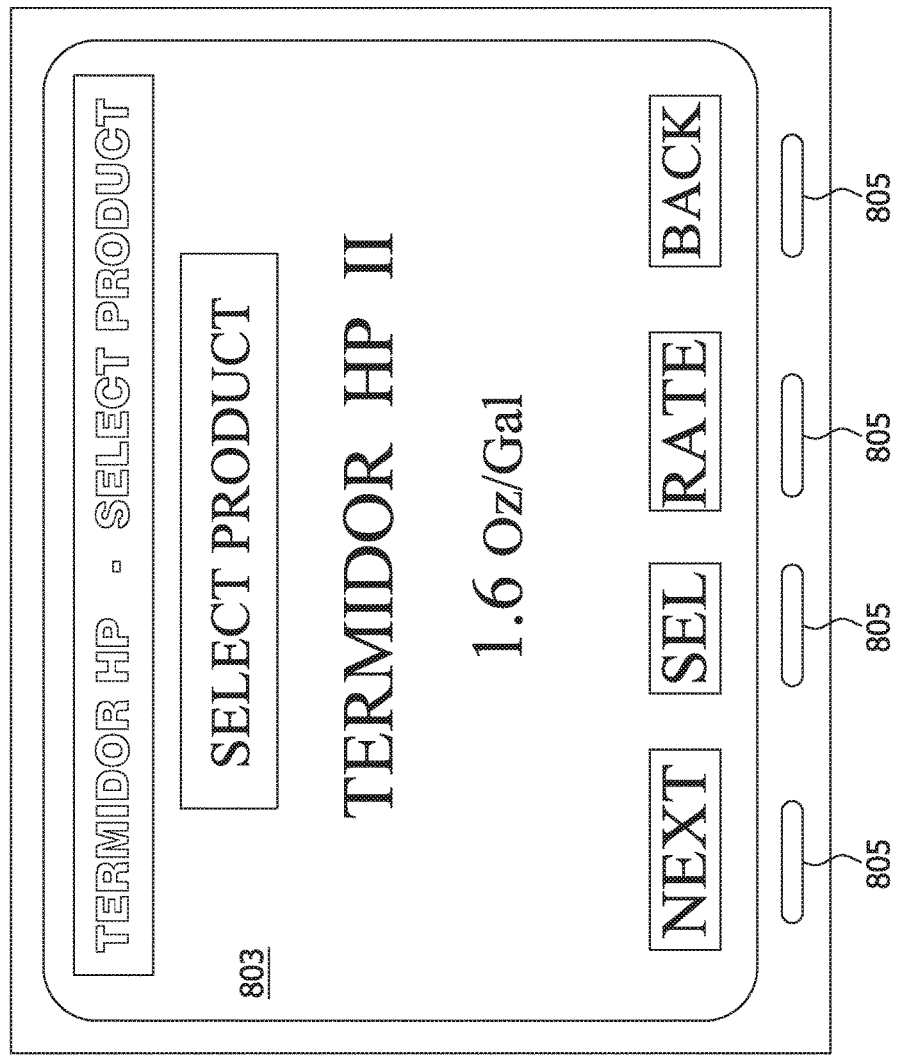
Figure 38:
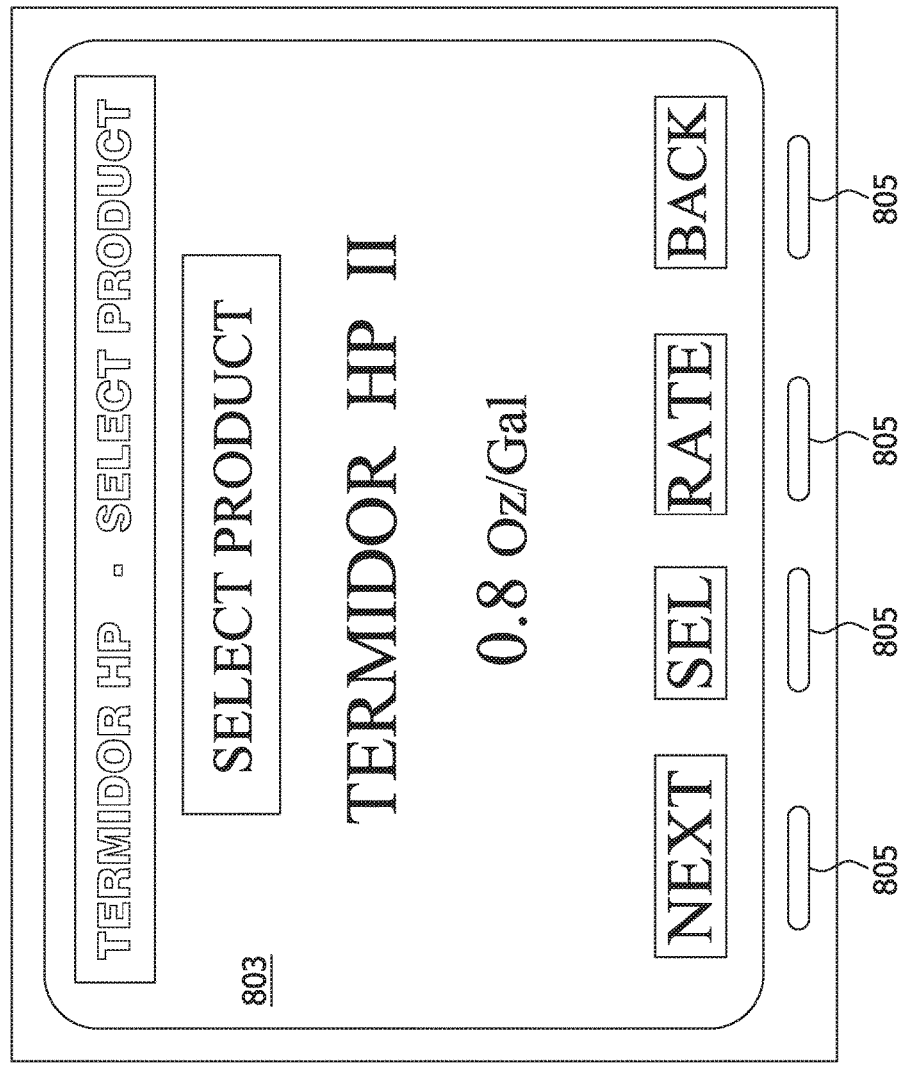
Figure 39:
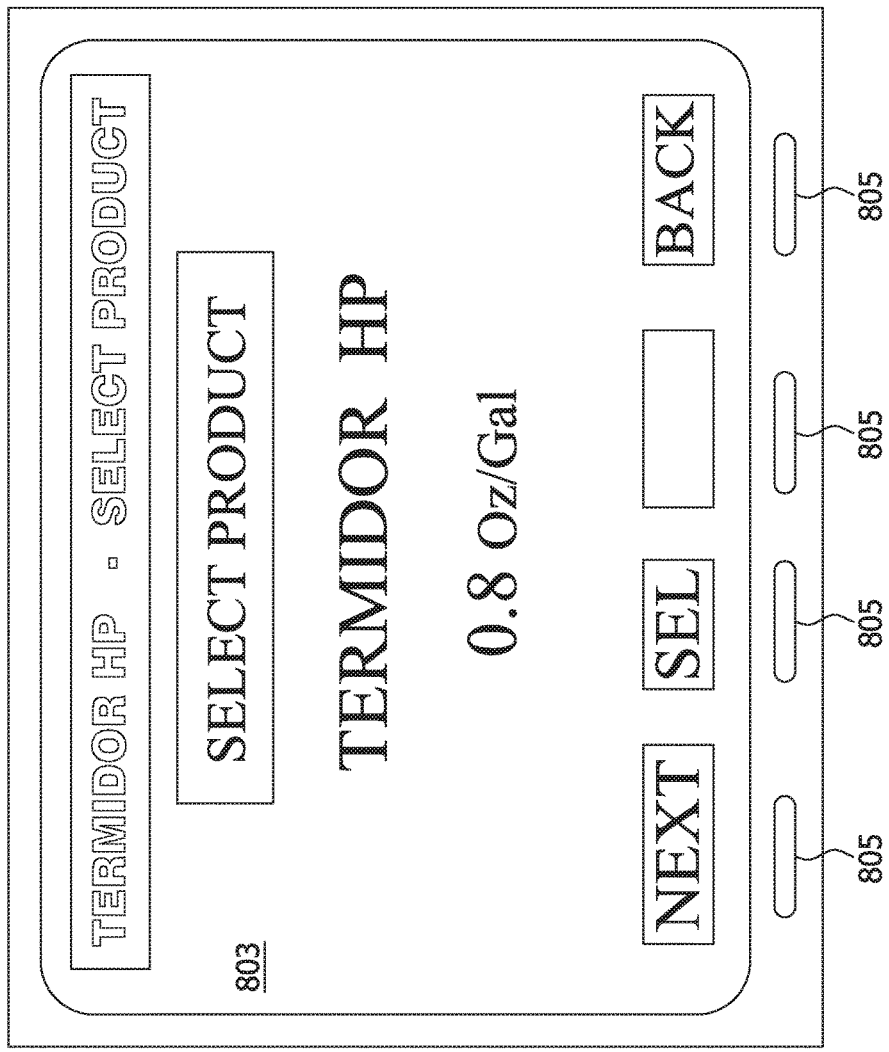

Once the location (i.e., work order identifier) is selected by the operator, a SELECT PRODUCT screen such as that shown in FIG. 37 appears on the display screen 803. This allows the operator to select which of multiple different active ingredients (e.g., concentrated termiticide in the illustrated embodiment) will be used in performing the treatment. On the SELECT PRODUCT screen shown in FIG. 37, the type or name of the active ingredient is displayed, along with a pre-set mixture ratio at which the active ingredient is mixed with carrier liquid (e.g., in the illustrated embodiment, 1.6 oz. of active ingredient per one gallon of water) when operating in the low pressure mode of the apparatus 710. Along the lower edge margin of the SELECT PRODUCT screen are four selection options for the operator, including NEXT, SEL, RATE and BACK. The BACK selection changes the display back to the SET LOCATION screen. The NEXT selection is used by the operator to confirm that the active ingredient displayed on the screen is the product to be used. The SEL selection is used by the operator to cycle the display screen 803 through the other active ingredients from which the operator may choose for the treatment.

The RATE selection is available and displayed on the SELECT PRODUCT screen only when the active ingredient may be used at more than one mixture ratio. Making the RATE selection changes the display screen 803 to display the same active ingredient type or name, but a different mixture ratio. For example, in FIG. 38, 0.8 oz. of active ingredient per one gallon of water is displayed. Where the active ingredient to be used has only one pre-set mixture ratio, the RATE selection is omitted from the SELECT PRODUCT screen. For example, from the screen shown in FIG. 37, if the SEL selection is made the display screen will change to the display screen 803 shown in FIG. 39, which is an active ingredient for which only one pre-set mixture ratio is available.

Figure 40:
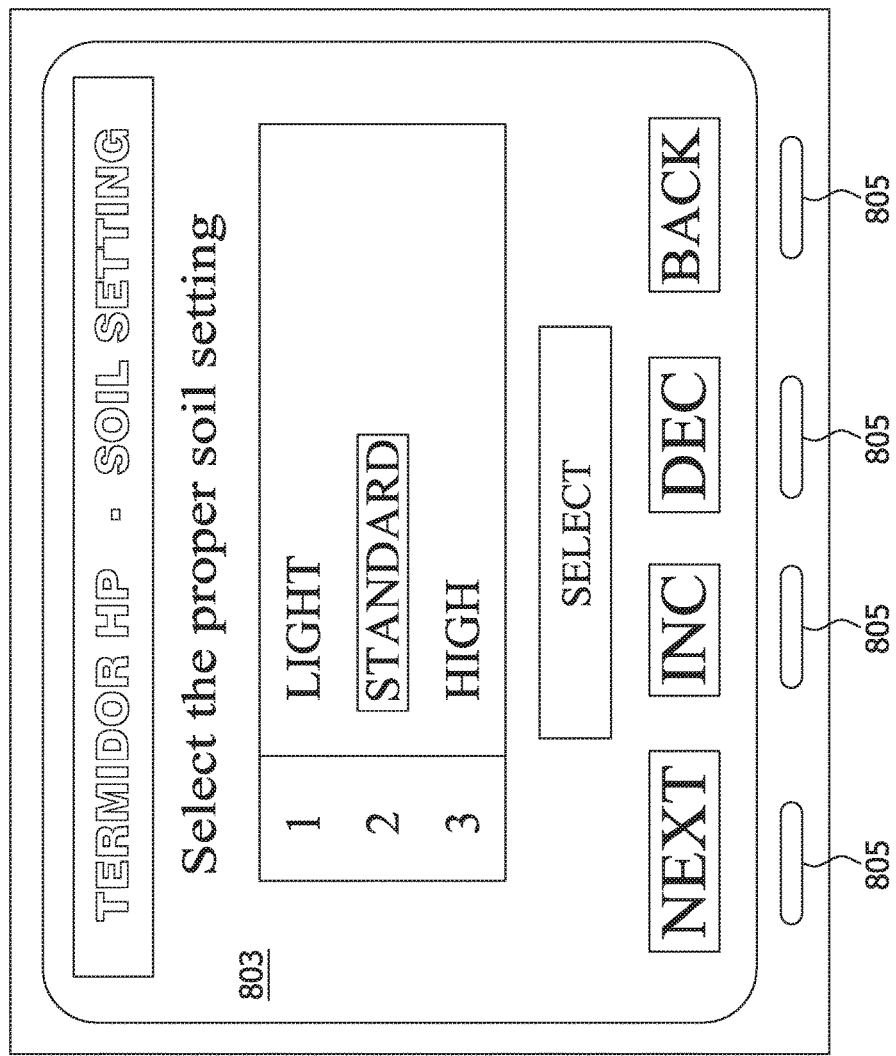

Following selection of the active ingredient to be used, the SOIL SETTING screen appears on the display screen 803 as shown in FIG. 40. This screen allows the operator to select the type of soil that is being treated when the apparatus 710 is operated in its high pressure mode. For example, in the illustrated embodiment the operator may select from a LIGHT soil, a STANDARD soil and a HIGH soil. A LIGHT soil according to one embodiment includes relatively loose soil such as, without limitation, sand, loamy sand and sandy loam. A STANDARD soil in accordance with one embodiment includes a slightly more compact soil such as, without limitation, loam, sandy clay loam, silt loam and silt. And the HIGH soil according to one embodiment includes more heavily compacted soil such as, without limitation, clay, sandy clay, silty clay and silty claim loam. The operator, once at the work site, assesses the soil type and makes the proper selection. The INC and DEC selections are again used to toggle through the soil type options. The NEXT selection is used to confirm the selection of the desired soil type and change the screen to the next parameter selection screen. The BACK selection is used to return to the previous parameter selection screen.

The soil type selection determines, in accordance with one embodiment, the amount of time that the discharge valve 756 of the high pressure application tool 712 remains open during each trigger event, i.e., each injection. This timing is pre-set by the manufacturer or may be changed by a maintenance technician, but otherwise cannot be adjusted by the operator at the work site. The open time of the discharge valve 756 is based on the amount of water, at the operating pressure, needed to inject the soil treatment down into the soil to the desired depth. For example, in the illustrated embodiment, for the LIGHT soil setting the associated open time of the discharge valve 756 is 0.05 seconds, for the STANDARD soil setting the associated open time of the valve 756 is 0.15 seconds and for the HIGH soil setting the associated open time of the valve 756 is 0.35 seconds. It is understood, though, that the discharge valve 756 open times associated with the soil type selections may be other than as set forth above without departing from the scope of this disclosure.

Figure 41:
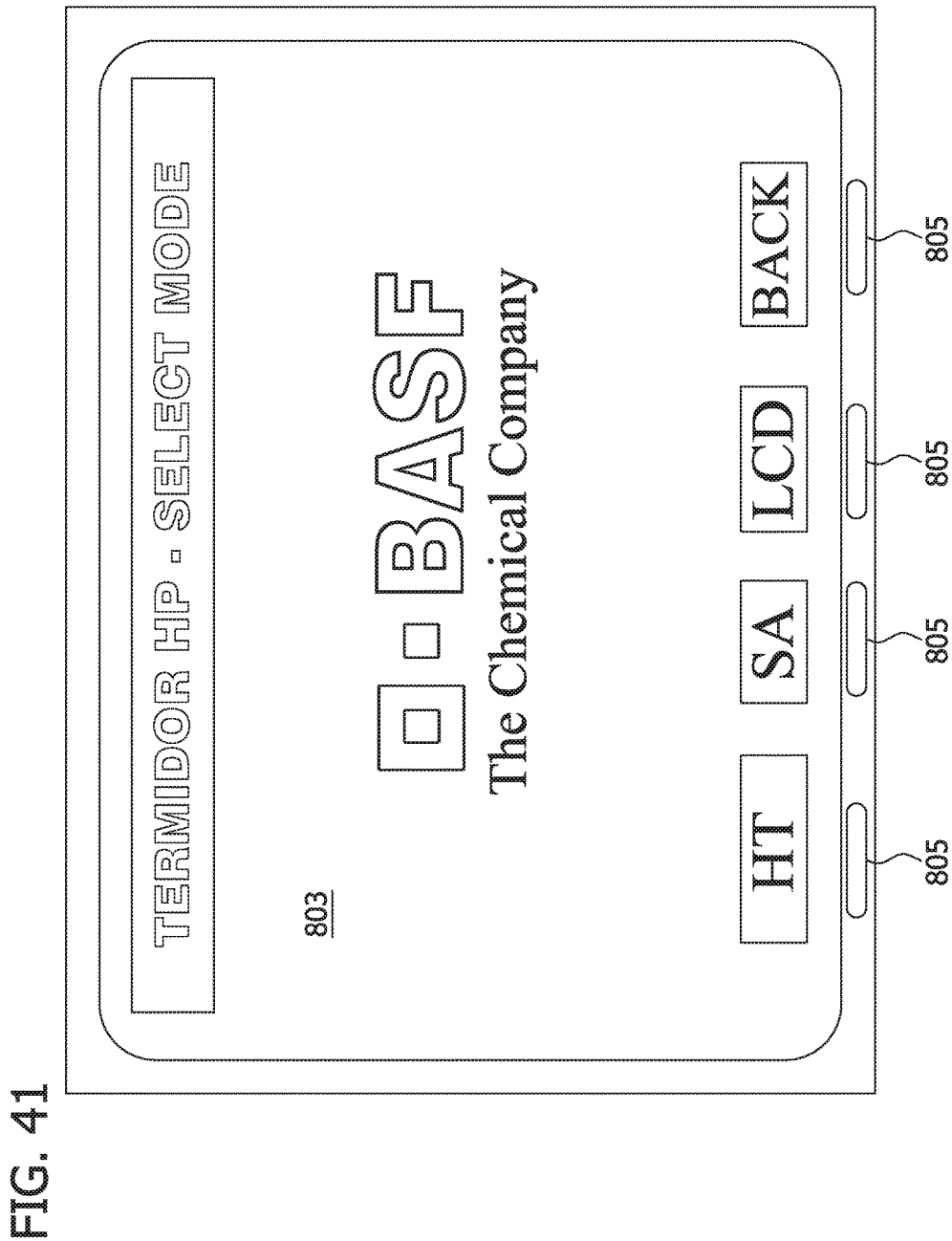

Following selection of the soil type, the SELECT MODE screen appears on the display screen as shown in FIG. 41. As discussed previously, the apparatus 710 is operable in either a high pressure mode or a low pressure mode. In the high pressure mode, the high pressure application tool 712 is releasably connected to the supply cart 714 by the conduit 713 (e.g., the hose) while in the low pressure mode the low pressure application tool 711 is releasably connected to the supply cart by the conduit. The SELECT MODE screen includes an HT selection (e.g., referring to "Hydraulic Trenching") which corresponds to the high pressure mode of operation, an SA selection (e.g., referring to "Standard Application") which corresponds to the low pressure mode of operation, an LCD selection, and a BACK selection. The BACK selection is used to return to the previous parameter selection screen. The operator selects the desired mode by pushing the corresponding button 805 below the display screen 803.

Figure 42:
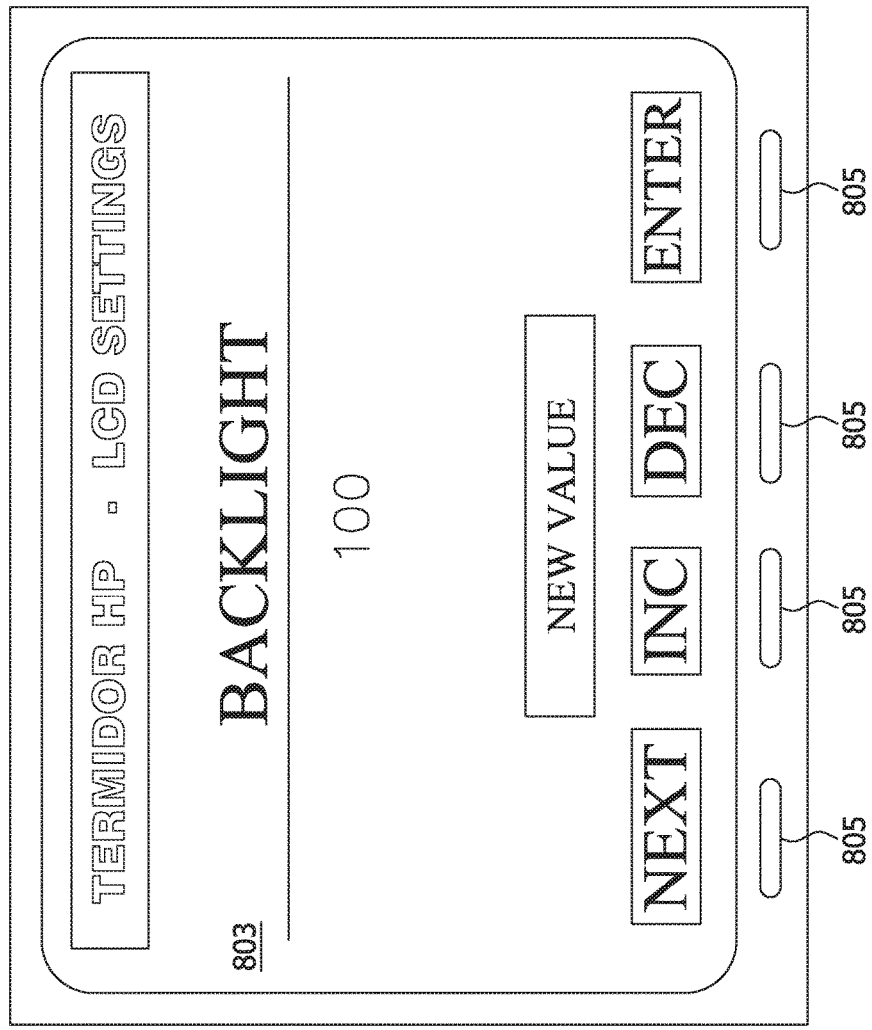
Figure 43:
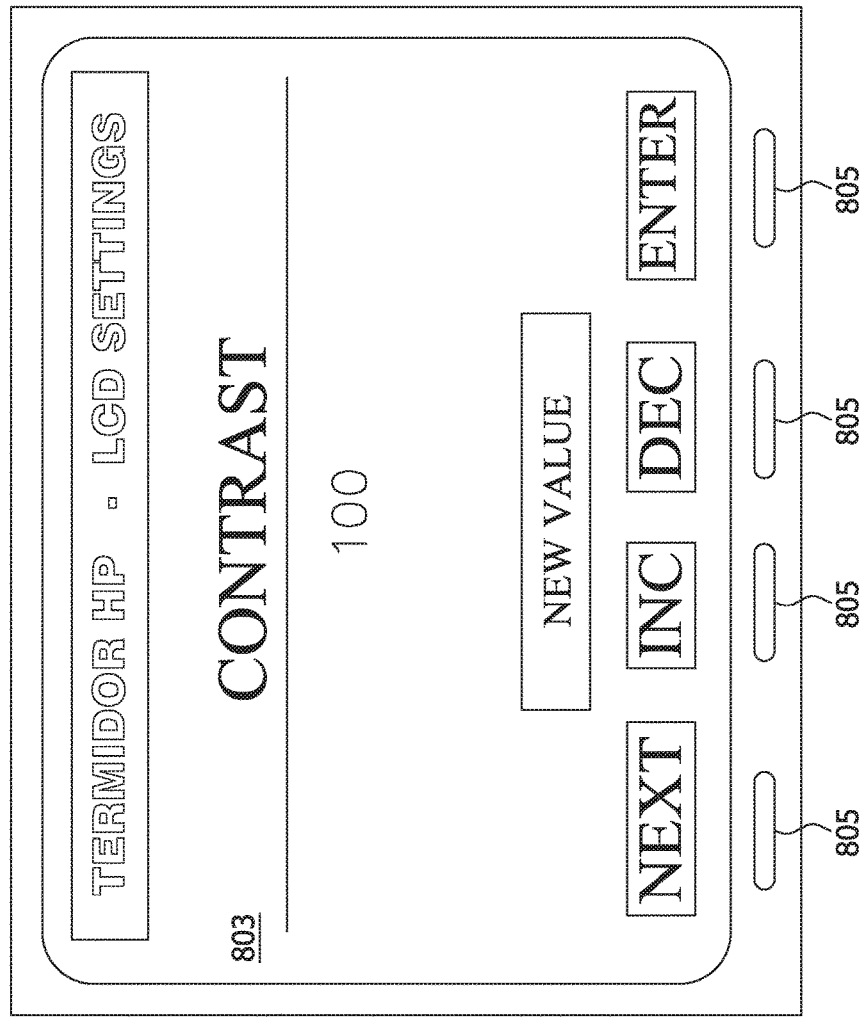

Making the LCD selection from the SELECT MODE screen allows the operator to change one or more display screen settings, such as backlight, contrast, and the like. For example, in one embodiment, pushing button 805 below the LCD selection changes the display screen 803 an LCD SETTINGS screen, as shown in FIGS. 42 and 43. Along the lower edge margin of the LCD SETTINGS screen are the selection options BACK, INC, DEC and NEXT. The NEXT selection is typically used to change between the LCD setting that can be modified, e.g. BACKLIGHT (shown in FIG. 42) and CONTRAST (shown in FIG. 43). Following selection of the LCD setting that the operator wishes to change, the operator pushes the button 805 below the INC and DEC selections to change the value. The INC and DEC selections stand, respectively, for "increase" and "decrease" and are used to toggle through the various values associated with the LCD setting. When the operator has input the desired value, the operator pushes the button 805 below the BACK selection to return to the previous screen shown in FIG. 41.

It is understood, that a single work order (e.g., a single treatment to be conducted at a work site) may entail a first treatment in which the apparatus 710 is operated in its high pressure mode and a second treatment in which the apparatus is operated in its low pressure mode. In particular, the second treatment in which the apparatus 710 is operated in its low pressure mode is suitably applied to a second area of the work site that is different from a first area of the work site to which the first treatment is applied in the high pressure mode of the apparatus. For example, where a work site is a residential property in which the treatment is to be applied about the perimeter of a home, part (a first area) of the perimeter (either a continuous segment of the perimeter, or multiple discrete segments of the perimeter) may be composed of a soil that is suitable for using the high pressure mode of the apparatus 710, while another part (a second area) of the perimeter (continuous, or multiple discrete segments) may not be suitable (such as by being a high compaction soil or by being covered with a hardened surface, e.g., concrete) for using the high pressure mode of the apparatus and thus the low pressure mode of the apparatus must be used to apply the soil treatment. It is understood, however, that other work orders may comprise operating solely in the high pressure mode or operating solely in the low pressure mode.

Figure 44:
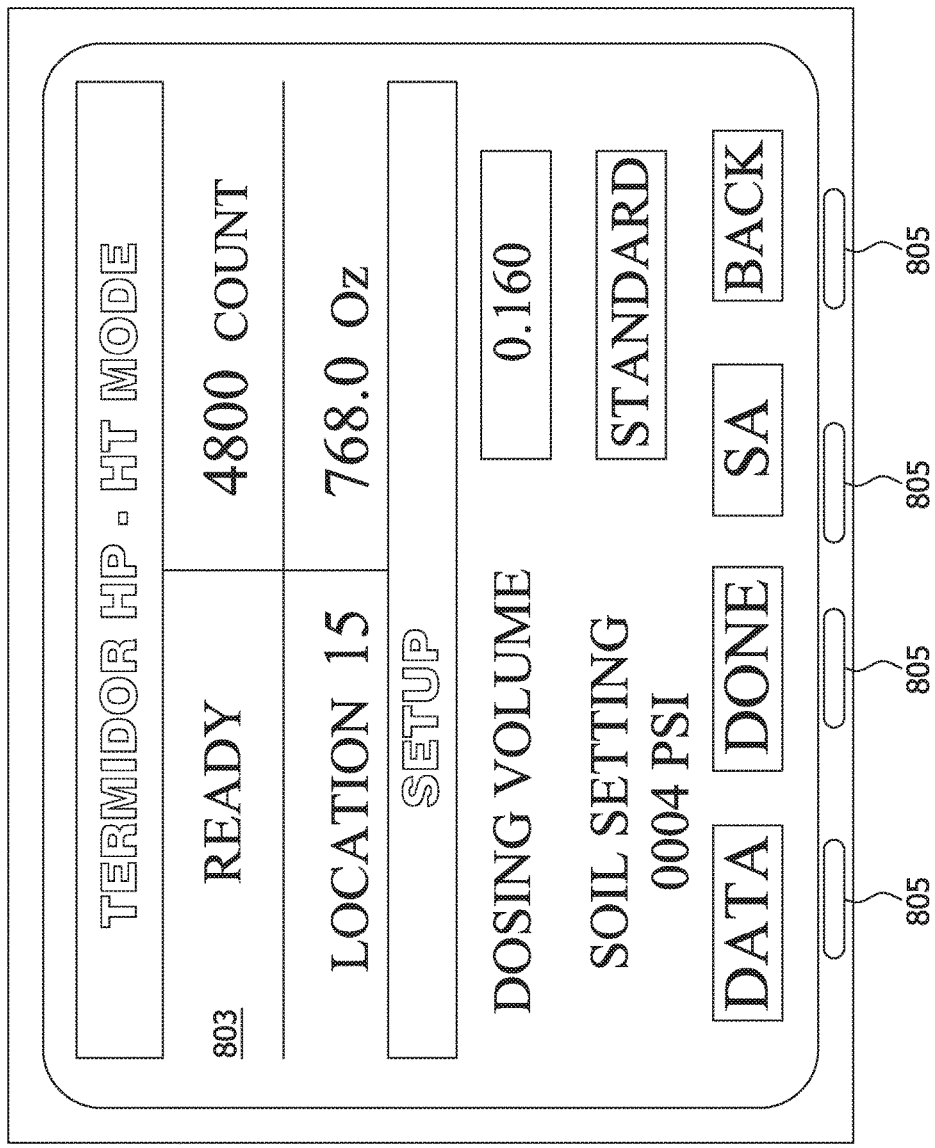
Figure 45:
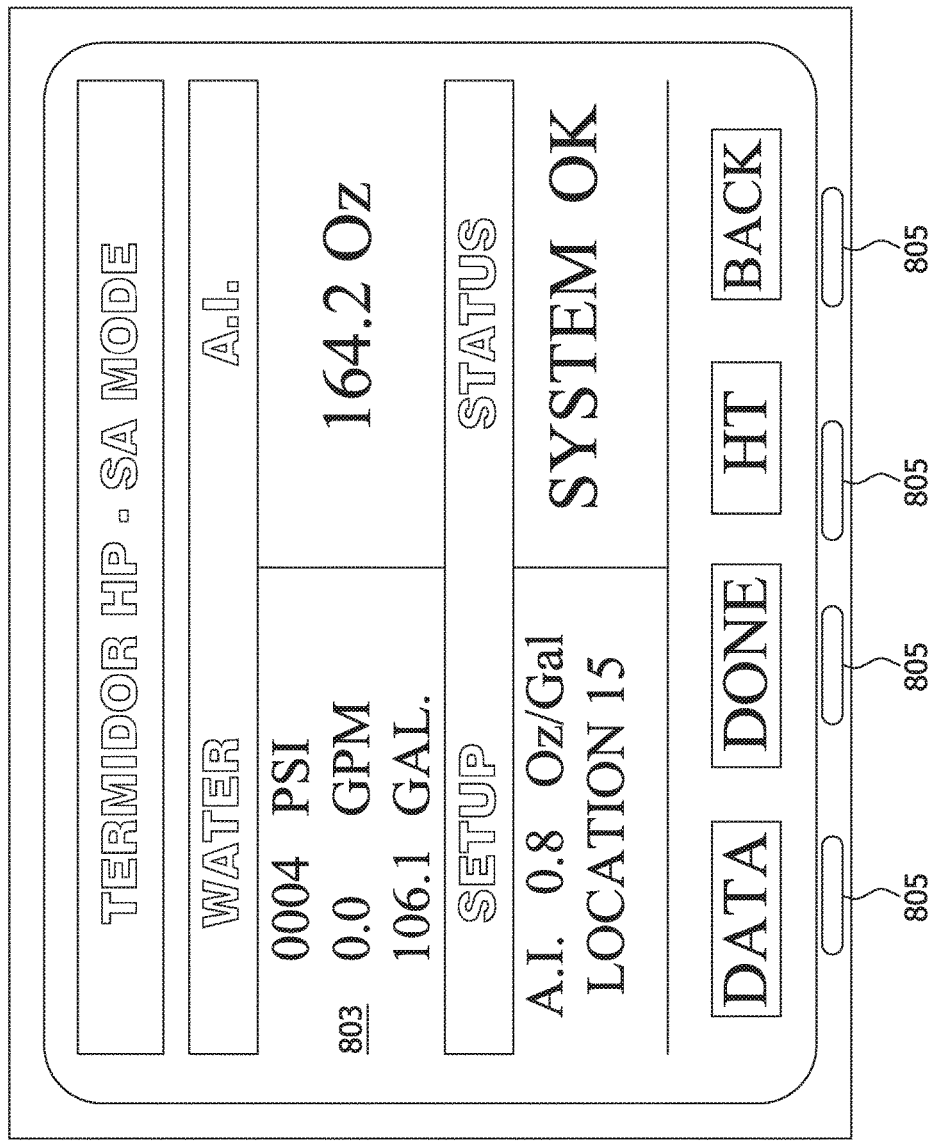

Upon selection of the high pressure mode (e.g., by selecting the HT selection from the SELECT MODE screen), the HT MODE screen shown in FIG. 44 appears on the display screen 803. In a particular embodiment, the HT MODE screen is the screen that the operator sees just before using the high pressure application tool 712 to conduct the soil treatment in the high pressure mode of the apparatus 710. On the lower section of the HT MODE screen, some of the key operating parameters of the apparatus 710 for the high pressure mode are provided, such as, without limitation, the pre-set dosing volume (i.e., the amount of active ingredient, such as the concentrated termiticide, to be delivered per injection in the high pressure mode of the apparatus), the soil type that was selected, and the operating pressure. The operating pressure reading on the HT MODE screen is based on a reading from a suitable transducer (not shown) located on the high pressure application tool 712.

The upper section of the HT MODE screen identifies the location number (in the storage medium of the supply cart control system 792) associated with the work order pursuant to which the present treatment is to be conducted. Also included in the upper section of the HT MODE screen is an injection count that indicates a running total number of injections made up to that point for this particular work order (i.e., at this specific work site). Below the injection count is the amount of active ingredient, e.g., the concentrated termiticide, dispensed up to that point for this particular work order. The amount of active ingredient is a function of the number of injections and the dosing volume. Prior to the first injection conducted at this work site, the count and the amount of active ingredient used should both be zero.

Along the lower edge margin of the display screen are four possible selections that the operator can make, identified as DATA, DONE, SA and BACK. The BACK selection takes the operator to the previous parameter selection screen. The DATA selection takes the operator to a LOCATION DATA screen (discussed in further detail later herein) where the operator can review data recorded in relation to the specific work order (i.e., the location number). The DONE selection allows the operator to indicate to the supply cart control system 792 that the operator has completed operation of the apparatus 710 in the high pressure mode. In particular, the operator holds down the push button 805 that corresponds with the DONE selection for three seconds. In some embodiments, in response to the operator indicating that operation of the apparatus 710 in the high pressure mode is completed, various data collected during such operation is transmitted from the supply cart control system 792 to the remote data management system 801 via the remote communication control system 802. The operator may select the DATA selection either before or after making the DONE selection.

Once the DONE selection is made to indicate completion of operation in the high pressure mode, the operator may select the SA selection to indicate to the supply cart control system 792 that operation in the low pressure mode is to begin. Switching to the low pressure mode cannot be made until the DONE selection is made to indicate completion of operation in the high pressure mode. Upon making the SA selection to switch to the low pressure mode of operation, the high pressure application tool 712 is disconnected from the conduit 713 and the conduit is connected to the low pressure application tool 711. The display screen 803 switches to the SA MODE screen shown in FIG. 45.

The SA MODE screen includes setup information such as, without limitation, the location number and the pre-set delivery rate (as indicated on the previous SELECT PRODUCT screen) of the active ingredient from the concentrate reservoir 784' (e.g., on board the high pressure application tool 712). On the left side of the upper section of the SA MODE screen, the water pressure (in PSI), flow rate (in gallons per minute or GPM) and total amount of water used (in gallons) as of the particular point of operation in the low pressure mode is displayed. The right side of the upper section of the SA MODE screen displays the total amount of active ingredient (e.g., the concentrated termiticide) used up to a particular point during operation of the apparatus 710 in the low pressure mode. The total amount of active ingredient used is a function of the pre-set active ingredient delivery rate and the total amount of water used (as monitored by the supply cart control system 792).

Along the lower edge margin of the SA MODE screen are four possible selections that the operator can make, identified as DATA, DONE, HT and BACK. The BACK selection takes the operator to the previous parameter selection screen. The DATA selection takes the operator to the LOCATION DATA screen (discussed in further detail later herein) where the operator can review data recorded in relation to the specific work order (i.e., the location number). The DONE selection allows the operator to indicate to the supply cart control system 792 that the operator has completed operation of the apparatus 710 in the low pressure mode. In particular, the operator holds down the push button 805 that corresponds with the DONE selection for three seconds. In some embodiments, in response to the operator indicating that operation of the apparatus 710 in the low pressure mode is completed, various data recorded during such operation is transmitted from the supply cart control system 792 to the remote data management system 801. The operator may select the DATA selection either before or after making the DONE selection.

Once the DONE selection is made to indicate completion of operation in the low pressure mode, the operator may select the HT selection to indicate to the supply cart control system 792 that operation in the high pressure mode is to begin (e.g., in the event that the low pressure mode application was conducted first). Switching to the high pressure mode cannot be accomplished until the DONE selection is made to indicate completion of operation in the low pressure mode. Upon making the HT selection to switch to the high pressure mode of operation, the low pressure application tool 711 is disconnected from the conduit 713 and the conduit is connected to the high pressure application tool 712. The display screen 803 switches to the HT MODE screen shown in FIG. 44.

The LOCATION DATA screen that appears on the display screen 803 after making the DONE selection from either the HT MODE screen or the SA MODE screen is shown in FIG. 46. If displayed following selection from either one of the HT MODE screen (FIG. 44) or the SA MODE screen (FIG. 45), the LOCATION DATA screen will display data relating to the specific location number (and hence work order identifier) associated with the treatment that was just performed by the operator. It is also understood that the LOCATION DATA screen may be reached from the SET LOCATION screen shown in FIG. 35. For example, the operator may toggle through the location numbers (using the INC and DEC selections on the SET LOCATION screen) to a particular location number, and then make the DATA selection to bring up the LOCATION DATA screen for any of the particular location numbers (i.e., work orders) stored in the supply cart control system 792.

The LOCATION DATA displays a number of different data associated with the treatment applied for the particular work order identifier. For example, in the illustrated LOCATION DATA screen the total amount of active ingredient used during operation in the high pressure mode is displayed along with the number of injections made. The total amount of active ingredient used during operation in the low pressure mode is also displayed along with the total amount of water used in the low pressure mode. It is understood that in other embodiments more data or less data may be displayed on the LOCATION DATA screen without departing from the scope of this disclosure.

Below the data information is a MODE line, with the HT and SA indicia side-by-side. The check mark next to each of the respective HT and SA indicia indicates that operation in each of the respective high and low pressure modes was completed (as a function of the operator making the DONE selection in each of the HT MODE and SA MODE screens). If the operator has not made the DONE selection in either one of the HT MODE and SA MODE screens, there will not be a check mark next to the corresponding HT or SA indicia on the LOCATION DATA screen. WORK ORDER COMPLETE indicia is also displayed on the LOCATION DATA screen, next to which either a YES or a NO indicia will appear. For example, if a check mark appears next to each of the HT and SA indicia adjacent the MODE indicia, then the work is complete and the YES indicia will appear. But if a check mark is absent next to either one of the HT and SA indicia, the work order is incomplete and the NO indicia will appear, with the absence of a check mark indicating which mode of operation is yet to be completed. In this regard, even if one of the modes of operation is not to be performed for a particular work order, the DONE selection must still be made on the respective one of the HT MODE or SA MODE screens to indicate completion of that mode of operation.

Along the lower edge margin of the LOCATION DATA screen are four possible selections that the operator can make, identified as SEND, UP, DOWN and BACK. The BACK selection changes the display screen 803 to the previous parameter screen. The UP and DOWN selections allow the operator to toggle through the different location numbers (i.e., work orders) stored in the first control system. The SEND selection allows the operator to instruct the cart supply control system 792 to transfer the data relating to the specific location number that appears on the LOCATION DATA screen to the remote data management system 801.

Figure 47:
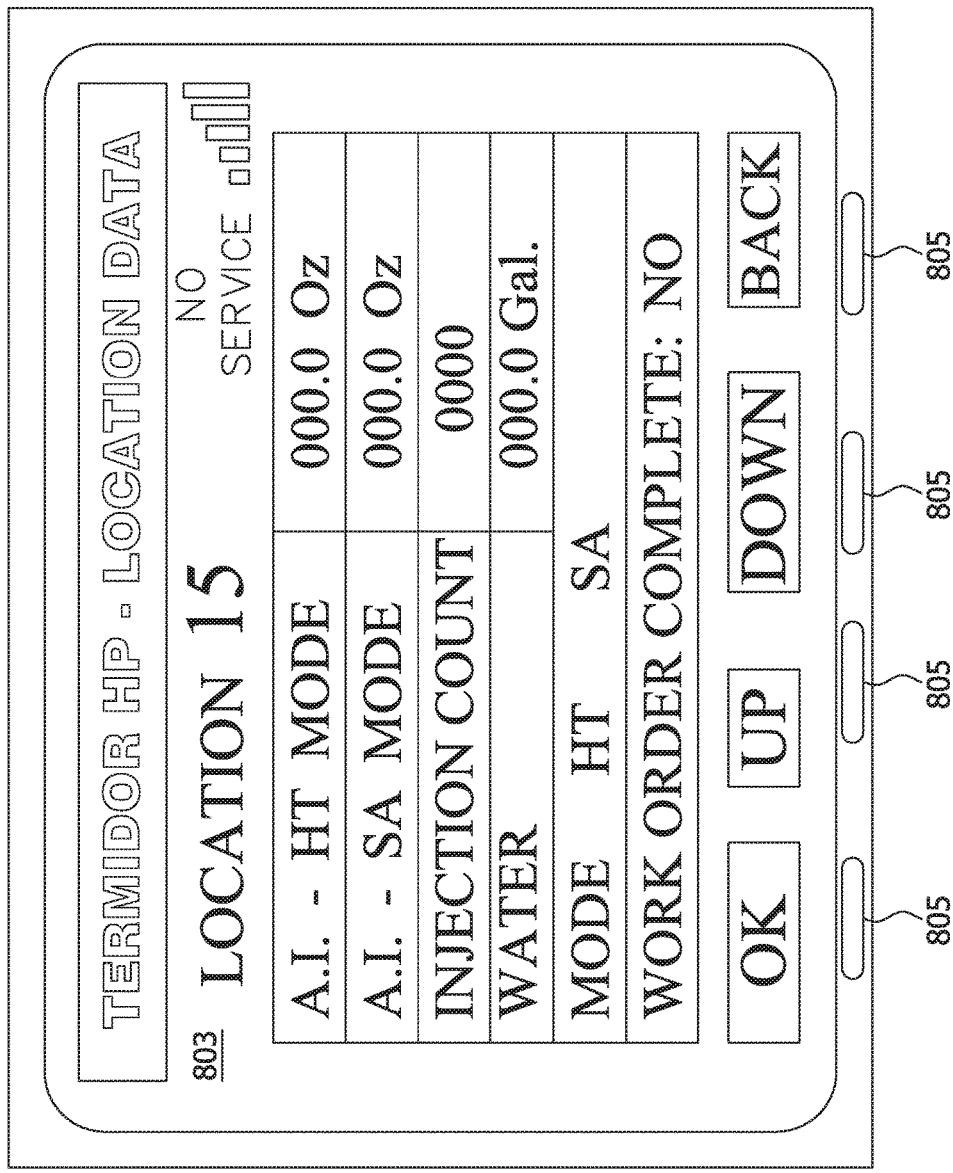

Because the SEND selection is associated only with the specific location number appearing on the LOCATION DATA screen, the operator must make the SEND selection for each location number for which a work order has been completed. For example, in the event that the operator waits until multiple work orders have been completed, such as at the end of a work day, the operator must toggle through each location number for which a work order has been completed and make the SEND selection on each of the respective LOCATION DATA screens to transfer the data for each of the completed work orders. With reference to FIG. 47, when the transfer of data for a particular location number has been successful, the SEND selection on the LOCATION DATA screen changes to an OK indicia. Additionally, all of the data on the LOCATION DATA screen is zeroed, the check marks associated with the HT and SA modes are removed, and the WORK ORDER COMPLETE line indicates NO. This provides an indication to the operator that the information for this location number (e.g., work order) has been sent already should the operator toggle through the location numbers and come back to this particular location number.

It is understood that not all data that is collected by the supply cart control system 792 (e.g., for transmission to the remote data management system 801 via the remote communication control system) may be displayed on the various screens of the supply cart control system. For example, in one embodiment it is contemplated that any one or all of the following data, without limitation, may be collected by the supply cart control system 792: location (and associated work order identifier), the operating software version for each of the supply cart control system and the application tool control system, unit ID (the identifier for the high pressure application tool 712), address of the work site location including city and state, date the treatment was performed, product type applied, soil setting(s) selected, injection volume setting (active ingredient injection volume setting, e.g., for high pressure mode), injection count, injection volume (e.g., total active ingredient used in the high pressure mode), water used (in gallons) in the high pressure mode, total amount of active ingredient used in low pressure mode, water used (in gallons) in low pressure mode, start time of the work performed at each location, the total time (in minutes) elapsed to complete the work at each location, the work order complete signal, which modes (HT and/or SA) were used, and what if any errors/alarms were activated.

Figure 48:
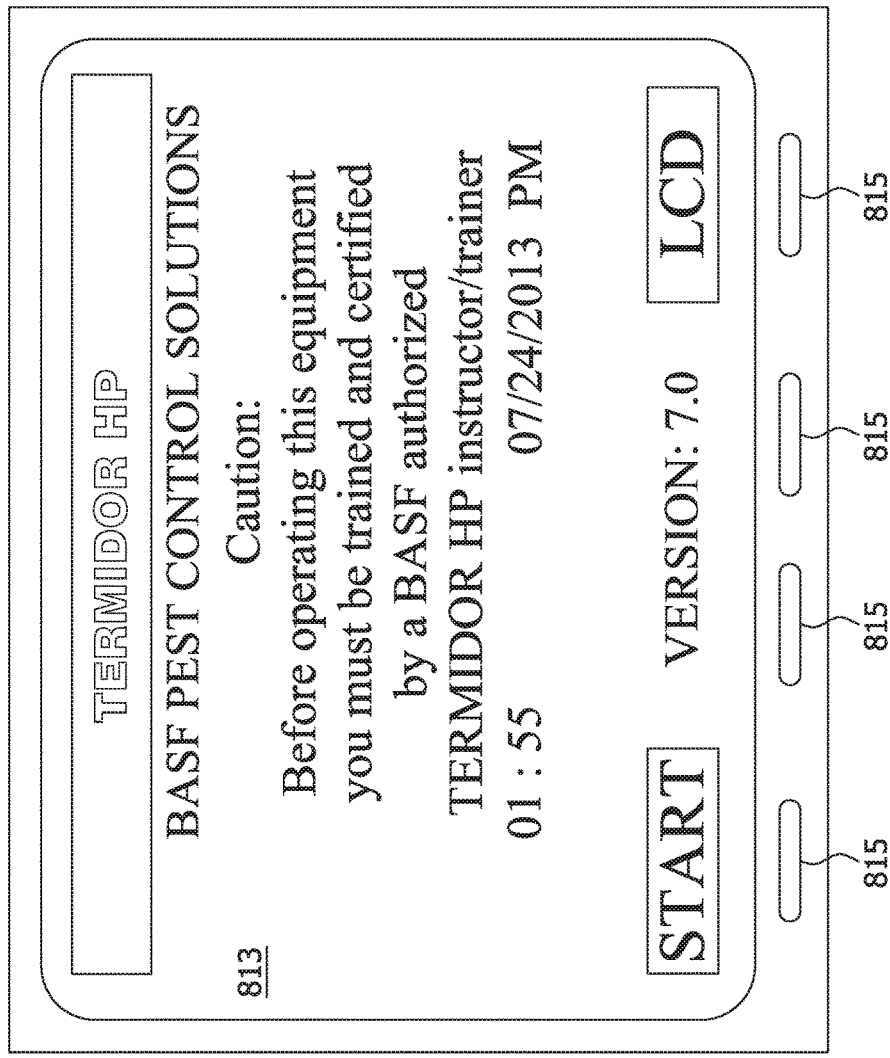
FIGS. 48-50 are screen shots from a display unit of a high pressure application tool control system for the apparatus of FIG. 23.
Figure 49:
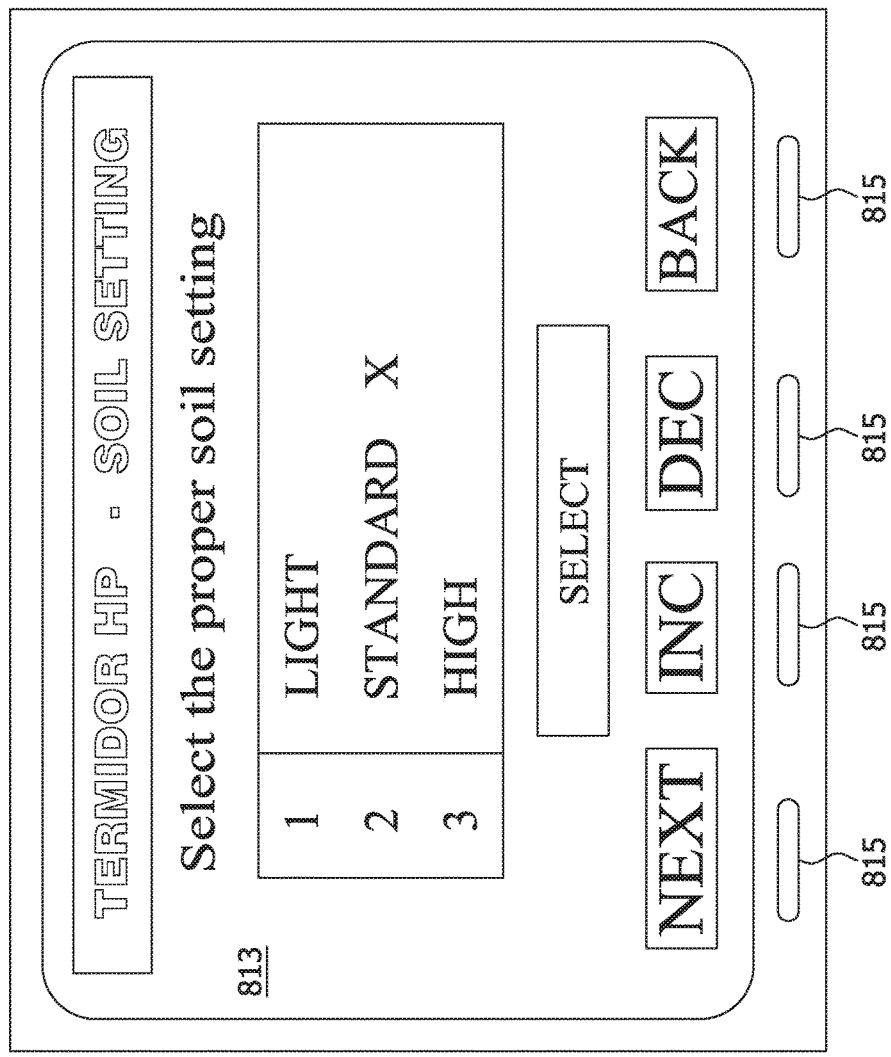
Figure 50:
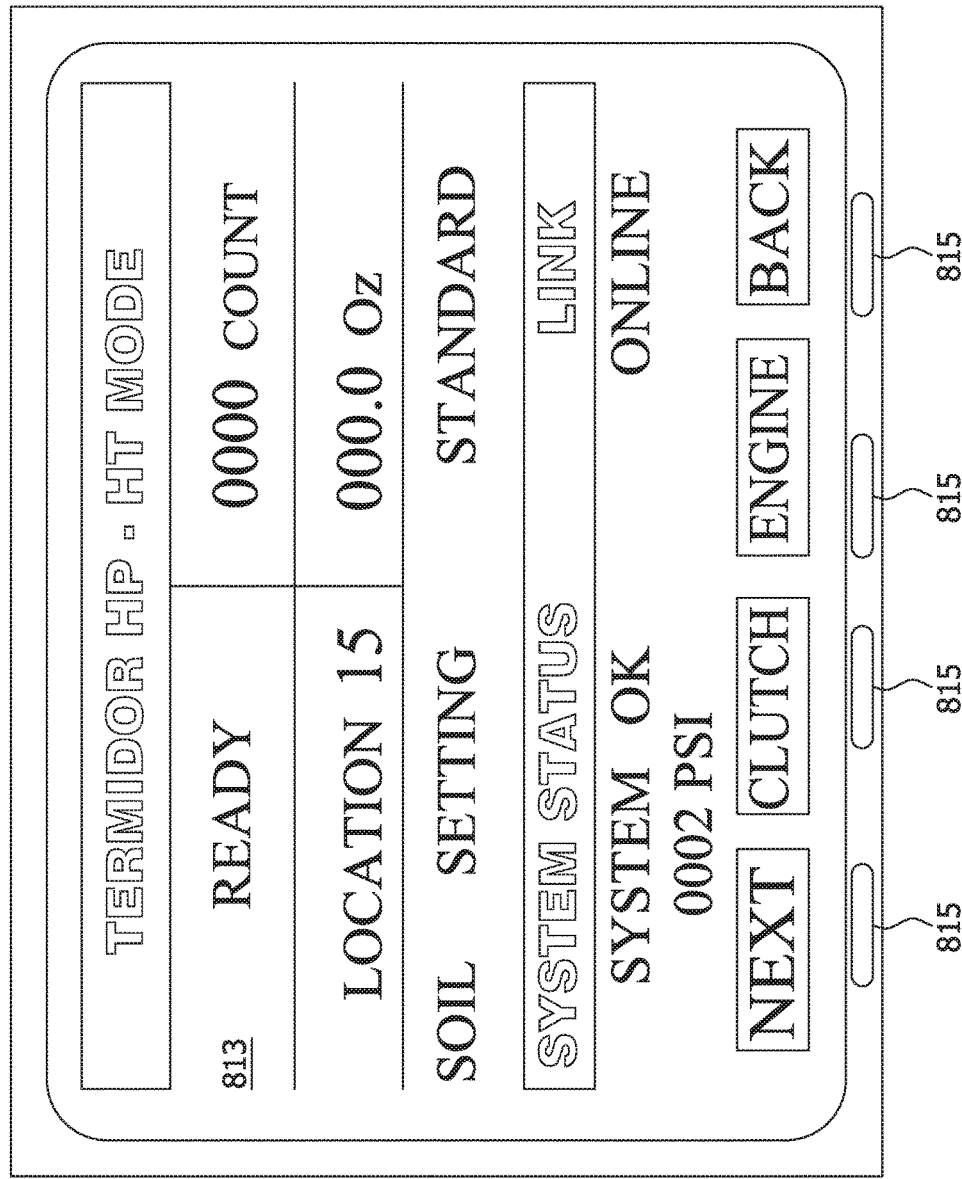

FIGS. 48-50 are screen shots that appear on the display screen 813 of the application tool control system 799 (i.e., the second control system, which is on the high pressure application tool 712) when the apparatus 710 is operated in its high pressure mode. FIG. 48, for example, is the first screen that appears upon powering on the high pressure application tool 712. The display unit of the application tool control system 799 includes a display screen 813 and push buttons 815 similar to the display unit of the supply cart control system 799. It is understood, however, that the display unit may comprise a touch screen or other suitable user interface without departing from the scope of this disclosure. In addition to the time, date and operating software version, this screen includes a START selection and an LCD selection. Making the LCD selection allows the operator to change one or more display screen settings, such as backlight and the like, as discussed above with reference to FIGS. 42 and 43. The operator makes the START selection when operation of the high pressure application tool 712 is ready to commence. As one safety feature, the START selection on the display unit of the application tool control system 799 will not be operational to change the display screen 813 unless setup of the supply cart control system 792 is complete, such as by completing the setup up through and including the SELECT MODE screen (and the operator must have selected the HT selection on the SELECT MODE screen).

When set up of the supply cart control system 792 is completed and the START selection on the display screen 813 of the application tool control system 799 is selected, the display screen of the application tool control system changes to the SOIL SETTING screen shown in FIG. 49. The same selections (LIGHT, STANDARD and HIGH) are displayed on the SOIL SETTING screen of the high pressure application tool 712 as are displayed on the SOIL SETTING screen (FIG. 40) of the supply cart control system 792. As long as a connection is established between the application tool control system 799 and the supply cart control system 792, such as by the wireless connection in the illustrated embodiment, by electrical connection or by other suitable connection, when the operator makes a soil type selection on the SOIL SETTING screen of the application tool control system the soil type setting selected on the SOIL SETTING screen of the cart supply control system is overridden. This allows the operator to reassess the soil type after having moved the high pressure application tool 712 to a location remote from the supply cart 714.

Once the NEXT selection is made to select the soil type on the SOIL SETTING screen, the HT MODE screen of FIG. 50 is displayed indicating that the high pressure application tool 712 is ready for operation in the high pressure mode of the apparatus. The HT MODE screen displays the location number and soil type setting, pressure and the running number of injections and the total amount of active ingredient (e.g., concentrated termiticide) used in performing a treatment in the high pressure mode of the apparatus 710. Also included on the HT MODE screen is a SYSTEM STATUS identifier. If below the SYSTEM STATUS the identifier SYSTEM OK appears, then the high pressure application tool 712 is operationally ready. The SYSTEM STATUS updates after each injection. If the high pressure tool 712 is not operationally ready the identifier will provide an error message and/or alarm to indicate as such. For example, if the concentrate reservoir 784' on the high pressure application tool 712 is empty or otherwise not flowing to the manifold, or if the operating pressure falls below a predetermined minimum pressure, the SYSTEM STATUS will provide an indication of such an issue. A LINK status identifier is also displayed to indicate to the operator whether the application tool control system 799 has an established communication link with the supply cart control system 792. An identifier of ONLINE indicates that the link is established, while an OFFLINE identifier indicates that no link is established.

Along the lower edge margin of the display screen 813 are four selection options, including NEXT, CLUTCH, ENGINE and BACK. The BACK selection changes the display screen back to the SOIL SETTING screen. The CLUTCH selection communicates with the supply cart control system 792 to disengage the clutch mechanism 791 to pause delivery of the pressurized fluid. The ENGINE selection communicates with the supply cart control system 792 to shut off the engine 788 to cease operation of the apparatus 710. Thus, the operator has some control over the supply cart 714 from the remote location of the high pressure application tool 712. The NEXT selection also changes the display screen back to the SOIL SETTING screen.

In one embodiment, the application tool control system 799 includes sufficient memory storage, such as temporary memory storage, so that if the communications link between the application tool control system and the supply cart control system 792 is lost during operation of the apparatus 710 in the high pressure mode, the application tool control system will temporarily store the injection related data displayed on the HT MODE screen (FIG. 50)—e.g., at least the injection count and pressure, and optionally the amount of active ingredient used. When the link is reestablished, the temporarily stored data is automatically transmitted to the supply cart control system 792. It is also contemplated that additionally, or alternatively, the application tool control system 799 may be configured to communicate directly with the remote data management system 801.

The methods, apparatus, and systems described herein facilitate applying soil treatment to the ground. In particular, in one suitable embodiment, an apparatus for applying a soil treatment is selectively operable between a high pressure mode and a low pressure mode. The apparatus includes a high pressure application tool operable to inject soil treatment under high pressure into the soil in the high pressure mode of the apparatus. Further, the apparatus includes a low pressure application tool discrete from the high pressure application tool and operable to apply soil treatment under low pressure to the soil in the low pressure mode of the apparatus, the low pressure being substantially lower than the high pressure of the high pressure mode of the apparatus. The apparatus also includes a base unit in fluid communication with the high pressure application tool in the high pressure mode of the apparatus and operable in the high pressure mode to deliver pressurized fluid to the high pressure application tool for operation of the high pressure application tool. The base unit is also in fluid communication with the low pressure application tool in the low pressure mode of the apparatus and operable in the low pressure mode to deliver fluid to the low pressure application tool at a substantially lower pressure than in the high pressure mode. The high pressure application tool and the low pressure application tool are each respectively positionable relative to the base unit. The base unit, high pressure application tool, and low pressure application tool are configured relative to each other such that the low pressure application tool is inoperable when the high pressure application tool is operating and the high pressure application tool is inoperable when the low pressure application tool is operating.

In another suitable embodiment, in the high pressure mode of the apparatus, the high pressure application tool is connected to the base unit in fluid communication therewith and the low pressure application tool is disconnected from the base unit. In the low pressure mode the low pressure application tool is connected to the base unit in fluid communication therewith and the high pressure application tool is disconnected from the base unit. In one suitable embodiment, the apparatus further includes a pressure relief valve to release pressure prior to disconnecting the high pressure application tool.

In another suitable embodiment, the base unit includes a conduit for delivering fluid from the base unit. In the high pressure mode the high pressure application tool is connected to the conduit while the low pressure application tool is disconnected from the conduit, and in the low pressure mode the low pressure application tool is connected to the conduit while the high pressure application tool is disconnected from the conduit. In one suitable embodiment, the conduit includes a quick connect positioned distal from the base unit. Each one of the high pressure application tool and the low pressure application tool is respectively configured for interchangeable releasable connection to the conduit at the quick connect.

Further, in another embodiment, the base unit includes a control system for controlling operation of the base unit to deliver fluid from the base unit. The control system is configured for selectively switching operation of the base unit between the high pressure mode of the apparatus and the low pressure mode of the apparatus. Optionally, the apparatus is inoperable in the high pressure mode of the apparatus when the low pressure application tool is connected to the base unit.

Moreover, in an alternative embodiment, the low pressure application tool is configured for delivering soil treatment below the ground surface. In one particular non-limiting example, the low pressure application tool includes a rodding tool.

In another suitable embodiment, the base unit includes a pressure pump operable to deliver a carrier liquid from a source of carrier liquid, a reservoir for containing an active ingredient to be admixed with the carrier liquid to define fluid delivered from the base unit in the low pressure mode of the apparatus, and a peristaltic pump operable to deliver active ingredient from the reservoir for admixture with the carrier liquid. The pressure pump is operable in the low pressure mode of the apparatus to deliver the carrier liquid at a flow rate, and the peristaltic pump is operable in the low pressure mode of the apparatus to deliver the active ingredient at a dosing rate based on the carrier liquid flow rate. In an alternative embodiment, the peristaltic pump is not operated in the high pressure mode of the apparatus. In another alternative embodiment, the peristaltic pump has an operating rate, the operating rate being adjustable in response to a change in the carrier liquid flow rate. Further, in another embodiment, the operating rate is automatically adjusted based on the carrier liquid flow rate.

In one suitable embodiment, a method of treating soil adjacent a structure at a work site is described. The method includes moving a high pressure injection apparatus along a first area of the work site adjacent the structure. Furthermore, the method includes operating the high pressure injection apparatus to inject soil treatment down into the soil along said first area of the work site. The method also includes moving a low pressure application tool along a second area of the work site adjacent the structure, and operating the low pressure application tool to apply soil treatment to the soil along the second area of the work site.

In another suitable embodiment of the method, the low pressure application tool has an outlet through which soil treatment is delivered from the low pressure application tool. The method further including the step of moving the low pressure application tool along the second area of the work site including intermittently inserting at least a portion of the low pressure application tool into the ground at spaced apart locations along the second work area such that upon each insertion the outlet of the tool is below a hardened surface.

In an alternative embodiment of the method, the low pressure application tool has an outlet through which soil treatment is delivered from the low pressure application tool. The method further including the step of moving the low pressure application tool along the second area of the work site including digging one or more of a hole and a trench in the ground at the second work area and inserting at least a portion of the low pressure application tool into the hole or trench such that the outlet of the tool is below the ground surface prior to operating the low pressure application tool.

Moreover, in another alternative embodiment of the method, the step of operating the high pressure injection apparatus to inject soil treatment down into the soil further includes operating the high pressure injection apparatus to inject soil treatment down into the soil at a first injection site of the first area, stopping the flow of soil treatment from the high pressure injection apparatus while moving the high pressure injection apparatus to a second injection site of the first area, and operating the high pressure injection apparatus to inject soil treatment down into the soil at the second injection site of the first area.

In one suitable embodiment of the method set forth above, the work site includes substantially the entire perimeter about the structure. In another embodiment, the first area includes a plurality of discrete areas of the work site. Furthermore, in another embodiment, the second area includes a plurality of discrete areas of the work site.

In still another suitable embodiment of the method set forth above, the soil treatment applied by at least one of the high pressure injection apparatus and the low pressure application tool comprises a termiticide.

In another suitable embodiment, the method set forth above includes determining which area of the work site is suitable for treatment using the high pressure injection apparatus so as to define the first area of the work site, and which area of the work site is unsuitable for treatment using the high pressure injection apparatus so as to define the second area of the work site. Determining the first and second areas of the worksite is a function of one or more of the type of soil at the work site, and the ground surface at the work site. In one particularly suitable embodiment, the second area of the work site includes one or more of a highly compacted soil and a hardened ground surface over the soil.

In another suitable embodiment, the method set forth above includes, prior to moving the high pressure injection apparatus along the first area of the work site, the step of connecting the high pressure injection apparatus to a fluid delivery device in fluid communication therewith such that the high pressure injection apparatus is positionable relative to the fluid delivery device. The step of operating the high pressure injection apparatus to inject soil treatment down into the soil includes operating the fluid delivery device to deliver fluid at high pressure to the high pressure injection apparatus. The method further includes, prior to moving the low pressure application tool along a second area of the work site, disconnecting the high pressure injection apparatus from the fluid delivery device and connecting the low pressure application tool to the fluid delivery device in fluid communication therewith such that the low pressure application tool is positionable relative to the fluid delivery device. The step of operating the low pressure application tool to apply soil treatment includes operating the fluid deliver device to deliver fluid to the low pressure application tool at a pressure substantially lower than the high pressure of the fluid delivered to the injection apparatus. Alternatively, the method further includes bleeding pressure from the high pressure injection apparatus prior to disconnecting the injection apparatus from the fluid delivery device.

In another suitable embodiment of the method, the first area of the work site is discrete from the second area of the work site. Alternatively, the second area of the work site at least in part overlaps the first area of the work site.

In another suitable embodiment of the method, the step of operating the high pressure injection apparatus includes operating the high pressure injection apparatus to inject soil treatment down into the soil to an injection depth below the surface of the soil. The step of moving a low pressure application tool along a second area of the work site includes moving the low pressure application tool along a second area overlapping the first area of the work site. In addition, the step of operating the low pressure application tool includes inserting the low pressure application tool down into the soil below the injection depth, and operating the low pressure application tool to apply soil treatment to the soil below the injection depth.

In an alternative embodiment, a method of injecting a soil treatment into subsurface soil is described. The method includes positioning an injection apparatus so that at least one high pressure nozzle of the injection apparatus is adjacent to the soil to be injected with pesticide. The method also includes triggering the injection apparatus to deliver a pressurized soil treatment to the at least one high pressure nozzle whereby the pressurized soil treatment is jetted from the high pressure nozzle down into soil subsurface. The triggering of the injection apparatus includes determining a predetermined time period during which carrier liquid is delivered at high pressure to the at least one high pressure nozzle. The predetermined time period is based at least in part on the type of soil into which the soil treatment is to be injected. In addition, triggering of the injection apparatus includes delivering a predetermined dosing volume of active ingredient toward the at least one high pressure nozzle for the predetermined time period for admixture with the carrier liquid to define the soil treatment prior to the soil treatment being jetted from the at least one high pressure nozzle. The predetermined dosing volume is on a per injection basis and is independent of the predetermined time period.

In another suitable embodiment, the method described above includes operating a control system of the injection apparatus to select the type of soil into which the soil treatment is to be injected. The predetermined time period is determined based on the selected soil type.

Furthermore, in another suitable embodiment, the predetermined time period is further based at least in part on an intended depth of penetration of the soil treatment down into the soil for each single triggering of the injection apparatus.

In still yet another suitable embodiment, an apparatus for injecting a soil treatment into subsurface soil includes an injection apparatus operable to inject soil treatment under high pressure down into the soil, and a base unit operable to deliver pressurized fluid to the injection apparatus. The injection apparatus is connected to the base unit in fluid communication therewith by a conduit defining a fluid passageway therebetween. The injection apparatus is positionable remote from the base unit. In addition, the injection apparatus carries a battery for powering the injection apparatus without powered connection to the base unit.

In one suitable embodiment, the battery is a rechargeable battery. Furthermore, in one embodiment, the battery is releasably mounted on the injection apparatus to facilitate removal of the battery from the injection apparatus for recharging.

In another suitable embodiment, the apparatus further includes a base unit control system carried by the base unit and an injection apparatus control system carried by the injection apparatus for remote positioning relative to the base unit control system. The base unit control system and the injection apparatus control system are configured for wireless communication with each other. Furthermore, in one embodiment, the base unit control system is operable to control delivery of pressurized fluid from the base unit to the injection apparatus. The injection apparatus control system is operable to send a signal from the injection apparatus control system to the base unit control system to one of pause and shut off operation of the base unit so as to cease the delivery of pressurized fluid from the base unit to the injection apparatus. Moreover, in another embodiment, the injection apparatus control system includes a user interface accessible to an operator of the injection apparatus. The operator, using the user interface, can instruct the injection apparatus control system to send the signal to the base unit control system to one of pause and shut off operation of the base unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. Apparatus for applying a soil treatment, the apparatus being selectively operable between a first pressure mode and a second pressure mode, the apparatus comprising:
   a first pressure application tool operable to inject soil treatment under a first pressure into the soil in the first pressure mode of the apparatus;
   a second pressure application tool discrete from the first pressure application tool and operable to apply soil treatment under second pressure to the soil in the second pressure mode of the apparatus, the second pressure being substantially lower than the first pressure of the first pressure mode of the apparatus; and
   a base unit in fluid communication with the first pressure application tool in the first pressure mode of the apparatus and operable in the first pressure mode to deliver pressurized fluid to the first pressure application tool for operation of the first pressure application tool, the base unit being in fluid communication with the second pressure application tool in the second pressure mode of the apparatus and operable in the second pressure mode to deliver fluid to the second pressure application tool at a substantially lower pressure than in the first pressure mode, the first pressure application tool and the second pressure application tool each being respectively positionable relative to the base unit, said base unit, first pressure application tool and second pressure application tool being configured relative to each other such that the second pressure application tool is inoperable when the first pressure application tool is operating and the first pressure application tool is inoperable when the second pressure application tool is operating.

2. The apparatus set forth in claim 1 wherein in the first pressure mode of the apparatus the first pressure application tool is connected to the base unit in fluid communication therewith and the second pressure application tool is disconnected from the base unit, and in second pressure mode the second pressure application tool is connected to the base unit in fluid communication therewith and the first pressure application tool is disconnected from the base unit.

3. The apparatus set forth in claim 2 wherein the base unit includes a conduit for delivering fluid from the base unit, in the first pressure mode the first pressure application tool being connected to the conduit while the second pressure application tool is disconnected from the conduit, and in the second pressure mode the second pressure application tool being connected to the conduit while the first pressure application tool is disconnected from the conduit.

4. The apparatus set forth in claim 1 wherein the base unit comprises a control system for controlling operation of the base unit to deliver fluid from the base unit, the control system being configured for selectively switching operation of the base unit between the first pressure mode of the apparatus and the second pressure mode of the apparatus.

5. The apparatus set forth in claim 1 wherein the base unit comprises a pressure pump operable to deliver a carrier liquid from a source of carrier liquid, a reservoir for containing an active ingredient to be admixed with the carrier liquid to define fluid delivered from the base unit in the second pressure mode of the apparatus, and a peristaltic pump operable to deliver active ingredient from the reservoir for admixture with the carrier liquid, the pressure pump being operable in the second pressure mode of the apparatus to deliver the carrier liquid at a flow rate, the peristaltic pump being operable in the second pressure mode of the apparatus to deliver the active ingredient at a dosing rate based on the carrier liquid flow rate.

6. The apparatus set forth in claim 5 wherein the peristaltic pump has an operating rate, the operating rate being adjustable in response to a change in the carrier liquid flow rate.

7. The apparatus set forth in claim 1 wherein the first pressure application tool comprises a handle and a manifold head mounted to the handle.

* * * * *